(12) United States Patent
Kanagalingam et al.

(10) Patent No.: US 11,066,342 B2
(45) Date of Patent: Jul. 20, 2021

(54) FERTILIZER COMPOSITION AND METHODS OF MAKING AND USING SAME

(71) Applicant: SABIC GLOBAL TECHNOLOGIES B.V., Bergen Op Zoom (NL)

(72) Inventors: Sabeshan Kanagalingam, Riyadh (SA); Ravi Hegde, Bangalore (IN); Madduri Srinivasarao, Bangalore (IN); Rajamalleswaramma Koripelly, Bangalore (IN); Samik Gupta, Bangalore (IN); Nilkamal Bag, Bangalore (IN); Satish Burla, Bangalore (IN); Yoganand Gurumallappa, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 67 days.

(21) Appl. No.: 15/746,055

(22) PCT Filed: Jul. 18, 2016

(86) PCT No.: PCT/IB2016/054270
§ 371 (c)(1),
(2) Date: Jan. 19, 2018

(87) PCT Pub. No.: WO2017/013572
PCT Pub. Date: Jan. 26, 2017

(65) Prior Publication Data
US 2018/0208519 A1 Jul. 26, 2018

Related U.S. Application Data

(60) Provisional application No. 62/194,589, filed on Jul. 20, 2015, provisional application No. 62/316,188, filed on Mar. 31, 2016.

(51) Int. Cl.
*C05G 3/90* (2020.01)
*C05D 3/00* (2006.01)
(Continued)

(52) U.S. Cl.
CPC ............... *C05G 3/90* (2020.02); *C05C 9/005* (2013.01); *C05D 3/00* (2013.01); *C05G 3/00* (2013.01); *C05G 5/45* (2020.02); *Y02P 60/21* (2015.11)

(58) Field of Classification Search
CPC .......... C05G 3/08; C05G 3/00; C05G 3/0052; Y02P 60/218; C05D 3/00; C05C 9/005
See application file for complete search history.

(56) References Cited

U.S. PATENT DOCUMENTS 3,056,723 A 10/1962 Galloway
3,232,740 A 2/1966 Sor et al.
(Continued)

FOREIGN PATENT DOCUMENTS

AU 667645 2/1995
AU 2015212412 9/2016
(Continued)

OTHER PUBLICATIONS

Lookchem. "Hydroxypropyl methyl cellulose"/ <https://www.lookchem.com/Hydroxypropyl-methyl-cellulose/> pp. 1-2 Nov. 15, 2015.*
(Continued)

*Primary Examiner* — Jennifer A Smith
(74) *Attorney, Agent, or Firm* — Norton Rose Fulbright US LLP

(57) ABSTRACT

In accordance with the present invention, disclosed herein is a fertilizer core and fertilizer granule and methods related thereto. The fertilizer core particle has an outer surface and comprising one or more fertilizer additives, one or more
(Continued)

binders, and one or more pH buffering agents, and wherein the fertilizer core particle comprises from about 10 wt % to about 99 wt % of the one or more binders.

18 Claims, 20 Drawing Sheets

(51) Int. Cl.
  *C05G 5/00* (2020.01)
  *C05C 9/00* (2006.01)
  *C05G 3/00* (2020.01)

(56) References Cited

U.S. PATENT DOCUMENTS

| | | |
|---|---|---|
| 3,300,294 A | 1/1967 | Hollstein |
| 3,314,778 A | 4/1967 | Campbell et al. |
| 3,322,528 A | 5/1967 | Hamamoto |
| 3,326,665 A | 6/1967 | Schäfer et al. |
| 3,331,677 A | 7/1967 | Campbell et al. |
| 3,388,989 A * | 6/1968 | Kamil ............... C05C 9/00 71/28 |
| 3,400,011 A | 9/1968 | Fox |
| 3,441,539 A | 4/1969 | Schäfer et al. |
| 3,499,748 A | 3/1970 | Fraser |
| 3,825,414 A | 6/1974 | Lee et al. |
| 3,870,755 A | 3/1975 | Kamo et al. |
| 3,954,436 A | 5/1976 | Vad et al. |
| 3,961,329 A | 7/1976 | Naidich |
| 3,962,329 A | 7/1976 | Schoenaich et al. |
| 4,062,890 A | 12/1977 | Shank |
| 4,082,533 A | 4/1978 | Wittenbrook et al. |
| 4,880,455 A | 11/1989 | Blank |
| 4,994,100 A | 2/1991 | Sutton et al. |
| 5,124,451 A | 7/1992 | Hackl et al. |
| 5,169,954 A | 12/1992 | Hackl et al. |
| 5,219,465 A | 6/1993 | Goertz et al. |
| 5,264,019 A | 11/1993 | Gossett, Jr. et al. |
| 5,300,135 A | 4/1994 | Hudson et al. |
| 5,352,265 A | 10/1994 | Weston et al. |
| 5,399,186 A | 3/1995 | Derrah et al. |
| 5,405,426 A | 4/1995 | Timmons |
| 5,414,083 A | 5/1995 | Hackl et al. |
| 5,466,274 A | 11/1995 | Hudson et al. |
| 5,476,528 A | 12/1995 | Trimm |
| 5,597,917 A | 1/1997 | Hackl et al. |
| 5,645,624 A | 7/1997 | Naka et al. |
| 5,741,521 A | 4/1998 | Knight et al. |
| 5,803,946 A | 9/1998 | Petcavich et al. |
| 5,851,261 A | 12/1998 | Markusch et al. |
| 5,862,610 A | 1/1999 | Lipert |
| 5,917,110 A | 6/1999 | Kust |
| 5,976,210 A | 11/1999 | Sensibaugh |
| 6,048,376 A | 4/2000 | Miller |
| 6,048,378 A | 4/2000 | Moore |
| 6,231,633 B1 | 5/2001 | Hirano et al. |
| 6,391,454 B1 | 5/2002 | Mao et al. |
| 6,500,223 B1 | 12/2002 | Sakai et al. |
| 6,576,035 B2 | 6/2003 | Hartmann et al. |
| 6,749,659 B1 | 6/2004 | Yu et al. |
| 6,900,162 B2 | 5/2005 | Wertz et al. |
| 6,936,573 B2 | 8/2005 | Wertz et al. |
| 6,936,681 B1 | 8/2005 | Wertz et al. |
| 7,213,367 B2 | 5/2007 | Wertz et al. |
| 8,163,058 B2 | 4/2012 | Whitehurst |
| 8,419,819 B2 | 4/2013 | Sutton |
| 8,603,211 B2 | 12/2013 | Rahn et al. |
| 9,034,072 B2 | 5/2015 | Gabrielson et al. |
| 9,376,350 B2 | 6/2016 | Pursell et al. |
| 9,394,210 B2 | 7/2016 | Gabrielson et al. |
| 9,422,203 B2 | 8/2016 | Waliwitiya |
| 9,446,993 B2 | 9/2016 | Li et al. |
| 2003/0224031 A1 | 12/2003 | Heier et al. |
| 2004/0001884 A1 | 1/2004 | Moroni et al. |
| 2004/0016275 A1 | 1/2004 | Hartmann et al. |
| 2004/0016276 A1 | 1/2004 | Wynnyk et al. |
| 2004/0050127 A1 | 3/2004 | Ambri |
| 2004/0163434 A1 | 8/2004 | Quin |
| 2004/0182953 A1 | 9/2004 | Knoer |
| 2006/0089259 A1 | 4/2006 | Driessen et al. |
| 2006/0142157 A1 | 6/2006 | Birthisel et al. |
| 2009/0270257 A1 | 10/2009 | Pursell et al. |
| 2010/0011825 A1 | 1/2010 | Ogle et al. |
| 2010/0139348 A1 | 6/2010 | Wan et al. |
| 2011/0036009 A1 * | 2/2011 | Bissonnette ......... C05G 3/0064 47/59 S |
| 2011/0275520 A1 | 11/2011 | Frey et al. |
| 2012/0017659 A1 | 1/2012 | Pursell et al. |
| 2012/0067094 A1 | 3/2012 | Pursell et al. |
| 2012/0090366 A1 | 4/2012 | Pursell et al. |
| 2013/0152649 A1 | 6/2013 | Kweeder et al. |
| 2013/0231493 A1 | 9/2013 | Shishkov et al. |
| 2013/0305796 A1 | 11/2013 | Hudson et al. |
| 2014/0033779 A1 | 2/2014 | Bertin et al. |
| 2014/0047884 A1 | 2/2014 | Gabrielson et al. |
| 2014/0102156 A1 | 4/2014 | Pursell et al. |
| 2014/0223978 A1 | 8/2014 | Kuo et al. |
| 2014/0255605 A1 | 9/2014 | Van Kaathoven et al. |
| 2015/0031786 A1 | 1/2015 | Lambeth |
| 2015/0052960 A1 | 2/2015 | Makin et al. |
| 2015/0101379 A1 | 4/2015 | Gabrielson et al. |
| 2015/0125639 A1 | 5/2015 | Rosen |
| 2015/0152017 A1 | 6/2015 | Schumski et al. |
| 2015/0197460 A1 | 7/2015 | Gabrielson et al. |
| 2015/0239790 A1 * | 8/2015 | Iwig ............... C05C 9/005 71/28 |
| 2015/0291481 A1 | 10/2015 | Neff et al. |
| 2016/0075609 A1 | 3/2016 | Gabrielson et al. |
| 2016/0076062 A1 | 3/2016 | Medoff et al. |
| 2016/0340265 A1 | 11/2016 | Kanagalingam et al. |
| 2017/0088480 A1 | 3/2017 | Kannan et al. |
| 2018/0022661 A1 | 1/2018 | Achille et al. |
| 2018/0208513 A1 | 7/2018 | Kanagalingam et al. |
| 2018/0297903 A1 | 10/2018 | Ledoux et al. |

FOREIGN PATENT DOCUMENTS

| | | |
|---|---|---|
| CA | 2441175 | 3/2004 |
| CA | 2701995 | 10/2011 |
| CN | 1126465 | 7/1996 |
| CN | 1145059 | 3/1997 |
| CN | 1666972 | 9/2005 |
| CN | 1298679 | 2/2007 |
| CN | 101037371 | 9/2007 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101723752 | 6/2010 |
| CN | 102143927 | 8/2011 |
| CN | 102267842 | 12/2011 |
| CN | 102295491 | 12/2011 |
| CN | 102432388 | 5/2012 |
| CN | 102557838 | 7/2012 |
| CN | 102826917 | 12/2012 |
| CN | 102951968 | 3/2013 |
| CN | 103319120 | 9/2013 |
| CN | 103755498 | 4/2014 |
| CN | 103772074 | 5/2014 |
| CN | 103787798 | 5/2014 |
| CN | 103102216 | 12/2014 |
| CN | 104177201 | 12/2014 |
| CN | 104230575 | 12/2014 |
| CN | 104261723 | 1/2015 |
| CN | 104276877 | 1/2015 |
| CN | 104311366 | 1/2015 |
| CN | 104326847 | 2/2015 |
| CN | 102936169 | 4/2015 |
| CN | 104557278 | 4/2015 |
| DE | 1146080 | 3/1963 |
| DE | 1905834 | 11/1972 |
| DE | 142044 | 6/1980 |

(56) References Cited

FOREIGN PATENT DOCUMENTS

| | | |
|---|---|---|
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1067093 | 12/2004 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |
| GB | 1535807 | 12/1978 |
| JP | 348780 | 7/1991 |
| JP | H07-033576 | 2/1995 |
| JP | H1116798 | 4/1999 |
| JP | H11263689 | 9/1999 |
| JP | H11278973 | 10/1999 |
| JP | 2001294792 | 10/2001 |
| KR | 100974639 | 8/2010 |
| KR | 101485578 | 12/2014 |
| NZ | 596113 | 8/2012 |
| SU | 429048 A1 * | 5/1974 |
| TW | 1549926 | 9/1916 |
| WO | WO 2016/091205 | 6/1916 |
| WO | WO 2016/107548 | 7/1916 |
| WO | WO 2016/186526 | 11/1916 |
| WO | WO 2017/013572 | 1/1917 |
| WO | WO 2017/013573 | 1/1917 |
| WO | WO 2017/081183 | 5/1917 |
| WO | WO 2017/087264 | 5/1917 |
| WO | WO 2017/087265 | 5/1917 |
| WO | WO 2017/100507 | 6/1917 |
| WO | WO 2017/137902 | 8/1917 |
| WO | WO 2017/168288 | 10/1917 |
| WO | WO 2018/162533 | 9/1918 |
| WO | WO 2018/193344 | 10/1918 |
| WO | WO 2018/193345 | 10/1918 |
| WO | WO 2018/193358 | 10/1918 |
| WO | WO 2019/030671 | 2/1919 |
| WO | WO 1989/000079 | 1/1989 |
| WO | WO 95/26942 | 10/1995 |
| WO | WO 1996/018591 | 6/1996 |
| WO | WO 2003/006399 | 1/2003 |
| WO | WO 2003/045877 | 6/2003 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | WO 2007/022732 | 3/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2013/128402 | 9/2013 |
| WO | WO 2014/189183 | 11/2014 |
| WO | WO-2014189183 A1 * | 11/2014 |
| WO | WO 2015/001457 | 1/2015 |
| WO | WO 2015/114542 | 8/2015 |
| WO | WO 2015/170217 | 11/2015 |
| ZA | 201105819 | 4/2012 |

OTHER PUBLICATIONS

Al-Zahrani, S.M., "Utilization of Polyethylene and Paraffin Waxes as Controlled delivery Systems for Different Fertilizers" *Ind. Eng. Chem. Res.*, 2000, 39(2):367-371.

International Preliminary Report on Patentability issued in International Patent Application No. PCT/IB2016/054271, dated Oct. 18, 2017.

International Search Report and Written Opinion issued in International Patent Application No. PCT/IB2016/054271, dated Oct. 20, 2016.

Office Action issued in European Patent Application No. 16741394.7, dated Dec. 7, 2018.

Allison, "The Enigma of Soil Nitrogen Balance Sheets," *Adv. Agr*, 7:213-250, (1955).

Bolan et al., "Soil Acidification and Liming Interactions with Nutrient and Heavy Metal Transformation and Bioavailability," *Advances in Agronomy*, 78:215-272, (2003).

Chien, et al., "Recent developments of fertilizer production and use to improve nutrient use efficiency and minimize environmental impacts," *Adv. Agro*, 102: 267, (2009).

Ciurli, et al., "Structural properties of the nickel ions in urease: novel insights into the catalytic and inhibition mechanisms," *Coord. Chem. Rev.*, 190-192: 331-355, (1999).

Hays, "Symposium on Controlled-Release Fertilizers," *J. Agri Food Chem.*, 19(5): 797-800, (1971).

Mahmood et al., "Effect of rate and application depth matrix-I calcium carbide based formulation on growth, yield and nitrogen uptake of wheat," *African Journal of Agricultural Research*, 6(30): 6363-6398, (2011).

Mahmood et al., "Nutritional and physiological response of wheat to soil applied matrix-I formulated calcium carbide with and without nitrogen fertilizer," *Pakistan Journal of Nutrition*, 11(2): 154-159, (2012).

Mahmood et al. "Calcium Carbide-Based Formulations cause Slow Release of Acetylene and Ethylene in Soil and Nitrification Inhibition," *Communications in Soil Science and Plant Analysis*, 45(17): 2277-2288, (2014).

Sinclair et al., "Radiation Use Efficiency," *Advances in Agronomy*, 65: 215-265, (1999).

Subbarao, et al., "Scope and Strategies for Regulation of Nitrification in Agricultural Systems—Challenges and Opportunities," *Crit. Rev. Plant Sci,*, 25(4): 303-335, (2006).

Al-Kanani et al., "Volatilization of ammonia from urea-ammonium nitrate solutions as influenced by organic and inorganic additives." *Fertilizer research* 1990, 23, 113-119.

Bose, et al., "New protocol for Biginelli reaction-a practical synthesis of Monastrol," *ARKIVOC*, 2005, 3:228-236.

Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

Gioacchini, et al., "Influence of urease and nitrification inhibitors on N losses from soils fertilized with urea," *Biology and Fertility of Soils*, 2002, 36(2):129-135.

International Preliminary Report on Patentability was issued in International Patent Application No. PCT/IB2015/050654, dated Aug. 2, 2016.

International Search Report and Written Opinion issued in counterpart International Application No. PCT/IB2015/053056, dated Sep. 23, 2015.

International Search Report and Written Opinion issued in International Patent Application No. PCT/182016/054271, dated Oct. 20, 2016.

International Search Report and Written Opinion issued in International Patent Application No. PCT/162015/050654, dated May 19, 2015.

International Search Report and Written opinion issued in International Application No. PCT/IB2018/052577, dated Aug. 1, 2018.

International Search Report and Written opinion issued in International Application No. PCT/IB2018/052578, dated Aug. 1, 2018.

International Search Report and Written opinion issued in International Application No. PCT/IB2018/055946, dated Dec. 3, 2018.

International Search Report and Written opinion issued in International Application No. PCT/IB2017/050683, dated Jun. 20, 2017.

International Search Report and Written opinion issued in International Application No. PCT/IB2018/052630, dated Aug. 9, 2018.

International Search Report and Written Opinion issued in International Patent Application No. PCT/IB2016/054270, dated Oct. 24, 2016.

(56) References Cited

OTHER PUBLICATIONS

International Search Report and Written Opinion issued in International Patent Application No. PCT/US2016/061486, dated Jan. 25, 2017.
International Search Report and Written Opinion issued in International Patent Application No. PCT/US2016/061487, dated Jan. 5, 2017.
Jarosiewicz & Tomaszewska, "Controlled-release NPK fertilizer encapsulated by polymeric membranes." *Journal of Agricultural and Food Chemistry*, 2003, 51(2):413-417.
Kawakami, et al., "Physiological and yield responses of field-grown cotton to application of urea with the urease inhibitor NBPT and the nitrification inhibitor DCD," *European Journal of Agronomy*, 2012, 43:147-154.
Lunt, et al., "Properties and Value of 1,1-Diureido Isobutane (IBDU) as a Long-Lasting Nitrogen Fertilizer," *J. Agr. Food Chem.*, 1969, 17(6):1269-1271.
Office Action and Search Report issued in Corresponding Taiwanese Patent Application No. 104114189, dated May 9, 2019.
Office Action issued in corresponding Chinese Patent Application No. 201580008733.2, dated Jan. 11, 2019. (Machine Translation Provided).
Office Action issued in corresponding Chinese Patent Application No. 2015800087332, dated Jun. 13, 2019.
Office Action issued in corresponding Chinese Patent Application No. 201680051745.8, dated Jul. 23, 2019.
Office Action issued in corresponding Indian Patent Application No. 201617028561, dated Jun. 18, 2019.
Office Action issued in corresponding Taiwanese Patent Application No. 105122936, dated Sep. 5, 2019.
Patra et al., "Use of urea coated with natural products to inhibit urea hydrolysis and nitrification in soil," *Biol. Fertil. Soils*, 2009, 45, 617-621.
Reddy, et al., New environmentally friendly solvent free syntehesis of dihydropyrimidinones catalysed by N-butyl-N, N-dimethyl-phenylethylammonium bromide, *Tetrahedron Letters*, 2003, 44:8173-8175.
Sanz-Cobena, et al., "Gaseous emissions of N2O and NO and NO3—leaching from urea applied with urease and nitrification inhibitors to a maize (*Zea mays*) crop," *Agriculture, Ecosystems & Environment*, 2012, 149:64-73.
Soares, et al., "Ammonia volatilization losses from surface-applied urea with urease and nitrification inhibitors," *Soil Biology and Biochemistry*, 2012, 52:82-89.
Trenkel, "Controlled-release and stabilized fertilizers in agriculture." *International fertilizer industry association*, 1997, 11:1-156.
Upadhyay,"Urease inhibitors: A review." *Indian Journal of Biotechnology* 2012, 11, 381-388.
Watson, et al., "Rate and mode of application of the urease inhibitor N-(n-butyl) thiophosphoric triamide on ammonia volatilization from surface-applied urea," *Soil Use and Management*, 2008, 24:246-253.
Wu, et al., "Guidelines for the Use of Fertilizers," *Chinese Agricultural Press*, 2000, 122-123. (English Translation).
Zaman, et al., "Effects of urease and nitrification inhibitors on the efficient use of urea for pastoral systems," *J. Soil Science and Plant Nutrition*, 2013, 59(4):649-659.
Zaman, et al., "Improving pasture growth and urea efficiency using N inhibitor, molybdenum and elemental Sulphur," *Journal of Soil Science and Plant Nutrition*, 2014, 14(1):245-257.
International Search Report and Written Opinion issued in International Patent Application No. PCT/IB2017/050683, dated Jun. 20, 2017.
Office Action issued in corresponding Chinese Patent Application No. 201680051728.4, dated Aug. 11, 2020.
Search Report issued in corresponding Chinese Patent Application No. 201680051728.4, dated Aug. 5, 2020.
Search Report issued in corresponding Chinese Patent Application No. 201680051745.8, dated Jul. 2, 2019.
Yixing, et al. "Application Technology of Novel Slow and Controlled Release Fertilizer," *China Three Gorges Press*, 2008, 1, pp. 90 and 92.
Yongkang, et al. "Modern Drying Technology," *Chemical Industry Press*, 2007, 1:719-722.
Azeem, et al. "Review on materials & methods to produce controlled release coated urea fertilizer," *Journal of Controlled Release*, 2014, 181:11-21.
Babu, et al. "Current Progress on bio-based polymers and their future trends," *Progress in Biomaterials*, 2013, 2:8.
Extended European Search Report issued in counterpart European Patent Application No. 20166713.6, dated Nov. 11, 2020.
Extended European Search Report issued in European Application No. 1686688.7, dated Jun. 13, 2019.
Lubkowski, "Coating Fertilizer Granules with Biodegradable Materials for Controlled Fertilizer Release," Environmental Engineering and Management Journal, 2014, 13:2573-2581.
Office Action issued in counterpart Chinese Patent Application No. 201680051745.8, dated Dec. 2, 2020.

* cited by examiner

| Crop | Soil pH | | | | |
|---|---|---|---|---|---|
| | 4.7 | 5 | 5.7 | 6.8 | 7.5 |
| | Relative Yield (100 is the best, 0 is the worst) | | | | |
| Corn | 34 | 73 | 83 | 100 | 85 |
| Wheat | 68 | 78 | 89 | 100 | 99 |
| Soybeans | 65 | 79 | 80 | 100 | 93 |
| Oats | 77 | 93 | 99 | 98 | 100 |
| Barley | 0 | 23 | 80 | 95 | 100 |
| Alfalfa | 2 | 9 | 42 | 100 | 100 |
| Timothy (grass) | 31 | 47 | 66 | 100 | 95 |

FIG. 12

FERTILIZER COMPOSITION AND METHODS OF MAKING AND USING SAME

CROSS-REFERENCE TO RELATED APPLICATIONS

This application is a national phase under 35 U.S.C. § 371 of International Application No. PCT/IB2016/054270, filed Jul. 18, 2016, which claims the benefit of priority to U.S. Provisional Application No. 62/194,589, filed Jul. 20, 2015, and U.S. Provisional Application No. 62/316,188, filed Mar. 31, 2016, the entire contents of each of which are hereby incorporated by reference in their entirety.

FIELD OF INVENTION

This disclosure relates to a fertilizer core particle and fertilizer granule comprising a binder, and a pH buffering agent, and methods for making such fertilizer granule.

BACKGROUND

Continuous use of fertilizers leads to loss of soil fertility and nutrient balance. To increase the crop yield and satisfy the growing need of increasing population, more fertilizers are being used. In addition, large application or usage of urea, its rapid hydrolysis and nitrification in the soil is causing deterioration of soil health and environmental issues such as greenhouse emissions and ground water contamination.

To improve the soil fertility, the farmers are applying micronutrient fertilizers and/or inhibitors in addition to the regular fertilizers. Because it is a separate application, there is a chance of over-application, under-application and misapplication (wrong time, wrong ratio etc.). Separate applications are also more laborious.

Thus, there is a need for an improved fertilizer granule with improved application properties. Such fertilizer granule and methods related thereto are disclosed herein.

SUMMARY OF THE INVENTION

In accordance with the present invention, disclosed herein is a fertilizer core particle having an outer surface and comprising one or more fertilizer additives, one or more binders, and one or more pH buffering agents, and wherein the fertilizer core particle comprises from about 10 wt % to about 99 wt % of the one or more binders.

Also disclosed herein is a fertilizer core particle having an outer surface and comprising one or more fertilizer additives, one or more binders, one or more viscoelasticity agents, and one or more pH buffering agents, wherein the fertilizer core particle comprises from about 10 wt % to about 99 wt % of the one or more binders, and wherein the fertilizer core particle comprises from more than 0 wt % to about 5 wt % of the one or more viscoelasticity agents.

Also disclosed herein is a fertilizer granule comprising the fertilizer core particle disclosed herein, wherein the fertilizer granule further comprises a first nitrogen containing fertilizer composition in contact with the outer surface of the fertilizer core particle.

Also disclosed herein is a composition comprising the fertilizer granule disclosed herein and a second nitrogen containing fertilizer composition.

Also disclosed herein is a composition comprising the fertilizer granule disclosed herein and a fertilizer composition.

Also disclosed herein is a composition comprising the fertilizer core particle disclosed herein and a second nitrogen containing fertilizer composition.

Also disclosed herein is a composition comprising the fertilizer core particle disclosed herein and a fertilizer composition.

Also disclosed herein is a kit comprising a) the fertilizer granule disclosed herein; and b) a second nitrogen containing fertilizer composition.

Also disclosed herein is a kit comprising a) the fertilizer granule disclosed herein; and b) a fertilizer composition.

Also disclosed herein is a kit comprising a) the fertilizer core particle disclosed herein; and b) a second nitrogen containing fertilizer composition.

Also disclosed herein is a kit comprising a) the fertilizer core particle disclosed herein; and b) a fertilizer composition.

Also disclosed herein is a system comprising an extruder capable of extruding a fertilizer core particle disclosed herein.

Also disclosed herein, is a method preparing a fertilizer core particle disclosed herein comprising the step of: a) extruding a mixture comprising one or more fertilizer additives, one or more binders, and one or more pH buffering agents, and wherein the mixture comprises from about 10 wt % to about 99 wt % of the one or more binders, thereby forming the fertilizer core particle.

Also disclosed herein is a method for preparing the fertilizer granule disclosed herein comprising the steps of: a) providing a core particle comprising one or more fertilizer additives, one or more binders, and one or more pH buffering agents, and wherein the core particle comprises from about 10 wt % to about 99 wt % of the one or more binders; and b) granulating the core particle with a nitrogen containing fertilizer composition, thereby forming a fertilizer granule.

Also disclosed herein is a method for increasing the amount of nitrogen in soil comprising the step of: a) applying to the soil an effective amount of the fertilizer granule disclosed herein, thereby increasing the amount of nitrogen in the soil.

Also disclosed herein is a system for forming a fertilizer granule comprising a granulator capable of granulating a core particle with at least one of nitrogen fertilizer to form a fertilizer granule, wherein the granulator comprising an inlet for feeding the core particle.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying Figures, which are incorporated in and constitute a part of this specification, illustrate several aspects and together with the description serve to explain the principles of the invention.

FIG. 10A shows the ammonium transformation and FIG. 10B shows the nitrate transformation.

FIG. 12 show relative yield of crops as a function of the pH in the soil.

Figure 1A:
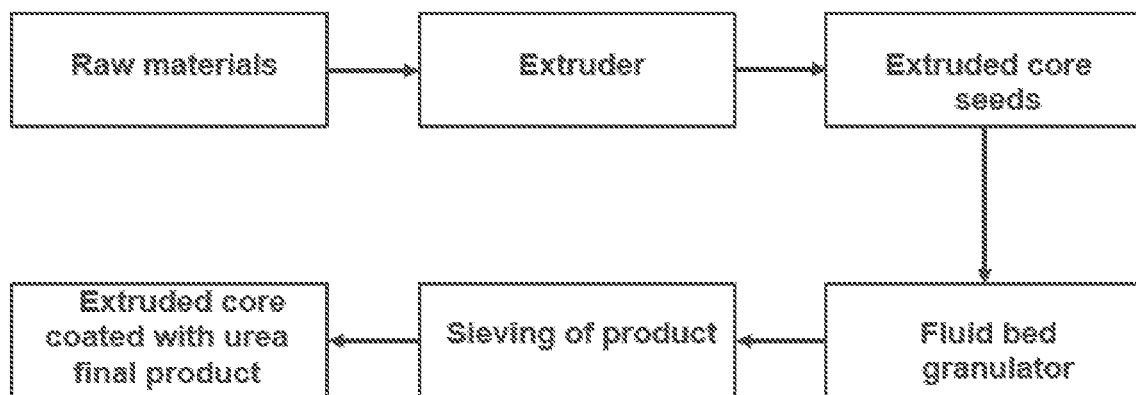
FIGS. 1A and 1B show general non-limiting schemes of the production of a fertilizer granule.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the examples included therein.

Before the present fertilizer compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. DEFINITIONS

As used herein, nomenclature for compounds and fertilizer compositions can be given using common names as well as names assigned by the International Union of Pure and Applied Chemistry (IUPAC), Chemical Abstracts Service (CAS) recommendations for nomenclature, and the *Manual for Determining the Physical Properties of Fertilizer*, hereby incorporated herein by reference. One of skill in the art can readily ascertain the structure of a compound and fertilizer composition if given a name by systemic reduction of the compound structure using naming conventions.

As used in the specification and the appended claims, the singular forms "a," "an," and "the" include plural referents unless the context clearly dictates otherwise.

As used herein, the term "other nitrogen fertilizer" refers to a fertilizer comprising one or more nitrogen atoms that is not urea. Non-limiting examples of other nitrogen fertilizers include ammonium nitrate, ammonium sulfate, diammonium phosphate (DAP), monoammonium phosphate (MAP), urea-formaldehyde, ammonium chloride, and potassium nitrate.

As used herein, the term "other biomaterial" as it relates to the filler refers to biomaterials that are biodegradable. Non-limiting examples of other biomaterials include rice husk, and dried distillers grains with solubles (DDGS).

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component denotes the weight relationship between the element or component and any other elements or components or article for which a part by weight is expressed. Thus, in a composition comprising two parts by weight of component X and five parts by weight component Y, X and Y are present at a weight ratio of 2:5 or 2/5 or 0.4, and are present in such ratio regardless of whether additional components are contained in the compound. Additionally, references in the specification and concluding claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

A weight percent (wt %) of a component, unless specifically stated to the contrary, is based on total weight of the formulation or composition in which the component is included.

As used herein, the terms "optional" or "optionally" means that a subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and number or type of embodiments described in the specification.

Disclosed are components to be used to prepare fertilizer compositions as well as the fertilizer compositions themselves to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular fertilizer composition is disclosed and discussed and a number of modifications that can be made to a number of compounds including the fertilizer compositions are discussed, specifically contemplated is each and every combination and permutation of the composition and modifications that are possible unless specifically indicated to the contrary. Thus, if a class of compounds A, B, and C are disclosed as well as a class of fertilizer compositions D, E, and F and an example of a fertilizer composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using fertilizer compositions. Thus, if there are a variety of additional steps that can be performed, it is understood that each of these additional steps can be performed with any specific embodiment or combination of embodiments of the methods of the invention.

As used herein, the term "abrasion resistance" means resistance to formation of dust and fines that result in granule-to-granule and granule-to-equipment contact. It is also useful for estimating material losses; handling, storage and application properties; and pollution control requirements. Abrasion resistance is determined by measuring the percentage of dust and fines created by subjecting a sample to abrasive-type action.

As used herein, the term "crushing strength" means minimum force required to crush an individual fertilizer granule. Crushing strength is useful in predicting the expected handling and storage properties of granular fertilizer compositions, as well as the pressure limits applied during bag and bulk storage. The crushing strength is measured by applying pressure to granules of a specified range and recording the pressure required to fracture them.

As used herein, the term "bulk density (loose)" means mass per unit volume of a material after it has been poured freely into a container under clearly specified conditions. Bulk density is a measure of the material density, material porosity, and voids between the particles of a material. Loose-pour density represents minimum density (greatest volume occupancy) expected from a given material.

As used herein, the term "critical relative humidity," abbreviated CRH, is the atmospheric humidity above which a fertilizer composition will absorb a significant amount of moisture and below which it will not absorb a significant amount of moisture. For every fertilizer composition, there is a maximum relative humidity to which it can be exposed without absorbing moisture from the air. This value also indicates a degree of protection required during handling. The procedure for determination of CRH involved exposure of a sample of a fertilizer composition of the present invention to progressively higher relative humidity in a variable humidity chamber. The lowest humidity that initiated significant moisture pickup determined by frequent weighing of the sample was the CRH.

As used herein, the term "hygroscopicity" means the degree to which a material will absorb moisture from the atmosphere. Hygroscopicity of fertilizer compositions can determine conditions under which bulk fertilizer can be stored and also flowability during handling and field application. Fertilizers vary in their ability to withstand physical deterioration, such as wetting and softening, when exposed to humidity. Even fertilizers with similar CRH values can behave differently as a result of differences in moisture holding capacity. Thus, CRH alone is not sufficient to determine hygroscopicity of a fertilizer composition. Accordingly, hygroscopocities of fertilizer compositions can be compared by imposing various periods of humid exposure on samples contained in completely filled, open-top glass cups. The hygroscopicity tests consisted of moisture absorption, which is rate of moisture pickup per unit of exposed surface; moisture penetration, which is depth of moisture penetration or visible wetting of the fertilizer; moisture holding capacity, which is amount of moisture that individual granules will absorb before allowing moisture to be transferred by capillary action to adjacent particles; and integrity of wetted granules, which is determined quantitatively by handling the top surface layer of a sample after it has been exposed to a humid atmosphere.

As used herein, the term "viscoelasticity agent" is known in the art and refers to a material that exhibits both viscous and elastic characteristics. For example, the viscoelasticity agent promotes a uniform flow behavior of a mixture when stress is applied to the mixture, such as, for example, the processing of the mixture in an extruder.

As used herein, the term "effective amount" refers to an amount that is sufficient to achieve the desired result or to have an effect on an undesired condition. For example, an "effective amount of the fertilizer granule to increase the amount of nitrogen in the soil" refers to an amount that is sufficient to achieve to increase the nitrogen content in the soil.

B. GENERAL

Disclosed herein is a fertilizer core particle and a fertilizer granule. The fertilizer core particle can be made by extrusion due to the selection of binder in the fertilizer core particle. For example, the binder is chosen such that it is amenable to various aspects of extrusion.

In some instances, the binders are receptive to a solvent, such as, for example water. "Receptive to the solvents" in this context means that the solvents will affect the binding properties of the binder. Accordingly, as described herein, an appropriate solvent will affect the binding properties of a particular binder, with each other, as well as other binders, fillers, excipients in the formulation. In particular instances, the binder is hygroscopic.

The fertilizer core particle and a fertilizer granule disclosed herein have desirable physical properties such as desired abrasion resistance, particle strength, pelletizability, hygroscopicity, particle shape, and size distribution, which are important properties for the fertilizer core particle. Accordingly, the binder is chosen to maximize these properties. The examples described elsewhere herein provide data for appropriate binders and their amounts, so that the resulting composition would be amenable to the extrusion process and would withstand the post-extrusion processes (e.g., granulation, coating and the like).

A particular application of embodiments disclosed herein is the stabilization of a fertilizer additive, present in the fertilizer core particle, such as, for example, stabilization of an inhibitor, such as, for example, N-(n-butyl) thiophosphoric triamide (NBTPT). Certain fertilizer additives are unstable and tend to degrade upon exposure to high temperatures, changing in pH (either acidic or basic) etc. In particular instances, the fertilizer core particle disclosed herein is embedded (or coated) within a fertilizer compositions, for example, within a nitrogen containing fertilizer composition, such as, for example, urea. In some instances, a shell that comprises a nitrogen containing fertilizer substantially surrounds at least a portion of the outer surface of the fertilizer core particles.

In conventional fertilizer technology, various fertilizer additives are mixed with a fertilizer using an "all in one" methodology. In these instances, fertilizer additives, excipients, other ingredients and fertilizer compositions are mixed together to form a fertilizer compositions, in the form of particles or granules. In most cases, granulation is performed at elevated temperatures such that the fertilizer composition is at a molten state. For example, the granulation temperature for molten urea is about 135° C. at about 35 atm pressure. Most of the fertilizer additives degrade, at least partially, under these conditions. Traditionally, these stability problems have been circumvented by using a large excess of fertilizer additives. Such methods, although in use, are sub-optimal and raises concerns regarding the cost, efficacy, by-products, environmental waste, and green-house gases etc.

The production of the fertilizer core particle disclosed herein provides, inter alia, a solution to the instability of the fertilizer additives at higher temperatures. The binder, excipient, and/or filler are chosen such that the resulting composition synergistically protects the fertilizer additives from high temperature degradation. As disclosed herein, the binder, excipient, and filler, can be mixed together with the fertilizer additive and extruded to form a fertilizer core particle.

In one aspect, no nitrogen fertilizer composition is present in the fertilizer core particle. Thus, in such instances, only the fertilizer additive (together with the binder, pH buffering agent, excipient, and/or filler) is present in within the fertilizer core particle.

Some of the fertilizer additives are unstable towards changing in the pH, either in the composition during the manufacturing process, or after application to the soil. For example, in the case of nitrogen containing fertilizers, after application, the soil environment becomes acidic. Accordingly, fertilizer additives that are sensitive to the acidic pH degrade and will not reach the full performance capacity. Including a large excess of fertilizer additives to compensate for the loss due to pH variations may not be successful, since the fertilizer composition, which presents in a large excess (in comparison to the fertilizer additives) continue to alter the pH of the soil environment. Also, commercial products, such as, SuperU®, uses organic solvents to, such as NMP. Such use is undesired. The use of such organic solvents is not needed in the production of the fertilizer core particle or fertilizer granule.

The fertilizer core particle disclosed herein comprises one or more pH buffering agents. These buffering agents prevent the pH-mediated degradation, especially, the acidic pH-mediated degradation of the fertilizer. For example, N-(n-butyl) thiophosphoric triamide (NBTPT), is unstable at acidic pH and at higher temperatures. In certain aspects disclosed herein, the fertilizer core particle is a formulation of that provides pH and thermal stability, for fertilizer additives, such as, for example, inhibitors, such as, for example, NBTPT.

The fertilizer core particle comprising a fertilizer additive can be used in combination with an appropriate fertilizer composition. For example, the core particles can be mixed with a nitrogen containing fertilizer composition (either granules or powder), and can be applied to the soil.

As described, the fertilizer core particles disclosed herein can be produced by an extrusion process. Accordingly, the mixture of materials that is used to produce the fertilizer core particles flows through an extruder during the manufacturing process. For large, industrial size, production, it is desired that the mixture of materials has continuous and uniform flow characteristics throughout the extrusion process. Accordingly, the rheological behavior of thixotropic materials in the mixture is critical. For example, the setting time of Plaster of Paris, which can be used as a binder, in some aspects, can negatively impact the rheological behavior of the mixture of materials. For example, improper pelletization can occur due to uneven flow characteristics of the mixture of materials. In addition, agglomeration of fertilizer core particles can be an issue during a continuous extrusion process. Accordingly, in some aspects, the mixture of materials and, in turn, the fertilizer core particles can comprise one or more viscoelasticity agents that promote the desired continuous and uniform flow characteristics of the mixture through the extruder during the extrusion process, such as in a continuous extrusion process. For example, improved continuous and uniform flow characteristics are observed when of one or more viscoelasticity agents are added to the composition when the binder comprises Plaster of Paris, such as a high amount of Plaster of Paris, as described herein.

In an alternative embodiment, the fertilizer core particle can be embedded within a fertilizer composition. For example, in some embodiments, a shell containing a fertilizer composition at least partially surrounds the outer surface of the fertilizer core particle. In some of these embodiments, the shell comprises a nitrogen containing fertilizer composition. In some cases, the nitrogen containing fertilizer composition is urea. In some instances, two or more core particles can be embedded within a matrix of a nitrogen containing fertilizer composition (e.g., urea).

The granulating or fattening of fertilizer particles of the same composition is a known technique. However, it is practically difficult the match the surface properties of the core particle with that of a heterogeneous composition. For example, as in some of the instances disclosed herein, forming a shell over a core particle comprising binders, fillers, fertilizer additives and other excipients, with a nitrogen containing fertilizer composition (e.g., urea) is problematic. The surface properties of the fertilizer core disclosed herein is appropriate for the granulation process.

Forming a shell that at least partially surrounds the fertilizer core particle produces a fertilizer granule. In some instances where the shell comprises a nitrogen containing fertilizer composition, such as, for example, a nitrogen containing fertilizer composition comprising urea.

In some instances, the urea granules can be used as a homogenous composition (i.e., comprising only the urea granules disclosed herein). They can also be used as a heterogeneous composition, i.e., mixed with other nitrogen containing fertilizers or other fertilizers (e.g., phosphorous or potassium containing fertilizers).

In one aspect, the fertilizer core particle disclosed herein comprises a urease inhibitor or a nitrification inhibitor or a combination thereof. In one aspect, the urease or nitrification inhibitor is included only in the fertilizer core particle. Thus, in one aspect, the shell only contains, in these instances, a nitrogen containing fertilizer composition, for example, urea.

In one aspect, the shell can further comprise a fertilizer additive as disclosed herein.

Some of the fertilizer core particles disclosed herein comprise Plaster of Paris as a binder, bleached wheat flour, one or more pH buffering agents, and NBTPT and dicyandiamide (DCD). Some of these fertilizer core particles are granulated with urea, forming a shell that substantially covers the outer surface of the fertilizer core particle. In some aspects, about 95 wt % of the fertilizer granule is the outer shell (e.g., urea) and about 5 wt % is the fertilizer core particle.

C. FERTILIZER COMPOSITIONS

Plants take up ammonium and other positively charged cations by releasing one hydrogen ion ($H^+$) into the medium solution for each ammonium ion absorbed. Over time, ammoniacal nitrogen uptake increases hydrogen ion concentration thereby lowering the growing medium pH. The uptake of negatively charged anions such as nitrate is most often accomplished by releasing hydroxide ions ($OH^-$). In the medium solution, hydroxide and hydrogen ions combine to form water. The ratio of nitrate to ammoniacal nitrogen in a fertilizer determines the rate of substrate pH change. The pH changing property is known as a fertilizer's potential acidity or basicity. Apart from fertilizer use and root activity, many other factors affect the pH of the soil including source and quality of water, soil type and soil minerals. However both acidic pH (<5.5) and basic pH (>8) can be detrimental to soil health and plant growth. Moreover, it was observed that most of the commercially used fertilizers illicit change in pH (mostly causes acidity) (*Advances in Agronomy*, 2001, 78, 215). It was observed that crop yield is directly correlated to pH. For example, for most crops, a range of 6 to 7.5 is best as shown in FIG. 12.

Urea is one of the most widely used fertilizers because of its high nitrogen content (46.6%). Unfortunately, urea has several drawbacks such as a) high water solubility that leads to leaching in the soil before plants can assimilate it, b) rapid hydrolysis by urease enzyme to form carbon dioxide and ammonia, c) an abrupt overall pH increase. Under ideal conditions, the urea hydrolyzed product, ammonia is converted to ammonium, ready for plant uptake. However, under less than ideal conditions (pH<6 or >8) the ammonia can be lost to the atmosphere, etc. (S. H. Chien., et al., *Adv. Agro.*, 2009, 102, 267). The ammonia that is produced from the urease catalyzed hydrolysis of urea further reacts with soil water to provide ammonium cation. Subsequently the ammonium cation gets oxidized biologically to nitrite and nitrate by *nitrosomonas* and *nitrobacter* bacteria. This process is known as nitrification. The conversion of a relatively immobile nitrogen form (ammonium) to a nitrogen that is highly mobile (nitrate) makes the soil nitrogen susceptible to losses through multiple pathways like, leaching of nitrate, gaseous losses of nitrogen in the form of $N_2$, $NO$, $N_2O$. Allison and Lundt have reported that as much as 75% of the nitrogen may be lost in area with high and intermittent precipitation (F. E. Allison, *Adv. Agro.*, 1955, 7, 213; J. T. Hays, *J. Agri. Food Chem.*, 1971, 19, 797). These adverse effects caused by application of urea leads to significant negative environmental and economic impact.

Different approaches have been proposed to reduce the nitrogen loss from fertilizers. One such approach is to encapsulate fertilizer granules with a material, which has low water permeability. Such encapsulated fertilizer granule would retard the release of fertilizer so that plants get more time for assimilation. The other possible approach would be to use urease and/or nitrification inhibitor that would slow down the activity of the particular enzyme or the microorganism. Both of these approaches have been extensively explored to develop enhanced efficiency fertilizers (S. H. Chien., et al., *Adv. Agro.*, 2009, 102, 267; F. E. Allison, *Adv. Agro.*, 1955, 7, 213; J. T. Hays, *J. Agri. Food Chem.*, 1971, 19, 797; S. Ciurli, et al., *Coord. Chem. Rev.*, 1999, 190-192, 331; G. V. Subbarao, et al., *Crit. Rev. Plant Sci.*, 2006, 25, 303)).

A number of urease and nitrification inhibitors have been developed to enhance the efficiency of fertilizer, but their application is very limited due to its stability in the soil at various conditions such as pH, temperature, precipitation, etc. For example, N-(n-butyl) thiophosphoric triamide (NBTPT) is known to be a good inhibitor of urease but it is unstable under acidic pH. NBTPT also decomposes when exposed to high temperatures, such as the temperature of a urea melt (about 135-140° C.). Likewise, dicyandiamide (DCD) is one of the commercially used nitrification inhibitors but it cannot be used in hot climatic region due to its thermal instability in the soil.

It is also known that nitrogen loss can be reduced when an inhibitor is applied with or within urea fertilizer. Agrotain® (NBTPT containing liquid-solution, which is coated on urea granules), for example is proved to prevent urease enzyme from breaking down urea for up to 14 days. In another study, granulated mixture of molten urea and inhibitor showed beneficial effect (U.S. Pat. No. 4,994,100 to Balser et al.). However, these techniques have not addressed the problem of thermal and/or pH sensitivity of the inhibitors. Similarly, SuperU® (NBTPT mixed with NMP as solvent before granulation) also does not protect the NBTPT from being exposed to and, therefore can degrade, the heat from a urea melt (about 135-140° C.).

To overcome these issues a fertilizer core particle is provided that is coated with an outer coating of urea that will first come in contact with the soil protecting the active ingredients, and the central particle will get released gradually. The fertilizer core particle contains both a binder and a pH buffering agent. The pH buffering agent, for example CaCO₃ (chalk powder (CP)) (mostly calcium carbonate), is a material that neutralize the acidity caused by urea hydrolysis, thereby preventing active agents, such as, for example, NBTPT, from degrading when placed in soil with an acidic pH. Thus, pH buffering agent increases the efficacy of active agents, such as, for example, NBTPT, and also maintains soil pH.

Balancing the pH of in the soil, by use of the fertilizer core particle and/or fertilizer granule disclosed herein, increases a plant's (crop's) ability to uptake required nutrients. The fertilizer core particle and fertilizer granule disclosed herein can also effectively be used to monitor the amount of ingredients applied to the soil, thereby preventing over or under fertilization.

The binder in the fertilizer core particle protects the active ingredient, for example NBTPT, from being exposed to high temperatures during the granulation process, thereby preventing NBTPT from decomposing in the granulation process. For example, Plaster of Paris (PoP) containing cores can prevent NBTPT degradation efficiently during the granulation process. In such a formulation, all active ingredients e.g., inhibitors, e.g. NBTPT, are protected inside the core by the PoP.

The outer coating, for example urea, first comes in contact with the soil protecting the active ingredients, and the ingredients in the central particle are released gradually. It is also possible for the active ingredient in the core to come in contact with the soil in a phased manner upon dissolution of outer urea shell.

Disclosed herein is a fertilizer core particle having an outer surface and comprising one or more fertilizer additives, one or more binders, and one or more pH buffering agents, and wherein the fertilizer core particle comprises from about 10 wt % to about 99 wt % of the one or more binders.

In one aspect, the fertilizer core particle is an extruded fertilizer core particle.

Also disclosed herein is a fertilizer granule comprising the fertilizer core particle disclosed herein, wherein the fertilizer granule further comprises a first nitrogen containing fertilizer composition in contact with the outer surface of the fertilizer core particle.

In one aspect, the fertilizer granule comprises two or more fertilizer core particles. In yet another aspect, the fertilizer granule comprises one fertilizer core particle. In yet another aspect, the fertilizer granule consists of one fertilizer core particle and a shell at least partially surrounding the fertilizer core particle. For example, one or more cores can be surrounded by a matrix of nitrogen containing fertilizers; in some instances, the surrounding matrix can be urea.

Also disclosed herein is a composition comprising the fertilizer granule disclosed herein and a second nitrogen containing fertilizer composition.

Also disclosed herein is a composition comprising the fertilizer granule disclosed herein and a fertilizer composition.

Also disclosed herein is a composition comprising the fertilizer core particle disclosed herein and a second nitrogen containing fertilizer composition.

Also disclosed herein is a composition comprising the fertilizer core particle disclosed herein and a fertilizer composition.

Also disclosed herein is a kit comprising a) the fertilizer granule disclosed herein; and b) a second nitrogen containing fertilizer composition.

Also disclosed herein is a kit comprising a) the fertilizer granule disclosed herein; and b) a fertilizer composition.

Also disclosed herein is a kit comprising a) the fertilizer core particle disclosed herein; and b) a second nitrogen containing fertilizer composition.

Also disclosed herein is a kit comprising a) the fertilizer core particle disclosed herein; and b) a containing fertilizer composition.

The fertilizer composition in the kit or composition with the fertilizer core particle or fertilizer granule can be any conventional fertilizer such as a fertilizer composition with a micronutrient, a primary nutrient, or a secondary nutrient, or combination thereof.

The one or more fertilizer additives can be mixed with the binder prior to extrusion. Such mixing can be done with a number of methods that are known in the art. For example, the mixing can be done by mechanically stirring the one or more fertilizer additives with the binder.

In one aspect, the one or more fertilizer additives are selected from an inhibitor, a micronutrient, a primary nutrient, or a secondary nutrient, or combination thereof. For example, the one or more fertilizer additives can comprise a micronutrient. In another example, the one or more fertilizer additives can comprise a primary nutrient. In yet another example, the one or more fertilizer additives can comprise an inhibitor. In yet another example, the one or more fertilizer additives can comprise a secondary nutrient. In yet another example, the one or more fertilizer additives can comprise a micronutrient and a secondary nutrient. In yet another example, the one or more fertilizer additives can comprise a micronutrient and a primary nutrient. In yet another example, the one or more fertilizer additives can comprise a micronutrient and an inhibitor. In yet another example, the one or more fertilizer additive comprises an inhibitor or a micronutrient and one or more additional fertilizer additives selected from an inhibitor, a micronutrient, a primary nutrient, or a secondary nutrient, or combination thereof. In yet another example, the one or more fertilizer additive comprises an inhibitor and a micronutrient and one or more additional fertilizer additives selected from an inhibitor, a micronutrient, a primary nutrient, or a secondary nutrient, or combination thereof.

In one aspect, the fertilizer core particle comprises from greater than 0 wt % to 90 wt % of the one or more fertilizer additives. For example, the fertilizer core particle can comprise from greater than 0 wt % to 70 wt % of the one or more fertilizer additives. In another example, the fertilizer core particle can comprise from greater than 0 wt % to 50 wt % of the one or more fertilizer additives. In yet another example, fertilizer core particle can comprise from greater than 0 wt % to 30 wt % of the one or more fertilizer additives. In yet another example, fertilizer core particle can comprise from greater than 0 wt % to 10 wt % of the one or more fertilizer additives. In yet another example, fertilizer core particle can comprise from greater than 0 wt % to 5 wt % of the one or more fertilizer additives. In yet another example, fertilizer core particle can comprise from 5 wt % to 70 wt % of the one or more fertilizer additives. In yet another example, fertilizer core particle can comprise from 5 wt % to 50 wt % of the one or more fertilizer additives. In yet another example, fertilizer core particle can comprise from 5 wt % to 30 wt % of the one or more fertilizer additives. In yet another example, fertilizer core particle can comprise from 10 wt % to 30 wt % of the one or more fertilizer additives. In yet another example, fertilizer core particle can comprise from 10 wt % to 50 wt % of the one or more fertilizer additives. In yet another example, fertilizer core particle can comprise from 30 wt % to 90 wt % of the one or more fertilizer additives. In yet another example, fertilizer core particle can comprise from 30 wt % to 70 wt % of the one or more fertilizer additives. In yet another example, fertilizer core particle can comprise from 30 wt % to 50 wt % of the one or more fertilizer additives.

Also disclosed herein is a fertilizer core particle comprising an inhibitor, a binder, and a pH buffering agent, wherein the inhibitor comprises N-(n-butyl) thiophosphoric triamide (NBTPT), 3,4-dimethylpyrazole phosphate (DMPP), thiourea (TU), dicyandiamide (DCD), phenyl phosphorodiamidate (PPDA), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof, and wherein the fertilizer core particle comprises from 10 wt % to 99 wt % of the binder.

Also disclosed herein is a fertilizer core particle comprising a urease inhibitor, a binder, and a pH buffering agent, wherein the fertilizer core particle comprises from 10 wt % to 99 wt % of the binder.

Also disclosed herein is a fertilizer core particle comprising a nitrification inhibitor, a binder, and a pH buffering agent, wherein the fertilizer core particle comprises from 10 wt % to 99 wt % of the binder.

Also disclosed herein is a fertilizer core particle comprising NBTPT, a binder, and a pH buffering agent, wherein the fertilizer core particle comprises from 10 wt % to 99 wt % of the binder.

Also disclosed herein is a fertilizer core particle comprising NBTPT and DCD, a binder, and a pH buffering agent, wherein the fertilizer core particle comprises from 10 wt % to 99 wt % of the binder.

Also disclosed herein is a fertilizer core particle comprising DCD, a binder, and a pH buffering agent, wherein the fertilizer core particle comprises from 10 wt % to 99 wt % of the binder.

The core can be produced via an extrusion process. The extrusion process can occur at a temperature from 0° C. to 150° C. The extrusion process can occur at a screw speed from 1 to 500 rpm.

In one aspect, the fertilizer granule comprises a fertilizer core particle disclosed herein and an outer shell comprising urea or first nitrogen containing fertilizer composition that at least partially surrounds the fertilizer core particle. In one aspect, the outer shell comprises urea. In another aspect, the outer shell substantially consists of urea. In yet another aspect, the outer shell consists of urea. In one aspect, the outer shell substantially surrounds the core. In another aspect, the outer shell fully surrounds the core. An outer shell is a shell that is "outer" in relation to the core. It is appreciated that another an outer shell can be further covered with another material (layer) and, thus, would not be the most outer layer of the fertilizer granule.

The fertilizer core particle can be fattened with urea or other nitrogen fertilizer or combination thereof to produce the fertilizer granule. Such process, producing the fertilizer granule, can be achieved via a granulation process, wherein molten urea is sprayed onto the fertilizer core particle.

In one aspect, the fertilizer granule comprises from 50 wt % to 99 wt % of the outer shell. For example, the fertilizer granule can comprises from 50 wt % to 95 wt % of the outer shell. In another example, the fertilizer granule comprises from 50 wt % to 70 wt % of the outer shell. In another example, the fertilizer granule comprises from 70 wt % to 99 wt % of the outer shell. In another example, the fertilizer granule comprises from 85 wt % to 99 wt % of the outer shell. In another example, the fertilizer granule comprises from 90 wt % to 99 wt % of the outer shell. In another example, the fertilizer granule comprises from 93 wt % to 97 wt % of the outer shell. In another example, the fertilizer granule comprises about 95 wt % of the outer shell.

In one aspect, the fertilizer core particle comprises an inhibitor and a micronutrient. In another aspect, the fertilizer core particle comprises an inhibitor. In yet another aspect, the core comprises a micronutrient. In yet another aspect, the fertilizer core particle comprises an inhibitor and not a micronutrient. In yet another aspect, the fertilizer core particle comprises a micronutrient and not an inhibitor.

In one aspect, the fertilizer core particle further comprises urea or other nitrogen fertilizer or a combination thereof. For example, the fertilizer core particle can comprise urea.

In one aspect, the fertilizer core particle further comprises a filler.

In one aspect, the fertilizer core particle has a size from 0.7 mm to 2.0 mm. For example, the fertilizer core particle can have a size from 0.9 mm to 1.5 mm. The fertilizer core particle can have a substantial spherical shape. The substantial spherical shape results from spheronization of the core once produced as cylinders from the extrusion process.

In one aspect, the fertilizer granule can have any shape. For example, the fertilizer granule can have a spherical, puck, oval, or oblong shape.

In one aspect, the fertilizer granule has a longest dimension from about 1.5 mm to about 8.0 mm. For example, the fertilizer granule can have a longest dimension from about 2.0 mm to about 4.0 mm.

In one aspect, the fertilizer core particle comprises from greater than 0 wt % to 4.0 wt % of moisture content. For example, the fertilizer core particle can comprise from greater than 0 wt % to 0.5 wt % of moisture content, or from 1 wt % to 3 wt % of moisture content.

In one aspect, the fertilizer core particle has a crush strength of at least 1 kg/granule. For example, the fertilizer core particle can have a crush strength of at least 2 kg/granule. In another example, the fertilizer core particle can have a crush strength of at least 5 kg/granule. In yet another example, the fertilizer core particle can have a crush strength of at least 9 kg/granule. In yet another example, the fertilizer core particle can have a crush strength from 1 kg/granule to 15 kg/granule, such as a crush strength from 2 kg/granule to 9 kg/granule.

In one aspect, the fertilizer core particle or the fertilizer granule does not comprise calcium cyanamide.

In one aspect, the fertilizer additive is dispersed throughout the core. In another aspect, the fertilizer additive is dispersed homogeneously throughout the core.

The fertilizer core particle and fertilizer granule disclosed herein has advantageous properties as compared to conventional fertilizer. For example, the fertilizer core particle and fertilizer granule can include a combination of components, each of which serves a different purpose, but which are administered together as a single composition and application. In contrast, many currently-available products only serves one purpose must be administered together in conjunction with other products in a separate application and according to different schedules. Accordingly, the multi-function of the disclosed fertilizer core particle and fertilizer granule provides for fewer and easier applications as compared to conventional products.

Figure 1B:
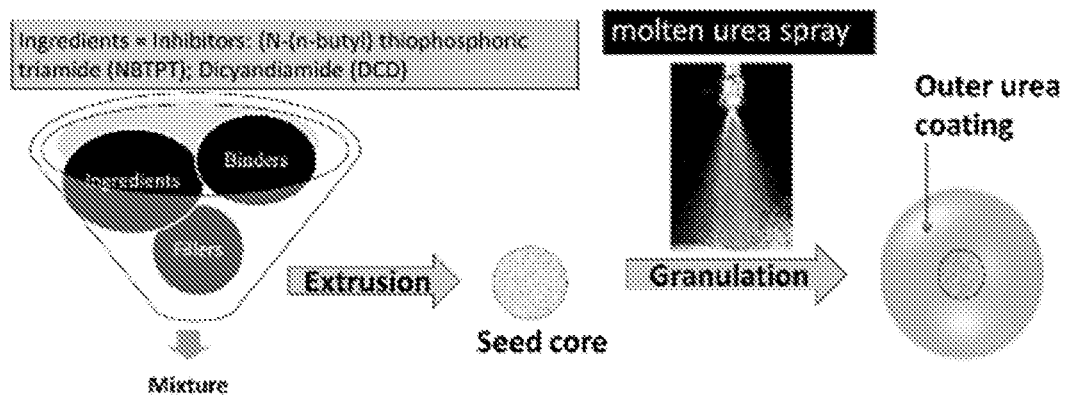
Figure 2:
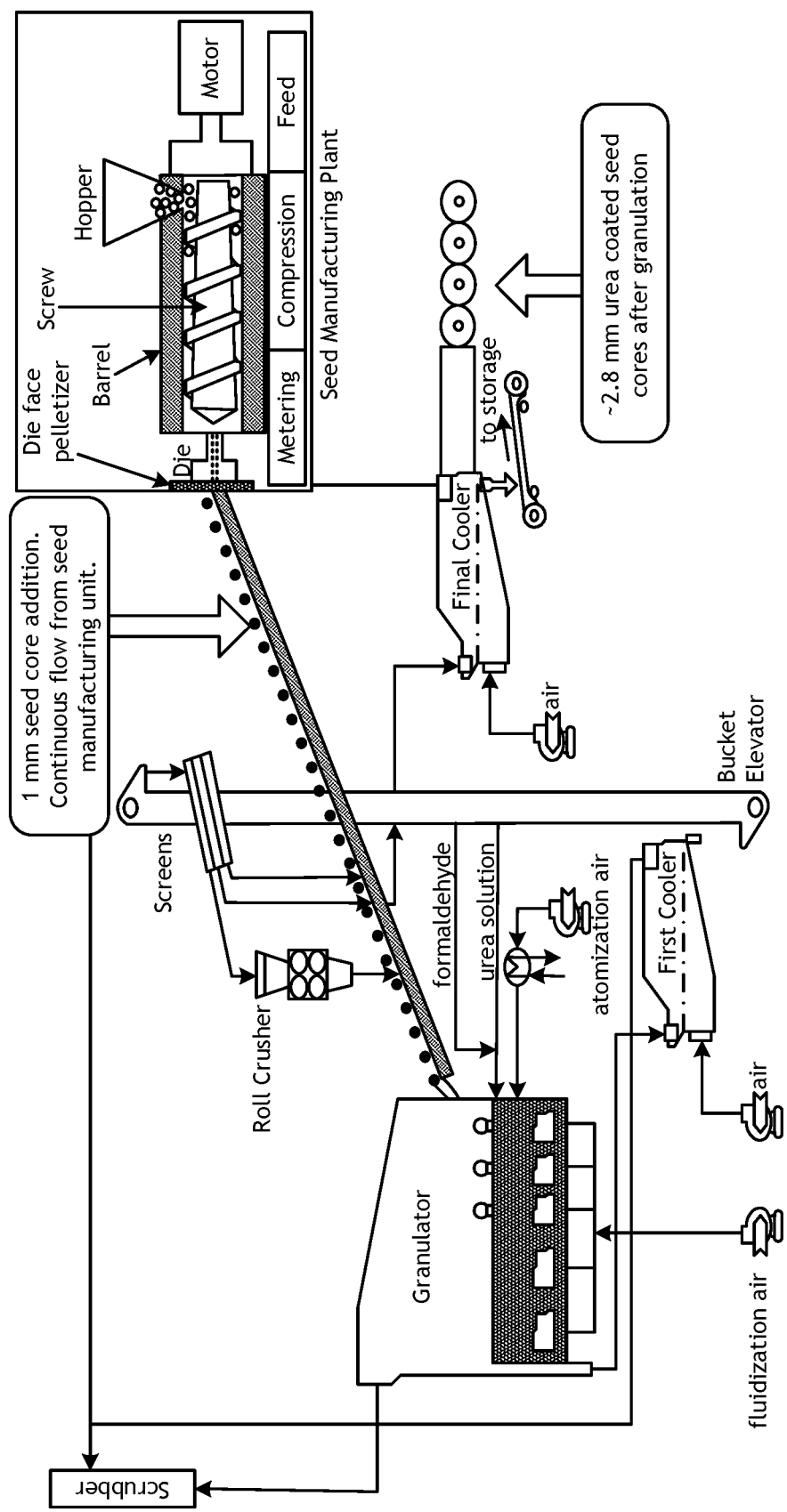
FIG. 2 shows an exemplary non-limiting system for producing a fertilizer granule.

A non-limiting general process for producing the fertilizer core particle and fertilizer granule disclosed herein is shown in FIG. 1A. A non-limiting general process for producing the fertilizer granule disclosed herein is shown in FIG. 1B. An exemplary non-limiting system for producing the fertilizer granule is shown in FIG. 2.

1. Binder

A binder is a material that is used to bind together components in a mixture through adhesive and cohesive forces.

In one aspect, the binder is an extrudable binder.

The fertilizer core particle comprises from 10 wt % to 99 wt % of the binder. The binder is selected to so that an extrusion process can be used during the production of the core. It is understood that for some binders, such as Plaster of Paris (PoP) and bleached wheat flour, an amount of water (moisture) is needed to make the core extrudable. Any moisture present in the core material during the extrusion process is typically removed post-extrusion. However, residual amounts of moisture, typically below 4 wt %, such as, for example, below 0.5 wt %, can be present in the fertilizer core particle.

In one aspect, the fertilizer core particle comprises from 20 wt % to 99 wt % of the binder. In another aspect, the fertilizer core particle comprises from 30 wt % to 99 wt % of the binder. In yet another aspect, the fertilizer core particle comprises from 40 wt % to 99 wt % of the binder. In yet another aspect, the fertilizer core particle comprises from 50 wt % to 99 wt % of the binder. In yet another aspect, the fertilizer core particle comprises from 60 wt % to 99 wt % of the binder. In yet another aspect, the fertilizer core particle comprises from 70 wt % to 99 wt % of the binder. In yet another aspect, the fertilizer core particle comprises from 80 wt % to 99 wt % of the binder. In yet another aspect, the fertilizer core particle comprises from 90 wt % to 99 wt % of the binder. In yet another aspect, the fertilizer core particle comprises from 60 wt % to 95 wt % of the binder.

In one aspect, the fertilizer core particle comprises from 10 wt % to 90 wt % of the binder. In one aspect, the fertilizer core particle comprises from 20 wt % to 90 wt % of the binder. In another aspect, the fertilizer core particle comprises from 30 wt % to 90 wt % of the binder. In yet another aspect, the fertilizer core particle comprises from 40 wt % to 90 wt % of the binder. In yet another aspect, the fertilizer core particle comprises from 50 wt % to 90 wt % of the binder. In yet another aspect, the fertilizer core particle comprises from 60 wt % to 90 wt % of the binder. In yet another aspect, the fertilizer core particle comprises from 70 wt % to 90 wt % of the binder. In yet another aspect, the fertilizer core particle comprises from 80 wt % to 90 wt % of the binder.

In one aspect, the fertilizer core particle comprises from 10 wt % to 85 wt % of the binder. In one aspect, the fertilizer core particle comprises from 20 wt % to 85 wt % of the binder. In another aspect, the fertilizer core particle comprises from 30 wt % to 85 wt % of the binder. In yet another aspect, the fertilizer core particle comprises from 40 wt % to 85 wt % of the binder. In yet another aspect, the fertilizer core particle comprises from 50 wt % to 85 wt % of the binder. In yet another aspect, the fertilizer core particle comprises from 60 wt % to 85 wt % of the binder. In yet another aspect, the fertilizer core particle comprises from 75 wt % to 85 wt % of the binder. In yet another aspect, the fertilizer core particle comprises from 70 wt % to 85 wt % of the binder.

In one aspect, the fertilizer core particle comprises from 10 wt % to 80 wt % of the binder. In one aspect, the fertilizer core particle comprises from 20 wt % to 80 wt % of the binder. In another aspect, the fertilizer core particle comprises from 30 wt % to 80 wt % of the binder. In yet another aspect, the fertilizer core particle comprises from 40 wt % to 80 wt % of the binder. In yet another aspect, the fertilizer core particle comprises from 50 wt % to 80 wt % of the binder. In yet another aspect, the fertilizer core particle comprises from 60 wt % to 80 wt % of the binder. In yet another aspect, the fertilizer core particle comprises from 70 wt % to 80 wt % of the binder.

In one aspect, the fertilizer core particle comprises from 10 wt % to 75 wt % of the binder. In one aspect, the fertilizer core particle comprises from 20 wt % to 75 wt % of the binder. In another aspect, the fertilizer core particle comprises from 30 wt % to 75 wt % of the binder. In yet another aspect, the fertilizer core particle comprises from 40 wt % to 75 wt % of the binder. In yet another aspect, the fertilizer core particle comprises from 50 wt % to 75 wt % of the binder. In yet another aspect, the fertilizer core particle comprises from 60 wt % to 75 wt % of the binder.

In one aspect, the fertilizer core particle comprises from 10 wt % to 70 wt % of the binder. In one aspect, the fertilizer core particle comprises from 20 wt % to 70 wt % of the binder. In another aspect, the fertilizer core particle comprises from 30 wt % to 70 wt % of the binder. In yet another aspect, the fertilizer core particle comprises from 40 wt % to 70 wt % of the binder. In yet another aspect, the fertilizer core particle comprises from 50 wt % to 70 wt % of the binder. In yet another aspect, the fertilizer core particle comprises from 60 wt % to 70 wt % of the binder.

In one aspect, the fertilizer core particle comprises from 10 wt % to 65 wt % of the binder. In one aspect, the fertilizer core particle comprises from 20 wt % to 65 wt % of the binder. In another aspect, the fertilizer core particle comprises from 30 wt % to 65 wt % of the binder. In yet another aspect, the fertilizer core particle comprises from 40 wt % to 65 wt % of the binder. In yet another aspect, the fertilizer core particle comprises from 50 wt % to 65 wt % of the binder.

In one aspect, the fertilizer core particle comprises from 10 wt % to 60 wt % of the binder. In one aspect, the fertilizer core particle comprises from 20 wt % to 60 wt % of the binder. In another aspect, the fertilizer core particle comprises from 30 wt % to 60 wt % of the binder. In yet another aspect, the fertilizer core particle comprises from 40 wt % to 60 wt % of the binder. In yet another aspect, the fertilizer core particle comprises from 50 wt % to 60 wt % of the binder.

In one aspect, the fertilizer core particle comprises from 20 wt % to 50 wt % of the binder. In one aspect, the fertilizer core particle comprises from 20 wt % to 40 wt % of the binder.

In one aspect, the fertilizer core particle comprises about 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt %, 51 wt % 52 wt %, 53 wt %, 54 wt %, 55 wt %, 56 wt %, 57, wt %, 58 wt %, 59 wt %, 60 wt %, 61 wt % 62 wt %, 63 wt %, 64 wt %, 65 wt %, 66 wt %, 67, wt %, 68 wt %, 69 wt %, 70 wt %, 71 wt % 72 wt %, 73 wt %, 74 wt %, 75 wt %, 76 wt %, 77, wt %, 78 wt %, 79 wt %, 80 wt %, 81 wt % 82 wt %, 83 wt %, 84 wt %, 85 wt %, 86 wt %, 87, wt %, 88 wt %, 89 wt %, 90 wt %, 91 wt % 92 wt %, 93 wt %, 94 wt %, 95 wt %, 96 wt %, 97, wt %, 98 wt %, or 99 wt % of the binder.

In one aspect the binder comprises a phosphate, a polyphosphate, a biodegradable polymer, or a wax, or a combination thereof. For example, the binder can comprise a wax. Suitable waxes include, but are not limited to, vegetable waxes, high melt waxes, ethylene bis(stearamide) wax, paraffin waxes, polyethylene based waxes, and olefin waxes. In another example, the binder can comprise a phosphate. Suitable phosphates include, but are not limited to, diammonium phosphate, and monoammonium phosphate. In yet another example, the binder can comprise a polyphosphate. Suitable polyphosphates include, but are not limited to, ammonium polyphosphate. In yet another example, the binder can comprise a biodegradable polymer. Suitable biodegradable polymers include, but are not limited to, polyacrylamide, polyacrylic acid, polyacrylonitrile; biodegradable polylactic acid and other biodegradable polymeric material such as polylactic acid, poly(3-hydroxypropionic acid), polyvinyl alcohol, poly e-caprolactone, poly L-lactide, poly butylene succinate and biodegradable starch based polymers.

In another aspect, the binder comprises polymers of, copolymers of, or blends of ethylene, propylene, acrylamide, acrylic acid, acrylonitrile, lactic acid, 3-hydroxy propionic acid, vinyl alcohol, lactide, or butylene succinate, or a combination thereof. For example, the binder can comprise polymers of ethylene, propylene, acrylamide, acrylic acid, acrylonitrile, lactic acid, 3-hydroxy propionic acid, vinyl alcohol, lactide, or butylene succinate, or a combination thereof, such as, for example, homopolymers of ethylene, propylene, acrylamide, acrylic acid, acrylonitrile, lactic acid, 3-hydroxy propionic acid, vinyl alcohol, lactide, or butylene succinate. In another example, the binder can comprise a blend of polymers of ethylene, propylene, acrylamide, acrylic acid, acrylonitrile, lactic acid, 3-hydroxy propionic acid, vinyl alcohol, lactide, or butylene succinate, or a combination thereof, such as for example, a blend of homopolymers of ethylene, propylene, acrylamide, acrylic acid, acrylonitrile, lactic acid, 3-hydroxy propionic acid, vinyl alcohol, lactide, or butylene succinate. In another example, the binder can comprise co-polymers of ethylene, propylene, acrylamide, acrylic acid, acrylonitrile, lactic acid, 3-hydroxy propionic acid, vinyl alcohol, lactide, or butylene succinate, or a combination thereof.

In another aspect, the binder comprises Plaster of Paris, flour, starch, or gluten, or combination thereof. For example, the binder can comprise Plaster of Paris. In another example, the binder can comprise flour. Suitable flours include, but are not limited to, rice flour, wheat flour, and bleached wheat flour. In yet another example, the binder can comprise starch. Suitable starches include, but are not limited to, dextrin modified starches. In yet another example, the binder can comprise gluten. In yet another example, the binder can comprise Plaster of Paris and flour comprising bleached wheat flour.

In one aspect, the fertilizer core particle comprises from about 20 wt % to about 50 wt % of Plaster of Paris. In another aspect, the fertilizer core particle comprises from about 20 wt % to about 60 wt % of Plaster of Paris. In another aspect, the fertilizer core particle comprises from about 40 wt % to about 60 wt % of Plaster of Paris. For example, the fertilizer core particle can comprise from about 30 wt % to about 48 wt % of Plaster of Paris. In one aspect, the fertilizer core particle comprises about 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of Plaster of Paris.

In one aspect, the fertilizer core particle comprises from more than 0 wt % to about 40 wt % of bleached wheat flour. In another aspect, the fertilizer core particle comprises from about 5 wt % to about 40 wt % of bleached wheat flour. For example, the fertilizer core particle can comprise from about 23 wt % to about 32 wt % of bleached wheat flour. In another example, the fertilizer core particle comprises from more than 0 wt % to about 10 wt % of bleached wheat flour. In yet another example, the fertilizer core particle comprises from more than 2 wt % to about 10 wt % of bleached wheat flour. In one aspect, the fertilizer core particle comprises about 1 wt %, 2 wt %, 3 wt %, 4 wt %, 5 wt %, 6 wt %, 7, wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, of bleached wheat flour, or any wt % between such values.

In one aspect, the fertilizer core particle comprises from 20 wt % to 50 wt % of Plaster of Paris and from 5 wt % to 40 wt % of flour comprising bleached wheat flour. For example, the fertilizer core particle can comprise from about 34 wt % to about 48 wt % of Plaster of Paris and from about 20 wt % to about 32 wt % of bleached wheat flour.

In one aspect, the fertilizer core particle comprises from 40 wt % to 60 wt % of Plaster of Paris and from more than 0 wt % to 10 wt % of flour comprising bleached wheat flour. For example, the fertilizer core particle can comprise from 40 wt % to 60 wt % of Plaster of Paris and from about 5 wt % to about 10 wt % of flour comprising bleached wheat flour.

In one aspect, the fertilizer core particle comprises from 20 wt % to 40 wt % of Plaster of Paris and from more than 0 wt % to 10 wt % of flour comprising bleached wheat flour. For example, the fertilizer core particle can comprise from 40 wt % to 30 wt % of Plaster of Paris and from about 2 wt % to about 10 wt % of flour comprising bleached wheat flour.

2. Inhibitor

The fertilizer core particle can comprise an inhibitor. The inhibitor is a urease and/or nitrification inhibitor. Such inhibitors are known to one skilled in the art.

In one aspect, the fertilizer core particle can comprise one or more inhibitors. The inhibitor can be a urease inhibitor or a nitrification inhibitor, or a combination thereof. In one aspect, the fertilizer core particle can comprise a urease inhibitor and a nitrification inhibitor. In one aspect, the inhibitor can be a urease inhibitor. Suitable urease inhibitors include, but are not limited to, NBTPT and PPDA. In one aspect, urease inhibitor can comprise NBTPT or PPDA, or a combination thereof. For example, the urease inhibitor can be selected from the group consisting of NBTPT and PPDA, or a combination thereof. In another aspect, the inhibitor can be a nitrification inhibitor. Suitable nitrification inhibitors include, but are not limited to, DMPP, DCD, TU, Nitrapyrin, Terrazole, AM, MBT and ST. In one aspect, the fertilizer core particle can comprise a urease inhibitor and a nitrification inhibitor. In one aspect, nitrification inhibitor can comprise DMPP, DCD, TU, Nitrapyrin, Terrazole, AM, MBT or ST, or a combination thereof. For example, the nitrification inhibitor can be selected form the group consisting of DMPP, DCD, TU, Nitrapyrin, Terrazole, AM, MBT and ST, or a combination thereof. In one aspect, the inhibitor can comprise NBTPT, DMPP, TU, DCD, PPDA, Nitrapyrin, Terrazole, AM, MBT, or ST or a combination thereof. For example, the inhibitor can comprise NBTPT. In another example, the inhibitor can comprise DMPP. In yet another example, the inhibitor can comprise TU. In yet another example, the inhibitor can comprise DCD. In yet another example, the inhibitor can comprise PPDA. In yet another example, the inhibitor can comprise Nitrapyrin. In yet another example, the inhibitor can comprise Terrazole. In yet another example, the inhibitor can comprise AM. In yet another example, the inhibitor can comprise MBT. In yet another example, the inhibitor can comprise ST. In yet another example, the inhibitor can comprise any combination of NBTPT, DMPP, TU, DCD, PPDA, Nitrapyrin, Terrazole, AM, MBT, and ST. For example, the inhibitor can comprise NBTPT and DCD. In yet another example, the inhibitor can comprise PPDA and DCD. In yet another example, the inhibitor can comprise NBTPT and DMPP. In some of the instances where the fertilizer core particle comprises at least one of a urease inhibitor and a nitrification inhibitors, the urease inhibitors are selected from the group consisting of N-(n-butyl) thiophosphoric triamide (NBTPT), phenyl phosphorodiamidate (PPDA), and combinations thereof, and the nitrification inhibitor is selected from the group consisting of 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), 2-Sulfanimalamidothiazole (ST), and combinations thereof.

In one aspect, the fertilizer core particle comprises from greater than 0 wt % to about 80 wt % of the inhibitor. In another aspect, the fertilizer core particle comprises from about 10 wt % to about 80 wt % of the inhibitor. In another aspect, the fertilizer core particle comprises from about 15 wt % to about 80 wt % of the inhibitor. In yet another aspect, the fertilizer core particle comprises from about 10 wt % to about 50 wt % of the inhibitor. In yet another aspect, the fertilizer core particle comprises from about 15 wt % to about 50 wt % of the inhibitor. In yet another aspect, the fertilizer core particle comprises from about 15 wt % to about 45 wt % of the inhibitor. In one aspect, the fertilizer core particle comprises from greater than 0 wt % to about 54 wt % of the inhibitor. In another aspect, the fertilizer core particle comprises from greater than 0 wt % to about 45 wt % of the inhibitor. In yet another aspect, the fertilizer core particle comprises from greater than 0 wt % to about 35 wt % of the inhibitor. In yet another aspect, the fertilizer core particle comprises from greater than 0 wt % to about 30 wt % of the inhibitor. In yet another aspect, the fertilizer core particle comprises from greater than 0 wt % to about 25 wt % of the inhibitor. In yet another aspect, the fertilizer core particle comprises from greater than 0 wt % to about 20 wt % of the inhibitor. In yet another aspect, the fertilizer core particle comprises from 10 wt % to about 35 wt % of the inhibitor. In yet another aspect, the fertilizer core particle comprises from 10 wt % to about 30 wt % of the inhibitor.

In one aspect, the fertilizer core particle comprises from greater than 0 wt % to about 20 wt % of a urease inhibitor. In another aspect, the fertilizer core particle comprises from greater than 0 wt % to about 15 wt % of a urease inhibitor. In another aspect, the fertilizer core particle comprises from greater than 0 wt % to about 10 wt % of a urease inhibitor. In yet another aspect, the fertilizer core particle comprises from greater than 0 wt % to about 5 wt % of a urease inhibitor. In yet another aspect, the fertilizer core particle comprises from greater than 0 wt % to about 3 wt % of a urease inhibitor. In yet another aspect, the fertilizer core particle comprises from greater than 0 wt % to about 2 wt % of a urease inhibitor. In yet another aspect, the fertilizer core particle comprises from 1 wt % to about 2 wt % of a urease inhibitor. In one aspect, the fertilizer core particle comprises about 0.5 wt %, 1 wt %, 2 wt %, 3 wt %, 4 wt %, 5 wt %, 6 wt %, 7 wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt % of a urease inhibitor.

In one aspect, the fertilizer core particle comprises from greater than 0 wt % to about 20 wt % of NBTPT. In another aspect, the fertilizer core particle comprises from greater than 0 wt % to about 15 wt % of NBTPT. In another aspect, the fertilizer core particle comprises from greater than 0 wt % to about 10 wt % of NBTPT. In yet another aspect, the fertilizer core particle comprises from greater than 0 wt % to about 5 wt % of NBTPT. In yet another aspect, the fertilizer core particle comprises from greater than 0 wt % to about 3 wt % of NBTPT. In yet another aspect, the fertilizer core particle comprises from greater than 0 wt % to about 2 wt % of NBTPT. In yet another aspect, the fertilizer core particle comprises from 1 wt % to about 2 wt % of NBTPT. In one aspect, the fertilizer core particle comprises about 0.5 wt %, 1 wt %, 2 wt %, 3 wt %, 4 wt %, 5 wt %, 6 wt %, 7 wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt % of NBTPT.

In one aspect, the fertilizer core particle comprises from about 10 wt % to about 50 wt % of a nitrification inhibitor. In another aspect, the fertilizer core particle comprises from about 15 wt % to about 45 wt % of a nitrification inhibitor. In another aspect, the fertilizer core particle comprises from about 18 wt % to about 42 wt % of a nitrification inhibitor. In yet another aspect, the fertilizer core particle comprises from about 30 wt % to about 50 wt % of a nitrification inhibitor. In yet another aspect, the fertilizer core particle comprises from about 35 wt % to about 45 wt % of a nitrification inhibitor. In yet another aspect, the fertilizer core particle comprises from about 10 wt % to about 30 wt % of a nitrification inhibitor. In yet another aspect, the fertilizer core particle comprises from about 15 wt % to about 25 wt % of a nitrification inhibitor. In one aspect, the fertilizer core particle comprises about 10 wt %, 11 wt % 12 wt %, 13 wt %, 14 wt %, 15 wt %, 16 wt %, 17, wt %, 18 wt %, 19 wt %, 20 wt %, 21 wt %22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of a nitrification inhibitor.

In one aspect, the fertilizer core particle comprises from about 10 wt % to about 50 wt % of DCD. In another aspect, the fertilizer core particle comprises from about 10 wt % to about 45 wt % of DCD. In another aspect, the fertilizer core particle comprises from about 18 wt % to about 42 wt % of DCD. In yet another aspect, the fertilizer core particle comprises from about 20 wt % to about 30 wt % of DCD. In yet another aspect, the fertilizer core particle comprises from about 30 wt % to about 50 wt % of DCD. In yet another aspect, the fertilizer core particle comprises from about 35 wt % to about 45 wt % of DCD. In yet another aspect, the fertilizer core particle comprises from about 10 wt % to about 30 wt % of DCD. In yet another aspect, the fertilizer core particle comprises from about 15 wt % to about 25 wt % of DCD. In one aspect, the fertilizer core particle comprises about 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of DCD.

In one aspect, the fertilizer core particle comprises from greater than 0 wt % to about 20 wt % of a urease inhibitor and from about 10 wt % to about 50 wt % of a nitrification inhibitor. In another aspect, the fertilizer core particle comprises from greater than 0 wt % to about 5 wt % of a urease inhibitor and from about 10 wt % to about 30 wt % of a nitrification inhibitor. In another aspect, the fertilizer core particle comprises from greater than 0 wt % to about 5 wt % of a urease inhibitor and from about 30 wt % to about 50 wt % of a nitrification inhibitor. In yet another aspect, the fertilizer core particle comprises from greater than 0 wt % to about 2 wt % of a urease inhibitor and from about 35 wt % to about 45 wt % of a nitrification inhibitor. In yet another aspect, the fertilizer core particle comprises from greater than 0 wt % to about 2 wt % of a urease inhibitor and from about 15 wt % to about 25 wt % of a nitrification inhibitor.

In one aspect, the fertilizer core particle comprises from greater than 0 wt % to about 20 wt % of NBTPT and from about 10 wt % to about 50 wt % of DCD. In another aspect, the fertilizer core particle comprises from greater than 0 wt % to about 5 wt % of NBTPT and from about 10 wt % to about 30 wt % of DCD. In another aspect, the fertilizer core particle comprises from greater than 0 wt % to about 5 wt % of NBTPT and from about 30 wt % to about 50 wt % of DCD. In yet another aspect, the fertilizer core particle comprises from greater than 0 wt % to about 5 wt % of NBTPT and from about 20 wt % to about 30 wt % of DCD. In yet another aspect, the fertilizer core particle comprises from 1 wt % to about 5 wt % of NBTPT and from about 20 wt % to about 30 wt % of DCD. In yet another aspect, the fertilizer core particle comprises from greater than 0 wt % to about 2 wt % of NBTPT and from about 35 wt % to about 45 wt % of DCD. In yet another aspect, the fertilizer core particle comprises from greater than 0 wt % to about 2 wt % of NBTPT and from about 15 wt % to about 25 wt % of DCD.

In one aspect, the fertilizer core particle comprises from about 20 wt % to about 90 wt % of the binder and from about 80 wt % to about 10 wt % of the inhibitor. In another aspect, the fertilizer core particle comprises from about 50 wt % to about 90 wt % of the binder and from about 50 wt % to about 10 wt % of the inhibitor. In yet another aspect, the fertilizer core particle comprises from about 30 wt % to about 85% of the binder and from about 70 wt % to about 15 wt % of the inhibitor.

In one aspect, the fertilizer core particle comprises from about 30 wt % to about 50 wt % of Plaster of Paris, from about 20 wt % to about 40 wt % of flour comprising bleached wheat flour, from about 10 wt % to about 50 wt % of a nitrification inhibitor, and from more than 0 wt % to about 5 wt % of a urease inhibitor. In yet another aspect, the fertilizer core particle comprises from about 20 wt % to about 40 wt % of Plaster of Paris, from about 10 wt % to about 30 wt % of flour comprising bleached wheat flour, from about 30 wt % to about 50 wt % of a urease inhibitor, and from more than 0 wt % wt to about 5 wt % of a nitrification inhibitor.

3. pH Buffering Agent

The fertilizer core particle comprises one or more pH buffering agents. pH buffering agents are known to one skilled in the art.

In one aspect, the pH buffering agent is a solid at room temperature. In another aspect, the pH buffering agent can be a liquid at room temperature.

In one aspect, the fertilizer core particle comprises from about 5 wt % to about 60 wt % of the one or more pH buffering agents. In another aspect, the fertilizer core particle comprises from about 20 wt % to about 60 wt % of the one or more pH buffering agents. In yet another aspect, the fertilizer core particle comprises from about 40 wt % to about 60 wt % of the one or more pH buffering agents. In yet another aspect, the fertilizer core particle comprises from about 30 wt % to about 50 wt % of the one or more pH buffering agents. In yet another aspect, the fertilizer core particle comprises from about 5 wt % to about 30 wt % of the one or more pH buffering agents.

In one aspect, the fertilizer core particle comprises about 5 wt %, 6 wt %, 7, wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt %, 51 wt % 52 wt %, 53 wt %, 54 wt %, 55 wt %, 56 wt %, 57, wt %, 58 wt %, 59 wt %, 60 wt %, of the one or more pH buffering agents.

In one aspect, the one or more pH buffering agents comprise $CaCO_3$, MgO, $KH_2PO_4$, or $NaHCO_3$, or a combination thereof. In another aspect, the one or more pH buffering agents comprise $CaCO_3$. In yet another aspect, the one or more pH buffering agents substantially consists of $CaCO_3$.

Other non-limiting pH buffering agents include, but are not limited to, chalk powder, aluminum, magnesium hydroxide, aluminum hydroxide/magnesium hydroxide co-precipitate, aluminum hydroxide/sodium bicarbonate co-precipitate, calcium acetate, calcium bicarbonate, calcium borate, calcium carbonate, calcium bicarbonate, calcium citrate, calcium gluconate, calcium hydroxide, dibasic sodium phosphate, dipotassium hydrogen phosphate, dipotassium phosphate, disodium hydrogen phosphate, magnesium acetate, magnesium borate, magnesium bicarbonate, magnesium carbonate, magnesium hydroxide, magnesium lactate, magnesium oxide, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium tartrate, sodium tripolyphosphate, synthetic hydrotalcite, tetrapotassium pyrophosphate, tetrasodium pyrophosphate, tripotassium phosphate, trisodium phosphate, and trometamol, or a combination thereof.

Other non-limiting pH buffering agents can be liquid form. Non-limiting pH buffering agents include, but are not limited to, 3-{[tris(hydroxymethyl)methyl]amino}propanesulfonic acid (TAPS), tris(hydroxymethyl)methylamine (Tris), N-tris(hydroxymethyl)methylglycine (Tricine), 3-[N-Tris(hydroxymethyl)methylamino]-2-hydroxypropanesulfonic acid (TAPSO), 4-2-hydroxyethyl-1-piperazineethanesulfonic acid (HEPES), 2-{[tris(hydroxymethyl)methyl]amino}ethanesulfonic acid (TES), 3-(N-morpholino)propanesulfonic acid (MOPS), piperazine-N,N'-bis(2-ethanesulfonic acid) (PIPES), dimethylarsinic acid (Cacodylate), saline sodium citrate (SSC), 2-(N-morpholino)ethanesulfonic acid (MES), 2(R)-2-(methylamino) succinic acid (Succinic acid), and phosphate and dibasic monohydrogen phosphat, or combinations thereof.

4. Viscoelasticity Agent

In one aspect, the fertilizer core particle can comprise one or more viscoelasticity agents. As disclosed herein, the one or more viscoelasticity agents can promote desired continuous and uniform flow characteristics of the mixture forming the fertilizer core particle in an extruder during the extrusion process, such as in a continuous extrusion process. Accordingly, the one or more viscoelasticity agents provide for improved manufacturing of the fertilizer core particle when the fertilizer core particle is produced in an extrusion process. A result of the improved manufacturing of the fertilizer core particle is that the fertilizer core particle possesses improved properties and can be produced in a reliable and reproducible process.

In one aspect, disclosed herein is a fertilizer core particle having an outer surface and comprising one or more fertilizer additives, one or more binders, one or more viscoelasticity agents, and one or more pH buffering agents, and wherein the fertilizer core particle comprises from about 10 wt % to about 99 wt % of the one or more binders. In one aspect, the one or more viscoelasticity agents is hydroxypropyi methylcellulose (HPMC). In a further aspect, the fertilizer core particle comprises about 0.8% of the one or more viscoelasticity agents. Accordingly, in one aspect, disclosed herein is a is a fertilizer core particle having an outer surface and comprising one or more fertilizer additives, one or more binders, HPMC, and one or more pH buffering agents, and wherein the fertilizer core particle comprises from about 10 wt % to about 99 wt % of the one or more binders. In one aspect, the one or more binders comprise Plaster of Paris.

Also disclosed herein is a fertilizer core particle having an outer surface and comprising one or more fertilizer additives, one or more binders, one or more viscoelasticity agents, and one or more pH buffering agents, wherein the fertilizer core particle comprises from about 10 wt % to about 99 wt % of the one or more binders, and wherein the fertilizer core particle comprises from more than 0 wt % to about 5 wt % of the one or more viscoelasticity agents.

In one aspect, the fertilizer core particle comprises from about 0.05 wt % to about 2.0 wt % of the one or more viscoelasticity agents. In another aspect, the fertilizer core particle comprises from about 0.2 wt % to about 2.0 wt % of the one or more viscoelasticity agents. In yet another aspect, the fertilizer core particle comprises from about 0.2 wt % to about 1.5 wt % of the one or more viscoelasticity agents. In yet another aspect, the fertilizer core particle comprises from about 0.2 wt % to about 1.0 wt % of the one or more viscoelasticity agents. In yet another aspect, the fertilizer core particle comprises from about 0.2 wt % to about 0.7 wt % of the one or more viscoelasticity agents. In yet another aspect, fertilizer core particle comprises from about 0.2 wt % to about 0.5 wt % of the one or more viscoelasticity agents. In yet another aspect, fertilizer core particle comprises from about 0.2 wt % to about 0.3 wt % of the one or more viscoelasticity agents.

In one aspect, the fertilizer core particle comprises from about 10 wt % to about 90 wt % of Plaster of Paris and from more than 0 wt % to about 5 wt % of the one or more viscoelasticity agents. In another aspect, the fertilizer core particle comprises from about 40 wt % to about 90 wt % of Plaster of Paris and from more than 0 wt % to about 5 wt % of the one or more viscoelasticity agents. In yet another aspect, the fertilizer core particle comprises from about 35 wt % to about 90 wt % of Plaster of Paris and from more than 0 wt % to about 5 wt % of the one or more viscoelasticity agents. In yet another aspect, the fertilizer core particle comprises from about 40 wt % to about 60 wt % of Plaster of Paris, from about 30 wt % to about 50 wt % one or more pH buffering agents, and from more than 0 wt % to about 5 wt % of the one or more viscoelasticity agents. In yet another aspect, the fertilizer core particle comprises from about 40 wt % to about 60 wt % of Plaster of Paris, from about 30 wt % to about 50 wt % one or more pH buffering agents, and from more than 0.05 wt % to about 2.0 wt % of the one or more viscoelasticity agents.

In one aspect, the fertilizer core particle comprises from about 10 wt % to about 90 wt % of at least one inorganic thixotropic ingredient and from more than 0 wt % to about 5 wt % of the one or more viscoelasticity agents. In another aspect, the fertilizer core particle comprises from about 40 wt % to about 90 wt % of at least one inorganic thixotropic ingredient and from more than 0 wt % to about 5 wt % of the one or more viscoelasticity agents. In yet another aspect, the fertilizer core particle comprises from about 35 wt % to about 90 wt % of at least one inorganic thixotropic ingredient and from more than 0 wt % to about 5 wt % of the one or more viscoelasticity agents. In yet another aspect, the fertilizer core particle comprises from about 40 wt % to about 60 wt % of at least one inorganic thixotropic ingredient, from about 30 wt % to about 50 wt % one or more pH buffering agents, and from more than 0 wt % to about 5 wt % of the one or more viscoelasticity agents. In yet another aspect, the fertilizer core particle comprises from about 40 wt % to about 60 wt % of at least one inorganic thixotropic ingredient, from about 30 wt % to about 50 wt % one or more pH buffering agents, and from more than 0.05 wt % to about 2.0 wt % of the one or more viscoelasticity agents.

In one aspect, the fertilizer core particle comprises from about 10 wt % to about 90 wt % of Plaster of Paris, from more than 0 wt % to about 5 wt % of the one or more viscoelasticity agents, and NBTPT, for example, from more than 0 wt % to about 5 wt % of NBTPT. In another aspect, the fertilizer core particle comprises from about 40 wt % to about 90 wt % of Plaster of Paris, from more than 0 wt % to about 5 wt % of the one or more viscoelasticity agents, and NBTPT, for example, from more than 0 wt % to about 5 wt % of NBTPT. In yet another aspect, the fertilizer core particle comprises from about 35 wt % to about 90 wt % of Plaster of Paris, from more than 0 wt % to about 5 wt % of the one or more viscoelasticity agents, and NBTPT, for example, from more than 0 wt % to about 5 wt % of NBTPT. In yet another aspect, the fertilizer core particle comprises from about 40 wt % to about 60 wt % of Plaster of Paris, from about 30 wt % to about 50 wt % one or more pH buffering agents, from more than 0 wt % to about 5 wt % of the one or more viscoelasticity agents, and NBTPT, for example, from more than 0 wt % to about 5 wt % of NBTPT. In yet another aspect, the fertilizer core particle comprises from about 40 wt % to about 60 wt % of Plaster of Paris, from about 30 wt % to about 50 wt % one or more pH buffering agents, from more than 0.05 wt % to about 2.0 wt % of the one or more viscoelasticity agents, and NBTPT, for example, from more than 0 wt % to about 5 wt % of NBTPT.

In one aspect, the fertilizer core particle comprises from about 10 wt % to about 90 wt % of Plaster of Paris, from more than 0 wt % to about 5 wt % of the one or more viscoelasticity agents, and DCD, for example, from about 10 wt % to about 45 wt % of DCD. In another aspect, the fertilizer core particle comprises from about 40 wt % to about 90 wt % of Plaster of Paris, from more than 0 wt % to about 5 wt % of the one or more viscoelasticity agents, and DCD, for example, from about 10 wt % to about 45 wt % of DCD. In yet another aspect, the fertilizer core particle comprises from about 40 wt % to about 60 wt % of Plaster of Paris, from about 30 wt % to about 50 wt % one or more pH buffering agents, from more than 0 wt % to about 5 wt % of the one or more viscoelasticity agents, and DCD, for example, from about 10 wt % to about 45 wt % of DCD. In yet another aspect, the fertilizer core particle comprises from about 40 wt % to about 60 wt % of Plaster of Paris, from about 30 wt % to about 50 wt % one or more pH buffering agents, from more than 0.05 wt % to about 2.0 wt % of the one or more viscoelasticity agents, and DCD, for example, from about 10 wt % to about 45 wt % of DCD.

In one aspect, the fertilizer core particle comprises from about 10 wt % to about 90 wt % of Plaster of Paris, from more than 0 wt % to about 5 wt % of the one or more viscoelasticity agents, NBTPT, and DCD, for example, from more than 0 wt % to about 5 wt % of NBTPT and from about 10 wt % to about 45 wt % of DCD. In another aspect, the fertilizer core particle comprises from about 40 wt % to about 90 wt % of Plaster of Paris, from more than 0 wt % to about 5 wt % of the one or more viscoelasticity agents, NBTPT, and DCD, for example, from more than 0 wt % to about 5 wt % of NBTPT and from about 10 wt % to about 45 wt % of DCD. In yet another aspect, the fertilizer core particle comprises from about 35 wt % to about 90 wt % of Plaster of Paris, from more than 0 wt % to about 5 wt % of the one or more viscoelasticity agents, NBTPT, and DCD, for example, from more than 0 wt % to about 5 wt % of NBTPT and from about 10 wt % to about 45 wt % of DCD. In yet another aspect, the fertilizer core particle comprises from about 40 wt % to about 60 wt % of Plaster of Paris, from about 30 wt % to about 50 wt % one or more pH buffering agents, from more than 0 wt % to about 5 wt % of the one or more viscoelasticity agents, NBTPT, and DCD, for example, from more than 0 wt % to about 5 wt % of NBTPT and from about 10 wt % to about 45 wt % of DCD. In yet another aspect, the fertilizer core particle comprises from about 40 wt % to about 60 wt % of Plaster of Paris, from about 30 wt % to about 50 wt % one or more pH buffering agents, from more than 0.05 wt % to about 2.0 wt % of the one or more viscoelasticity agents, NBTPT, and DCD, for example, from more than 0 wt % to about 5 wt % of NBTPT and from about 10 wt % to about 45 wt % of DCD.

In one aspect, the one or more viscoelasticity agents is selected from the group consisting of a cellulose, a cellulose ether, a polysaccharide, and a glycosaminoglycan, or a combination thereof. For example, the one or more viscoelasticity agent can comprise cellulose, such as, for example, cellulose esters or cellulose ethers. In another example, the one or more viscoelasticity agent can comprise a cellulose ether, such as for example, hydroxypropyl methylcellulose, hydroxyethyl methylcellulose, methylcellulose, ethylcellulose, ethyl methyl cellulose, hydroxy ethyl cellulose, hydroxypropyl cellulose, ethyl hydroxyethyl cellulose, and carboxymethyl cellulose. In yet another example, the one or more viscoelasticity agent can comprise a polysaccharide, for example, starch, cellulose, chitin, glycoaminoglycans, and pectins. In yet another example, the one or more viscoelasticity agent can comprise glycosaminoglycan, for example, hyaluronic acid, heparin, heparan sulphate, and keratan sulphate.

In another aspect, the one or more viscoelasticity agents is selected from the group consisting of hydroxypropyl methylcellulose, hydroxyethyl methylcellulose, methylcellulose, ethylcellulose, ethyl methyl cellulose, hydroxy ethyl cellulose, hydroxypropyl cellulose, ethyl hydroxyethyl cellulose, carboxymethyl cellulose, hyaluronic acid, chondroitin sulphate, dermatan sulphate, heparin, heparan sulphate, keratan sulphate, alginic acid, polymannuronic acid, polyguluronic acid, polyglucuronic acid, amylose, amylopectin, callose, chitosan, poly-galactomannan, dextran, and xanthan, or a combination thereof. For example, the one or more viscoelasticity agents comprise hydroxypropyl methylcellulose. In one example, the one or more viscoelasticity agents is hydroxypropyl methylcellulose. In another example, the one or more viscoelasticity agents is hydroxyethyl methylcellulose. In yet another example, the one or more viscoelasticity agents is methylcellulose. In yet another example, the one or more viscoelasticity agents is ethylcellulose. In yet another example, the one or more viscoelasticity agents is ethyl methyl cellulose. In yet another example, the one or more viscoelasticity agents is hydroxypropyl cellulose. In yet another example, the one or more viscoelasticity agents is ethyl hydroxyethyl cellulose. In yet another example, the one or more viscoelasticity agents is carboxymethyl cellulose.

5. Micronutrient

The fertilizer core particle can comprise a micronutrient. A micronutrient is a botanically acceptable form of an inorganic or organometallic compound comprising boron (B), copper (Cu), iron (Fe), chloride (CO, manganese (Mn), molybdenum (Mo), Nickel (Ni), or zinc (Zn), or a combination thereof. A micronutrient provide amounts of B, Cu, Fe, Cl, Mn, Mo, Ni, or Zn, or a combination thereof to promote the growth and development of plants, such as crops. For example, the fertilizer core particle can comprise B. In another example, the fertilizer core particle can comprise Cu. In yet another example, the fertilizer core particle can comprise Fe. In yet another example, the fertilizer core particle can comprise Cl. In yet another example, the fertilizer core particle can comprise Mn. In yet another example, the fertilizer core particle can comprise Mo. In yet another example, the fertilizer core particle can comprise Zn. In yet another example, the fertilizer core particle can comprise any combination of B, Cu, Fe, Cl, Mn, Mo, Ni, or Zn, or a combination thereof. In yet another example, the fertilizer core particle can comprise any combination of B, Cu, Fe, Cl, Mn, Mo, or Zn, or a combination thereof. For example the fertilizer core particle can comprise of B and Zn.

In one aspect, the micronutrient is an inorganic compound comprising B, Cu, Fe, Cl, Mn, Mo, Ni, or Zn, or a combination thereof. In one aspect, the micronutrient is an inorganic compound comprising B, Cu, Fe, Cl, Mn, Mo, or Zn, or a combination thereof. Suitable inorganic compounds include, but are not limited to, sulfates oxides and salts. Specific examples include Borax, $CuSO_4$, $FeSO_4$, and $ZnSO_4$.

In another aspect, the micronutrient is an organic compound comprising B, Cu, Fe, Cl, Mn, Mo, Ni, or Zn, or a combination thereof. Suitable organic compounds include, but are not limited to, to Fe EDTA, Fe EDDHA, Ca EDTA, Zn EDTA, and Mn EDTA where EDTA is ethylenediaminetetraacetate and EDDHA is ethylenediamine-N,N'-bis(2-hydroxyphenylacetate).

The micronutrient, in some cases, is boron. In these instances, boron can be included in the fertilizer core particle, shell or both fertilizer core particle and the shell. In some particular aspects, the boron is included in shell, with urea and other ingredients. It can also be included in a separate layer, over or under the urea shell. In some other aspects, the boron is included in the fertilizer core particle. It can be included as in any form known in the skill of art, for example, as separate granules, or as a mixture with the other ingredients. For the ease of processing, it is convenient to include the micronutrient (e.g., boron) as a mixture with other ingredients. However, practical problems may arise due to adverse interactions with the other ingredients. In these cases, the boron can be included as separate granules.

As the elemental boron cannot be used as a micronutrient, any of forms known in the skill or art can be used. Generally, boron is used as the boric acid or borates (borax) or derivatives thereof. In some particular aspects, the fertilizer granule includes borates in the fertilizer core particle. As discussed above, borates can be included in the shell as well. The exemplary borate compounds include anhydrous sodium tetraborate ($Na_2B_4O_7$), sodium tetraborate pentahydrate ($Na_2B_4O_7.5H_2O$), sodium tetraborate decahydrate ($Na_2B_4O_7.10H_2O$), potassium metaborates, potassium tetraborates, potassium peroxyborates, calcium metaborates, ammonium pentaborates, ammonium tetraborates or derivatives thereof.

In one aspect, the fertilizer core particle comprises from greater than 0 wt % to about 50 wt % of the micronutrient on an atom basis. In another aspect, the fertilizer core particle comprises from greater than 0 wt % to about 40 wt % of the micronutrient on an atom basis. In yet another aspect, the fertilizer core particle comprises from greater than 0 wt % to about 30 wt % of the micronutrient on an atom basis. In yet another aspect, the fertilizer core particle comprises from greater than 0 wt % to about 20 wt % of the micronutrient on an atom basis. In yet another aspect, the fertilizer core particle comprises from greater than 0 wt % to about 10 wt % of the micronutrient on an atom basis. In yet another aspect, the fertilizer core particle comprises from greater than about 10 wt % to about 50 wt % of the micronutrient on an atom basis. In yet another aspect, the fertilizer core particle comprises from about 20 wt % to about 50 wt % of the micronutrient on an atom basis. In yet another aspect, the fertilizer core particle comprises from about 30 wt % to about 50 wt % of the micronutrient on an atom basis The term "on an atom basis" refers to the weight of the micronutrient as determined based on an atom to atom calculation. For example, for a fertilizer core particle weighing 100 g, 10% on an atom basis of Fe or 10 g Fe. Thus, Fe can be incorporated into the fertilizer core particle as $FeSO_4$, thus, (10 g×152/56)=27 g of $FeSO_4$ has to be added to get 10 g (or 10%) of Fe in the fertilizer core particle.

6. Primary Nutrient

A primary nutrient is a material that can deliver nitrogen (N), phosphorus (P), and/or potassium (K) to a plant. For example, the primary nutrient can be a material that can deliver nitrogen to a plant. In another example, the primary nutrient can be a material that can deliver phosphorus to a plant. In another example, the primary nutrient can be a material that can deliver potassium to a plant.

In one aspect, the primary nutrient is a material that comprises urea, ammonium nitrate, ammonium sulfate, diammonium phosphate, monoammonium phosphate, or urea-formaldehyde, or a combination thereof. For example, the primary nutrient can be a material that comprises urea. In another example, the primary nutrient can be a material that comprises ammonium nitrate. In yet another example, the primary nutrient can be a material that comprises ammonium nitrate. In yet another example, the primary nutrient can be a material that comprises ammonium sulfate. In yet another example, the primary nutrient can be a material that comprises diammonium phosphate. In yet another example, the primary nutrient can be a material that comprises monoammonium phosphate. In yet another example, the primary nutrient can be a material that comprises urea-formaldehyde.

The primary nutrient can be mixed with the binder, such as the extrudable binder, prior extrusion.

In one aspect, the fertilizer core particle comprises from greater than 0 wt % to about 80 wt % of the primary nutrient. In another aspect, the fertilizer core particle comprises from about 10 wt % to about 80 wt % of the primary nutrient. In another aspect, the fertilizer core particle comprises from about 15 wt % to about 80 wt % of the primary nutrient. In yet another aspect, the fertilizer core particle comprises from about 10 wt % to about 50 wt % of the primary nutrient. In yet another aspect, the fertilizer core particle comprises from about 15 wt % to about 50 wt % of the primary nutrient. In yet another aspect, the fertilizer core particle comprises from about 15 wt % to about 45 wt % of the primary nutrient. In one aspect, the fertilizer core particle comprises from greater than 0 wt % to about 54 wt % of the primary nutrient. In another aspect, the fertilizer core particle comprises from greater than 0 wt % to about 45 wt % of the primary nutrient. In yet another aspect, the fertilizer core particle comprises from greater than 0 wt % to about 35 wt % of the primary nutrient. In yet another aspect, the fertilizer core particle comprises from greater than 0 wt % to about 30 wt % of the primary nutrient. In yet another aspect, the fertilizer core particle comprises from greater than 0 wt % to about 25 wt % of the primary nutrient. In yet another aspect, the fertilizer core particle comprises from greater than 0 wt % to about 20 wt % of the primary nutrient. In yet another aspect, the fertilizer core particle comprises from about 10 wt % to about 35 wt % of the primary nutrient. In yet another aspect, the fertilizer core particle comprises from about 10 wt % to about 30 wt % of the primary nutrient.

In one aspect, the fertilizer core particle comprises from about 20 wt % to about 90 wt % of the binder and from about 80 wt % to about 10 wt % of the primary nutrient. In another aspect, the fertilizer core particle comprises from about 50 wt % to about 90 wt % of the binder and from about 5 wt 0% to about 10 wt % of the primary nutrient. In yet another aspect, the fertilizer core particle comprises from about 30 wt % to about 85 wt % of the binder and from about 70% wt % to about 15 wt % of the primary nutrient.

Fertilizers with urea-formaldehyde from various sources are described in U.S. Pat. Nos. 8,419,819; 6,936,681; 6,900,162; 6,936,573; 7,213,367; and 6,048,378, which are all hereby incorporated by reference for their disclosure of fertilizers with urea-formaldehyde.

In one aspect, the shell can comprise a primary nutrient.

7. Secondary Nutrient

A secondary nutrient is a material that can deliver calcium (Ca), magnesium (Mg), and/or sulfur (S) to a plant. For example, the secondary nutrient can be a material that can deliver calcium to a plant. In another example, the secondary nutrient can be a material that can deliver magnesium to a plant. In another example, the secondary nutrient can be a material that can deliver sulfur to a plant.

In one aspect, the secondary nutrient can comprise Ca or Mg or a combination thereof.

In one aspect, the sulfur can be elemental sulfur.

Fertilizers with urea-formaldehyde from various sources are described in U.S. Pat. No. 6,749,659 and Published U.S. Application 2004/0163434, which are both hereby incorporated by reference for their disclosure of fertilizers with sulfur.

In one aspect, the secondary nutrient comprises lime, gypsum or superphosphate, or a combination thereof. In another aspect, the secondary nutrient comprises calcium ammonium nitrate or calcium nitrate, or a combination thereof. In yet another aspect, the secondary nutrient comprises eggshells, bone meal, or limestone, or a combination thereof.

The secondary nutrient can be mixed with the binder, such as the extrudable binder, prior extrusion.

In one aspect, the fertilizer core particle comprises from greater than 0 wt % to about 80 wt % of the secondary nutrient. In another aspect, the fertilizer core particle comprises from about 10 wt % to about 80 wt % of the secondary nutrient. In another aspect, the fertilizer core particle comprises from about 15 wt % to about 80 wt % of the secondary nutrient. In yet another aspect, the fertilizer core particle comprises from about 10 wt % to about 50 wt % of the secondary nutrient. In yet another aspect, the fertilizer core particle comprises from about 15 wt % to about 50 wt % of the secondary nutrient. In yet another aspect, the fertilizer core particle comprises from about 15 wt % to about 45 wt % of the secondary nutrient. In one aspect, the fertilizer core particle comprises from greater than 0 wt % to about 54 wt % of the secondary nutrient. In another aspect, the fertilizer core particle comprises from greater than 0 wt % to about 45 wt % of the secondary nutrient. In yet another aspect, the fertilizer core particle comprises from greater than 0 wt % to about 35 wt % of the secondary nutrient. In yet another aspect, the fertilizer core particle comprises from greater than 0 wt % to about 30 wt % of the secondary nutrient. In yet another aspect, the fertilizer core particle comprises from greater than 0 wt % to about 25 wt % of the secondary nutrient. In yet another aspect, the fertilizer core particle comprises from greater than 0 wt % to about 20 wt % of the secondary nutrient. In yet another aspect, the fertilizer core particle comprises from about 10 wt % to about 35 wt % of the secondary nutrient. In yet another aspect, the fertilizer core particle comprises from about 10 wt % to about 30 wt % of the secondary nutrient.

In one aspect, the fertilizer core particle comprises from about 20 wt % to about 90 wt % of the binder and from about 80 wt % to about 10 wt % of the secondary nutrient. In another aspect, the fertilizer core particle comprises from about 50 wt % to about 90 wt % of the binder and from about 50 wt % to about 10 wt % of the secondary nutrient. In yet another aspect, the fertilizer core particle comprises from about 30 wt % to about 85 wt % of the binder and from 70 wt % to 15 wt % of the secondary nutrient.

In one aspect, the shell can comprise a secondary nutrient.

8. Filler

In some aspects, the fertilizer core particle can comprise a filler. A filler is a material that can facilitate the release of inhibitors or micronutrients from the fertilizer core particle. Accordingly, a filler is added to a matrix material with improve the properties of the fertilizer core particle. A filler in combination with a binder can be selected to enhance physical and release properties of the fertilizer core particle. For example, the good surface texture and good crush strength of the fertilizer core particle can be achieved by using bleached wheat flour, as a binder, and colloidal silica, as a filler.

In one aspect, the filler comprises silica, colloidal silica, dried distillers grains with solubles (DDGS), kaolin, bentonite, rice husk, or other biomaterial, or a combination thereof. For example, the fertilizer core particle can comprise silica. In another example, the fertilizer core particle can comprise colloidal silica. In yet another example, the fertilizer core particle can comprise dried distillers grains with solubles (DDGS). In yet another example, the fertilizer core particle can comprise kaolin. In yet another example, the fertilizer core particle can comprise bentonite. In yet another example, the fertilizer core particle can comprise other biomaterials, such as DDGS. In yet another example, the fertilizer core particle can comprise any combination of silica, colloidal silica, dried distillers grains with solubles (DDGS), kaolin, bentonite, and other biomaterial. In yet another example, the fertilizer core particle can comprise rice husk. In yet another example, the fertilizer core particle can comprise rice husk and a wax as binder.

In one aspect, the fertilizer core particle comprises from greater than 0 wt % to 60 wt % of the filler. In another aspect, the fertilizer core particle comprises from greater than 0 wt % to about 50 wt % of the filler. In yet another aspect, the fertilizer core particle comprises from greater than 0 wt % to about 40 wt % of the filler. In yet another aspect, the fertilizer core particle comprises from greater than 0 wt % to about 30 wt % of the filler. In yet another aspect, the fertilizer core particle comprises from greater than 0 wt % to about 25 wt % of the filler. In yet another aspect, the fertilizer core particle comprises from greater than 0 wt % to about 20 wt % of the filler. In yet another aspect, the fertilizer core particle comprises from about 5 wt % to about 40 wt % of the filler. In yet another aspect, the fertilizer core particle comprises from about 10 wt % to about 30 wt % of the filler.

For example, fertilizer core particle comprises from about 10 wt % to about 60 wt % of rice husk. In one aspect, fertilizer core particle comprises from about 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of rice husk.

9. Shell

As used herein "shell" and "outer shell" are used interchangeably herein.

In one aspect, the fertilizer granule comprises a shell comprising urea or other nitrogen fertilizer or a combination thereof. In one aspect, the fertilizer granule comprises a shell comprising urea or first nitrogen fertilizer or a combination thereof. For example, the fertilizer granule can comprise urea. In another example, the fertilizer granule can comprise other nitrogen fertilizer. In yet another example, the fertilizer granule can comprise urea and other nitrogen fertilizer. Suitable other nitrogen fertilizers include, but are not limited to, ammonium nitrate, ammonium sulfate, DAP, MAP, urea-formaldehyde, ammonium chloride, and potassium nitrate. Suitable first nitrogen containing fertilizer composition include, but are not limited to, urea, ammonium nitrate, ammonium sulfate, DAP, MAP, urea-formaldehyde, ammonium chloride, and potassium nitrate. In one aspect, the first nitrogen containing fertilizer composition comprises urea.

The shell can be fattened onto the fertilizer core particle by spraying molten urea onto the fertilizer core particle in a granulation process.

In one aspect, the shell comprises from greater than 0 wt % to 100 wt % of the urea or first nitrogen containing fertilizer composition or a combination thereof. In another aspect, the shell comprises from greater than 0 wt % to about 99 wt % of the urea or first nitrogen containing fertilizer composition or a combination thereof. In yet another aspect, the shell comprises from greater than 0 wt % to about 90 wt % of the urea or first nitrogen containing fertilizer composition or a combination thereof. In yet another aspect, the shell comprises from greater than 0 wt % to about 80 wt % of the urea or first nitrogen containing fertilizer composition or a combination thereof. In yet another aspect, the shell comprises from greater than 0 wt % to about 60 wt % of the urea or first nitrogen containing fertilizer composition or a combination thereof. In yet another aspect, the shell comprises from greater than about 60 wt % to about 99 wt % of the urea or first nitrogen containing fertilizer composition or a combination thereof. In yet another aspect, the shell comprises from about 80 wt % to about 99 wt % of the urea or first nitrogen containing fertilizer composition or a combination thereof.

In one aspect, a shell comprising a nitrogen containing fertilizer composition at least partially surrounds the fertilizer core particle. In another aspect, a shell comprising a nitrogen containing fertilizer composition substantially surrounds the fertilizer core particle. In yet another aspect, a shell comprising a nitrogen containing fertilizer composition fully surrounds the fertilizer core particle.

In one aspect, a shell comprising urea at least partially surrounds the fertilizer core particle. In another aspect, a shell comprising urea substantially surrounds the fertilizer core particle. In yet another aspect, a shell comprising urea fully surrounds the fertilizer core particle.

10. Exemplary Compositions

In one aspect, the fertilizer core particle comprises from about 30 wt % to about 50 wt % of Plaster of Paris, from about 20 wt % to about 40 wt % of flour comprising bleached wheat flour, from about 10 wt % to about 50 wt % of DCD, from more than 0 wt % to about 5 wt % of NBTPT, and one or more pH buffering agents. In yet another aspect, the fertilizer core particle comprises from about 20 wt % to about 40 wt % of Plaster of Paris, from about 10 wt % to about 30 wt % of flour comprising bleached wheat flour, one or more pH buffering agents, from about 30 wt % to about 50 wt % of DCD, and from more than 0 wt % wt to about 5 wt % of NBTPT.

In one aspect, the fertilizer core particle comprises from about 30 wt % to about 50 wt % of Plaster of Paris, from about 20 wt % to about 40 wt % of flour comprising bleached wheat flour, from about 10 wt % to about 50 wt % of DCD, and from more than 0 wt % to about 5 wt % of NBTPT, and one or more pH buffering agents, and wherein a shell substantially comprising urea surrounds or partially surrounds the fertilizer core particle. In yet another aspect, the fertilizer core particle comprises from about 20 wt % to about 40 wt % of Plaster of Paris, from about 10 wt % to about 30 wt % of flour comprising bleached wheat flour, from about 30 wt % to about 50 wt % of DCD, and from more than 0 wt % wt to about 5 wt % of NBTPT, and one or more pH buffering agents, and wherein a shell substantially comprising urea surrounds or partially surrounds the fertilizer core particle.

In yet another aspect, the fertilizer core particle comprises from about 20 wt % to about 50 wt % of Plaster of Paris, from about 5 wt % to about 40 wt % of flour comprising bleached wheat flour, from about 10 wt % to about 30 wt % of DCD, from more than 0 wt % to about 5 wt % of NBTPT, and from about 15 wt % to about 50 wt % of the one or more pH buffering agents.

In yet another aspect, the fertilizer core particle comprises from about 20 wt % to about 50 wt % of Plaster of Paris, from about 5 wt % to about 40 wt % of flour comprising bleached wheat flour, from about 10 wt % to about 30 wt % of DCD, from more than 0 wt % to about 5 wt % of NBTPT, and from about 15 wt % to about 50 wt % of the one or more pH buffering agents, and wherein a shell substantially comprising urea surrounds or partially surrounds the fertilizer core particle.

In yet another aspect, the fertilizer core particle comprises from about 40 wt % to about 60 wt % of Plaster of Paris, from about 5 wt % to about 10 wt % of flour comprising bleached wheat flour, from more than 0 wt % to about 5 wt % of NBTPT, and from about 30 wt % to about 50 wt % of the one or more pH buffering agents.

In yet another aspect, the fertilizer core particle comprises from about 20 wt % to about 30 wt % of Plaster of Paris, from more than 0 wt % to about 10 wt % of flour comprising bleached wheat flour, from more than 0 wt % to about 5 wt % of NBTPT, from about 20 wt % to about 30 wt % of DCD, and from about 30 wt % to about 50 wt % of the one or more pH buffering agents.

In yet another aspect, the fertilizer core particle comprises from about 20 wt % to about 40 wt % of Plaster of Paris, from more than 0 wt % to about 10 wt % of flour comprising bleached wheat flour, from about 20 wt % to about 30 wt % of DCD, and from about 30 wt % to about 50 wt % of the one or more pH buffering agents.

In yet another aspect, the fertilizer core particle comprises from about 40 wt % to about 60 wt % of Plaster of Paris, from about 5 wt % to about 10 wt % of flour comprising bleached wheat flour, from more than 0 wt % to about 5 wt % of NBTPT, from about 0.2 wt % to about 0.5 wt % of the one or more viscoelasticity agents, and from about 30 wt % to about 50 wt % of the one or more pH buffering agents.

In yet another aspect, fertilizer core particle comprises from about 20 wt % to about 30 wt % of Plaster of Paris, from more than 0 wt % to about 10 wt % of flour comprising bleached wheat flour, from more than 0 wt % to about 5 wt % of NBTPT, from about 20 wt % to about 30 wt % of DCD, from about 0.2 wt % to about 0.5 wt % of the one or more viscoelasticity agents, and from about 30 wt % to about 50 wt % of the one or more pH buffering agents.

In yet another aspect, the fertilizer core particle comprises from about 20 wt % to about 40 wt % of Plaster of Paris, from more than 0 wt % to about 10 wt % of flour comprising bleached wheat flour, from about 20 wt % to about 30 wt % of DCD, from about 0.2 wt % to about 0.5 wt % of the one or more viscoelasticity agents, and from about 30 wt % to about 50 wt % of the one or more pH buffering agents.

In yet another aspect, the fertilizer core particle comprises from about 40 wt % to about 60 wt % of Plaster of Paris, from about 5 wt % to about 10 wt % of flour comprising bleached wheat flour, from more than 0 wt % to about 5 wt % of NBTPT, and from about 30 wt % to about 50 wt % of the one or more pH buffering agents.

In yet another aspect, the fertilizer core particle comprises from about 20 wt % to about 30 wt % of Plaster of Paris, from more than 0 wt % to about 10 wt % of flour comprising bleached wheat flour, from more than 0 wt % to about 5 wt % of NBTPT, from about 20 wt % to about 30 wt % of DCD, from about 30 wt % to about 50 wt % of the one or more pH buffering agents, and wherein a shell substantially comprising urea surrounds or partially surrounds the fertilizer core particle.

In yet another aspect, the fertilizer core particle comprises from about 20 wt % to about 40 wt % of Plaster of Paris, from more than 0 wt % to about 10 wt % of flour comprising bleached wheat flour, from about 20 wt % to about 30 wt % of DCD, from about 30 wt % to about 50 wt % of the one or more pH buffering agents, and wherein a shell substantially comprising urea surrounds or partially surrounds the fertilizer core particle.

In yet another aspect, the fertilizer core particle comprises from about 40 wt % to about 60 wt % of Plaster of Paris, from about 5 wt % to about 10 wt % of flour comprising bleached wheat flour, from more than 0 wt % to about 5 wt % of NBTPT, from about 0.2 wt % to about 0.5 wt % of the one or more viscoelasticity agents, from about 30 wt % to about 50 wt % of the one or more pH buffering agents, and wherein a shell substantially comprising urea surrounds or partially surrounds the fertilizer core particle.

In yet another aspect, fertilizer core particle comprises from about 20 wt % to about 30 wt % of Plaster of Paris, from more than 0 wt % to about 10 wt % of flour comprising bleached wheat flour, from more than 0 wt % to about 5 wt % of NBTPT, from about 20 wt % to about 30 wt % of DCD, from about 0.2 wt % to about 0.5 wt % of the one or more viscoelasticity agents, from about 30 wt % to about 50 wt % of the one or more pH buffering agents, and wherein a shell substantially comprising urea surrounds or partially surrounds the fertilizer core particle.

In yet another aspect, the fertilizer core particle comprises from about 20 wt % to about 40 wt % of Plaster of Paris, from more than 0 wt % to about 10 wt % of flour comprising bleached wheat flour, from about 20 wt % to about 30 wt % of DCD, from about 0.2 wt % to about 0.5 wt % of the one or more viscoelasticity agents, from about 30 wt % to about 50 wt % of the one or more pH buffering agents, and wherein a shell substantially comprising urea surrounds or partially surrounds the fertilizer core particle.

D. COMPOSITIONS

Also disclosed herein is a composition comprising the fertilizer granule disclosed herein and a second nitrogen containing fertilizer composition.

Also disclosed herein is a composition comprising the fertilizer core particle disclosed herein and a second nitrogen containing fertilizer composition.

Also disclosed herein is a composition comprising the fertilizer granule disclosed herein and a fertilizer composition.

Also disclosed herein is a composition comprising the fertilizer core particle disclosed herein and a fertilizer composition.

In one aspect, the fertilizer composition comprises micronutrient, a primary nutrient, a secondary nutrient, an insecticide, an herbicide, or a fungicide, or a combination thereof.

The fertilizer granule or fertilizer core particle can be mixed with the second nitrogen containing fertilizer composition to form a mixture, such as a homogeneous mixture, of the two. In another example, the fertilizer granule or fertilizer core particle can be together with but not mixed with the second nitrogen containing fertilizer composition to form a heterogeneous mixture of the two.

In one aspect, the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof. In another aspect, the second nitrogen containing fertilizer composition comprises urea. Thus, for example, the composition can comprise the fertilizer core particle disclosed herein and urea. In another example, the composition can comprise the fertilizer granule disclosed herein and urea.

The second nitrogen containing fertilizer composition can be in any suitable form, such as, for example, granules or prills. For example, the urea can be in any suitable form, such as, for example, urea granules or urea prills.

In one aspect, the composition can comprise from above 0 wt % to about 90 wt % of the fertilizer granule disclosed herein and from about 99 wt % to about 10 wt % of the second nitrogen containing fertilizer composition. For example, the composition can comprise from about 20 wt % to about 90 wt % of the fertilizer granule disclosed herein and from about 80 wt % to about 10 wt % of the second nitrogen containing fertilizer composition. In another example, the composition can comprise from about 30 wt % to about 70 wt % of the fertilizer granule disclosed herein and from about 70 wt % to about 30 wt % of the second nitrogen containing fertilizer composition.

In one aspect, the composition can comprise from above 0 wt % to about 50 wt % of the fertilizer core particle disclosed herein and from about 99 wt % to about 50 wt % of the second nitrogen containing fertilizer composition. For example, the composition can comprise from about 1 wt % to about 25 wt % of the fertilizer core particle disclosed herein and from about 99 wt % to about 75 wt % of the second nitrogen containing fertilizer composition. In another example, the composition can comprise from about 1 wt % to about 10 wt % of the fertilizer core particle disclosed herein and from about 99 wt % to about 90 wt % of the second nitrogen containing fertilizer composition.

In one aspect, the composition can further comprise a micronutrient, a primary nutrient, a secondary nutrient, an insecticide, an herbicide, or a fungicide, or a combination thereof.

E. KIT

Also disclosed herein is a kit comprising a) the fertilizer granule disclosed herein; and b) a second nitrogen containing fertilizer composition.

Also disclosed herein is a kit comprising a) the fertilizer core particle disclosed herein; and b) a second nitrogen containing fertilizer composition.

Also disclosed herein is a kit comprising a) the fertilizer granule disclosed herein; and b) a fertilizer composition.

Also disclosed herein is a kit comprising a) the fertilizer core particle disclosed herein; and b) a fertilizer composition.

In one aspect, the fertilizer composition comprises micronutrient, a primary nutrient, a secondary nutrient, an insecticide, an herbicide, or a fungicide, or a combination thereof.

In one aspect, the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof. In another aspect, the second nitrogen containing fertilizer composition comprises urea. Thus, for example, the kit can comprise the fertilizer core particle disclosed herein and urea. In another example, the kit can comprise the fertilizer granule disclosed herein and urea.

The second nitrogen containing fertilizer composition can be in any suitable form, such as, for example, granules or prills. For example, the urea can be in any suitable form, such as, for example, urea granules or urea prills.

In one aspect, the kit can comprise from above 0 wt % to about 90 wt % of the fertilizer granule disclosed herein and from about 99 wt % to about 10 wt % of the second nitrogen containing fertilizer composition. For example, the kit can comprise from about 20 wt % to about 90 wt % of the fertilizer granule disclosed herein and from about 80 wt % to about 10 wt % of the second nitrogen containing fertilizer composition. In another example, the kit can comprise from about 30 wt % to about 70 wt % of the fertilizer granule disclosed herein and from about 70 wt % to about 30 wt % of the second nitrogen containing fertilizer composition.

In one aspect, the kit can comprise from above 0 wt % to about 50 wt % of the fertilizer core particle disclosed herein and from about 99 wt % to about 50 wt % of the second nitrogen containing fertilizer composition. For example, the kit can comprise from about 1 wt % to about 25 wt % of the fertilizer core particle disclosed herein and from about 99 wt % to about 75 wt % of the second nitrogen containing fertilizer composition. In another example, the kit can comprise from about 1 wt % to about 10 wt % of the fertilizer core particle disclosed herein and from about 99 wt % to about 90 wt % of the second nitrogen containing fertilizer composition.

In one aspect, the kit further comprises at least one of a micronutrient, a primary nutrient, a secondary nutrient, an insecticide, an herbicide, a fungicide, or instructions for administering an effective amount of the kit to soil in order to increase the amount of nitrogen in the soil.

F. METHODS

1. Method of Making a Composition

Also disclosed herein, is a method preparing a fertilizer core particle disclosed herein comprising the step of: a) extruding a mixture comprising one or more fertilizer additives, one or more binders, and one or more pH buffering agents, and wherein the mixture comprises from about 10 wt % to about 99 wt % of the one or more binders, thereby forming the fertilizer core particle.

Also disclosed herein is a method for preparing the fertilizer granule disclosed herein comprising the steps of: a) providing a core particle comprising one or more fertilizer additives, one or more binders, and one or more pH buffering agents, and wherein the core particle comprises from about 10 wt % to about 99 wt % of the one or more binders; and b) granulating the core particle with a second nitrogen containing fertilizer composition, thereby forming a fertilizer granule.

Also disclosed herein, is a method for preparing a fertilizer core particle comprising the step of: a) extruding a mixture comprising an inhibitor or a micronutrient or a combination thereof, one or more binders, and one or more pH buffering agents, thereby forming a fertilizer granule core, wherein the inhibitor comprises NBTPT, DMPP, TU, DCD, PPDA, Nitrapyrin, Terrazole, AM, MBT, or ST or a combination thereof, and wherein the mixture comprises from about 10 wt % to about 99 wt % of the one or more binders.

In one aspect, the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof. In another aspect, the nitrogen containing fertilizer composition comprises urea.

Also disclosed herein is a fertilizer core particle produced from the methods disclosed herein.

In one aspect, the fertilizer granule core can be a fertilizer granule core described elsewhere herein.

In one aspect, the extruding comprises extruding from an extruder at a temperature from 0° C. to 150° C. and a screw speed from 1 to 500 rpm, wherein the extruder comprises a multi-feeder comprising extrusion components. Extrusion components include, but are not limited to, the main drive, shaft, screw, barrel, and die. In one example, the temperature can be from 20° C. to 120° C. In another example, the temperature can be from 20° C. to 100° C. In yet another example, the temperature can be from 20° C. to 80° C. In yet another example, the temperature can be from 20° C. to 60° C. In yet another example, the temperature can be from 60° C. to 120° C. In one example, the screw speed from 60 to 80 rpm. In another example, the screw speed from 70 to 90 rpm. In yet another example, the screw speed from 100 to 500 rpm. In yet another example, the screw speed from 150 to 300 rpm.

In one aspect, the when the one or more binders comprise Plaster of Paris and the temperature of the extrusion is performed from about 15° C. to about 50° C.

In one aspect, the method further comprises slicing the extrudate, thereby forming a core of cylindrical shape having a diameter and a length from 0.5 mm to 2.0 mm. For example, the core can have a size from 0.7 mm to 1.5 mm.

In one aspect, the method further comprises spheronizing the core, thereby producing a core having a substantial spherical shape.

In one aspect, the method further comprises the step of fattening the fertilizer core particle with a shell comprising urea or other nitrogen fertilizer, thereby forming a fertilizer granule. The fattening process can comprise spraying molten urea or other nitrogen fertilizer onto the core. In one aspect, the fattening of the core process is a granulation process.

In one aspect, the fattening of the core with a shell produces a fertilizer granule having a size from 1.5 mm to 8.0 mm, or from 2.0 mm to 4.0 mm.

In one aspect, the mixture comprises water. Water is added to the mixture if the binder is selected so that water is required to be added to make the mixture extrudable. For example, water can be added if the binder comprises Plaster of Paris, flour, starch, or gluten, or combination thereof. In another example, water can be added if the binder comprises Plaster of Paris, flour, starch, or gluten, or combination thereof and if the binder does not comprise a wax.

In one aspect, the mixture has a moisture content from greater than 0 wt % to about 40 wt %. For example, the mixture can have a moisture content from about 10 wt % to about 40 wt %. In another aspect, the mixture can have a moisture content from about 20 wt % to about 40 wt %. In yet another aspect, the mixture can have a moisture content from about 30 wt % to about 40 wt %. In yet another aspect, the mixture can have a moisture content from greater than 0 wt % to about 20 wt %. It is understood that the moisture can be water, which is typically added prior to extrusion.

In one aspect, the method further comprises heating the fertilizer core particle, thereby drying the fertilizer core particle. The heating can be done in an oven/dryer/similar instruments. Accordingly, the method can further comprise spheronizing the fertilizer core particle in a spheronizer. The fertilizer core particle can have a moisture content from greater than 0 wt % to 4 wt % after the fertilizer core particle has been spheronized. In one aspect, the spheronizer can operate at temperatures between 50° C. and 200° C., such as, for example, between 80° C. and 150° C. In one aspect, the spheronizer can operate at temperatures between 5° C. and 95° C., such as, for example, between 20° C. and 25° C. Residence time will vary between 10 seconds to 30 minutes, such as, for example, between 15 seconds to 5 minutes or between 30 seconds to 5 minutes. RPM of spheronizer will be dependent on the size and manufacturer's instructions.

The fertilizers and methods disclosed herein have several advantages over conventional fertilizer materials and methods. For example, the disclosed fertilizer granule compositions can prevent unwanted loss of a fertilizer additive, thereby lowering cost and/or improving the performance of the fertilizer.

Figure 13:
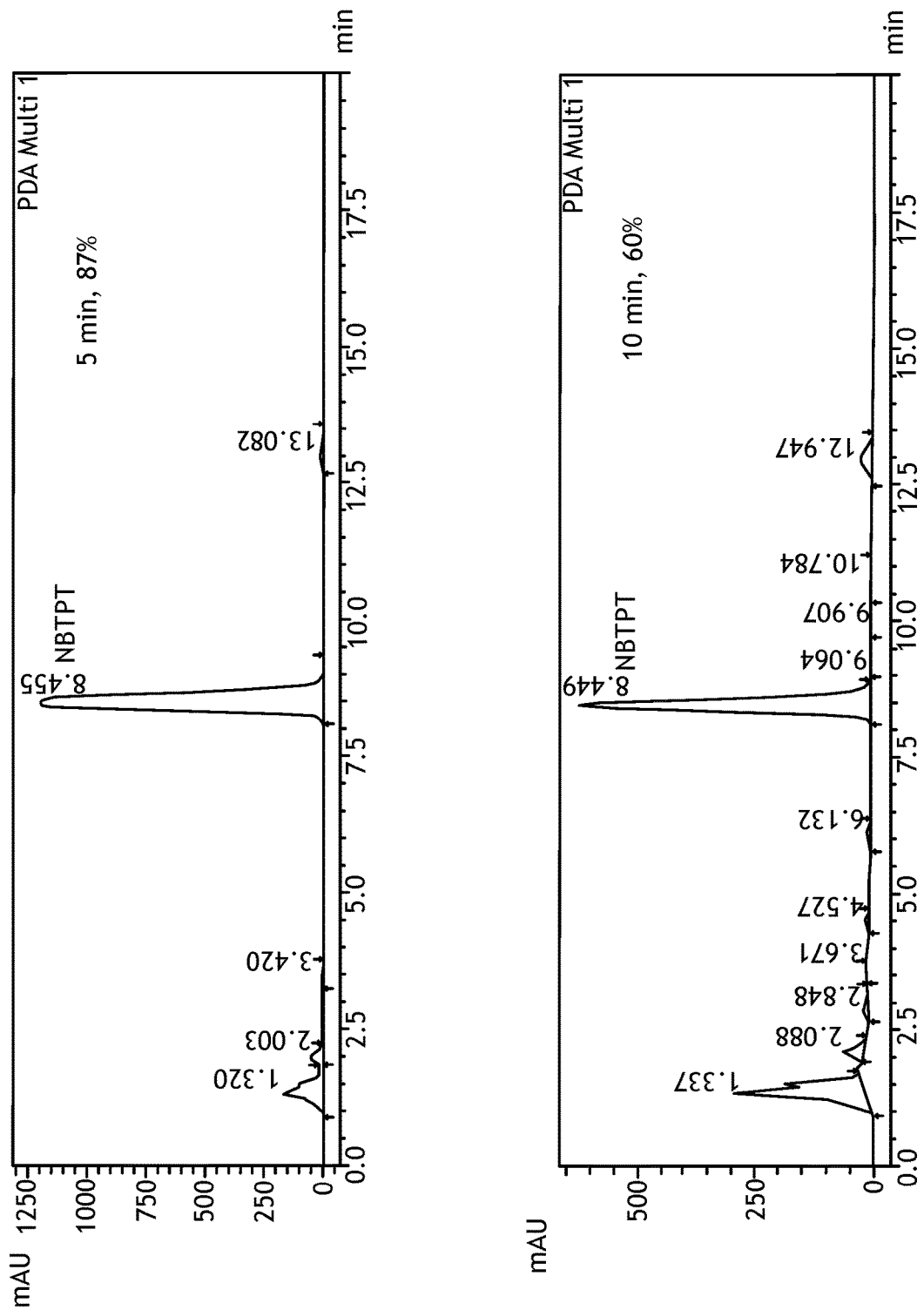
FIG. 13 shows the HPLC analysis of neat NBTPT that is exposed to 133-135° C. The percentage of intact NBTPT in the sample is shown in each chromatogram.
Figure 13:
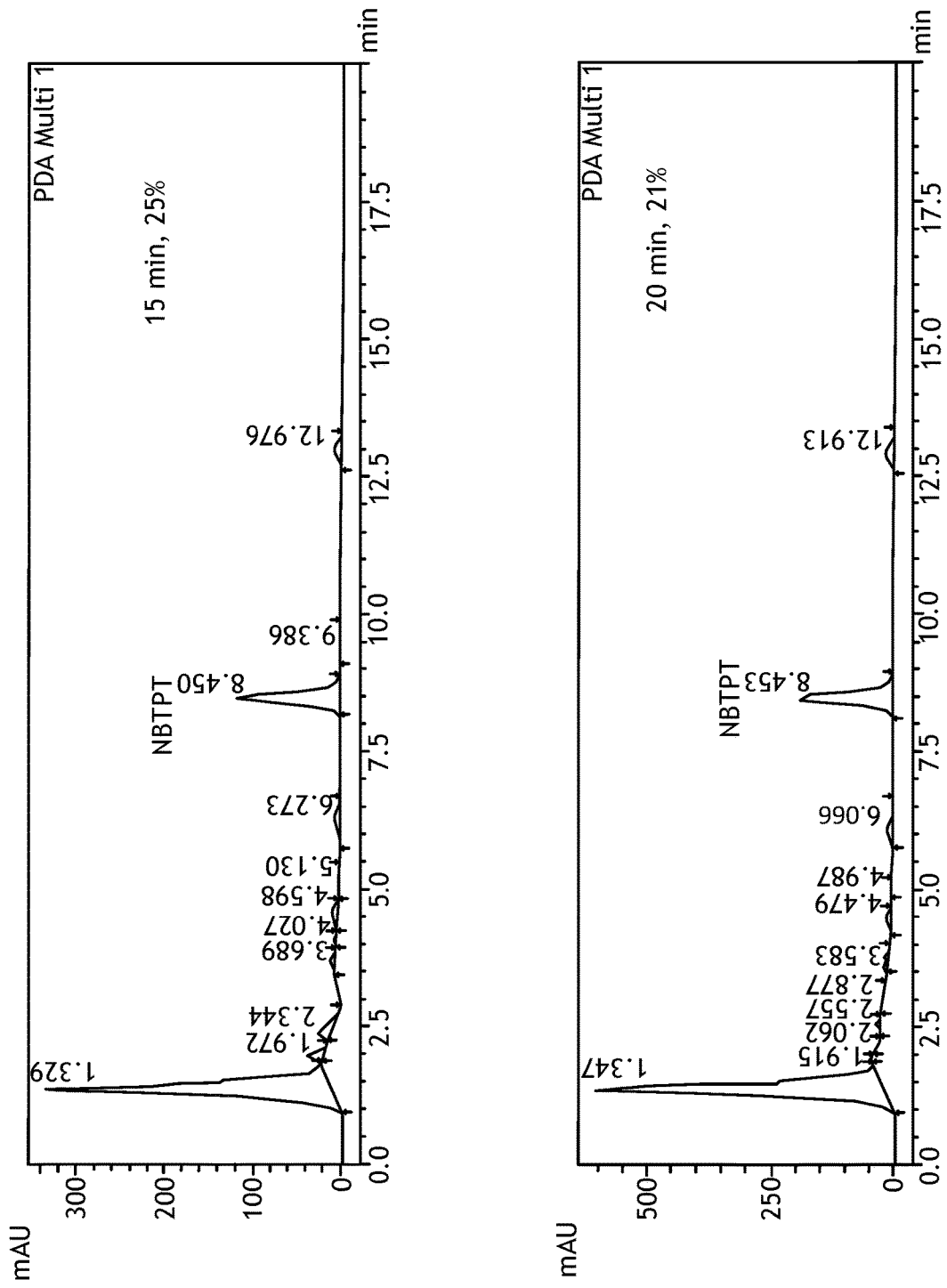
Figure 13:
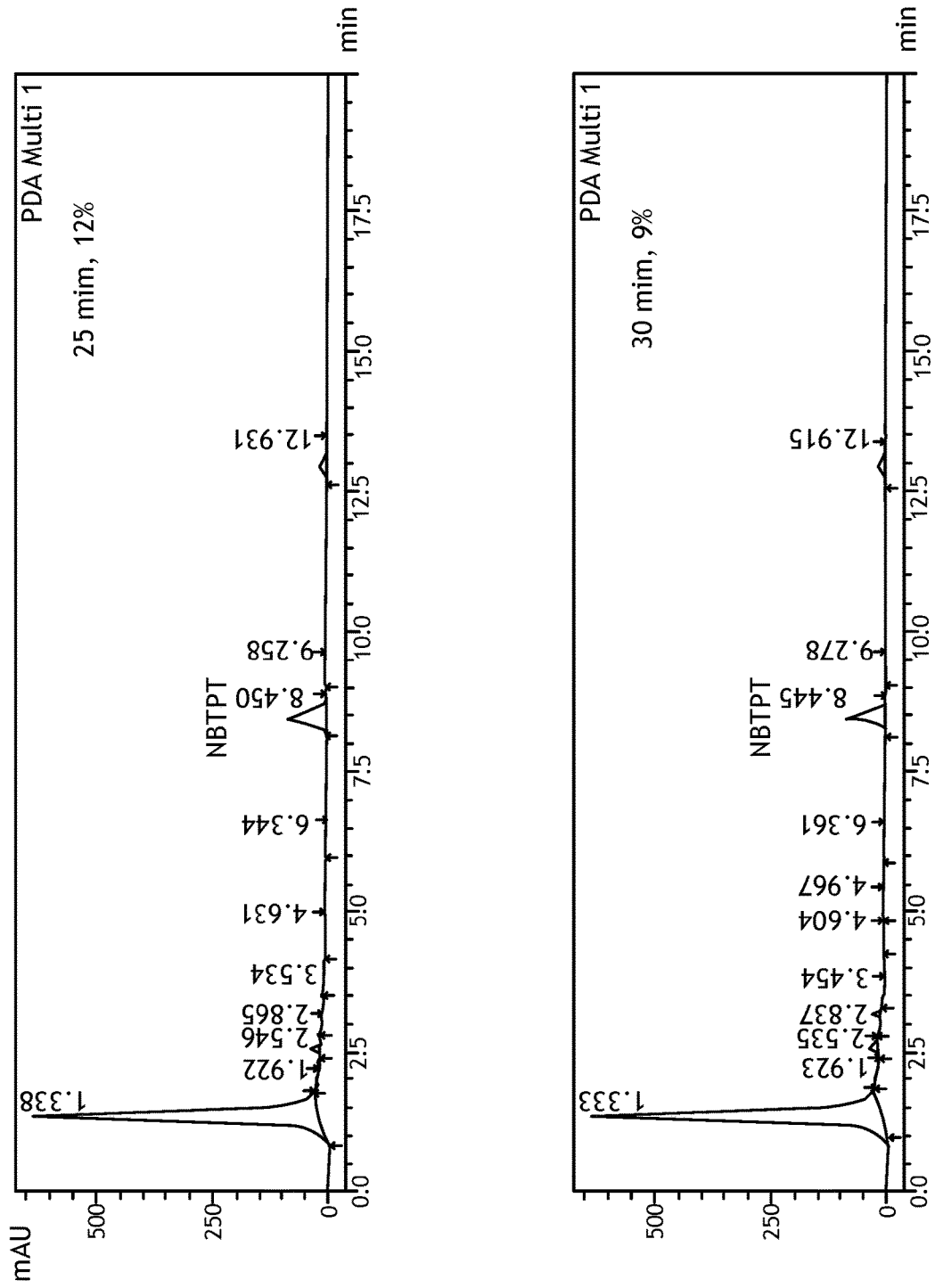

Certain fertilizer additives can be unstable and decompose at elevated temperatures. In a conventional manufacturing process, a fertilizer additive is directly exposed to the temperature of a urea melt, which is typically 133-135° C., during the granulation process. As shown in FIG. 13, in one example of this problem, neat NBTPT decomposes at this temperature over time. Accordingly, at least a portion of NBTPT is lost by using conventional methods.

Figure 14:
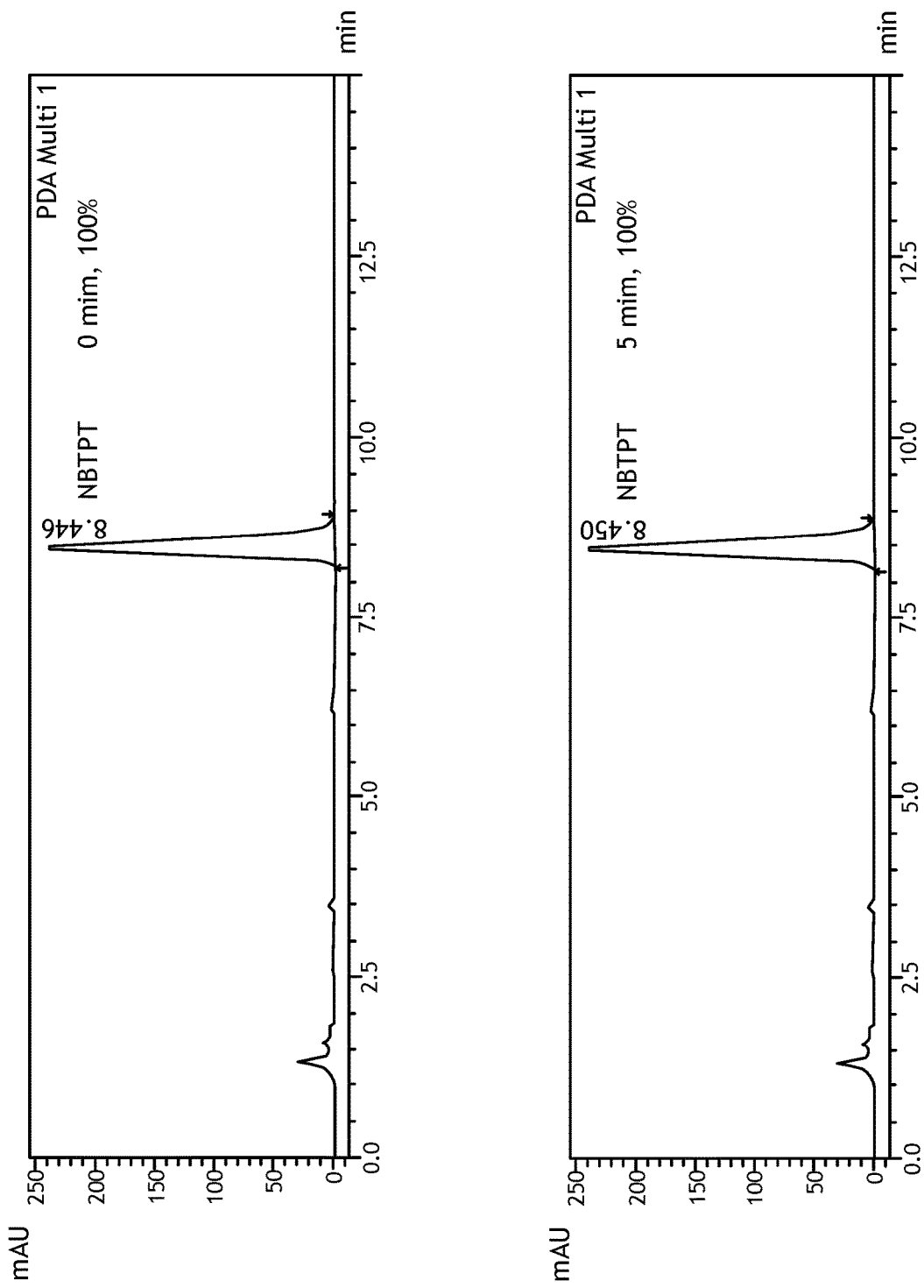
FIG. 14 shows data from the HPLC analysis of NBTPT within a core that is exposed to 133-135° C. The percentage of intact NBTPT in the sample is shown in each chromatogram.
Figure 14:
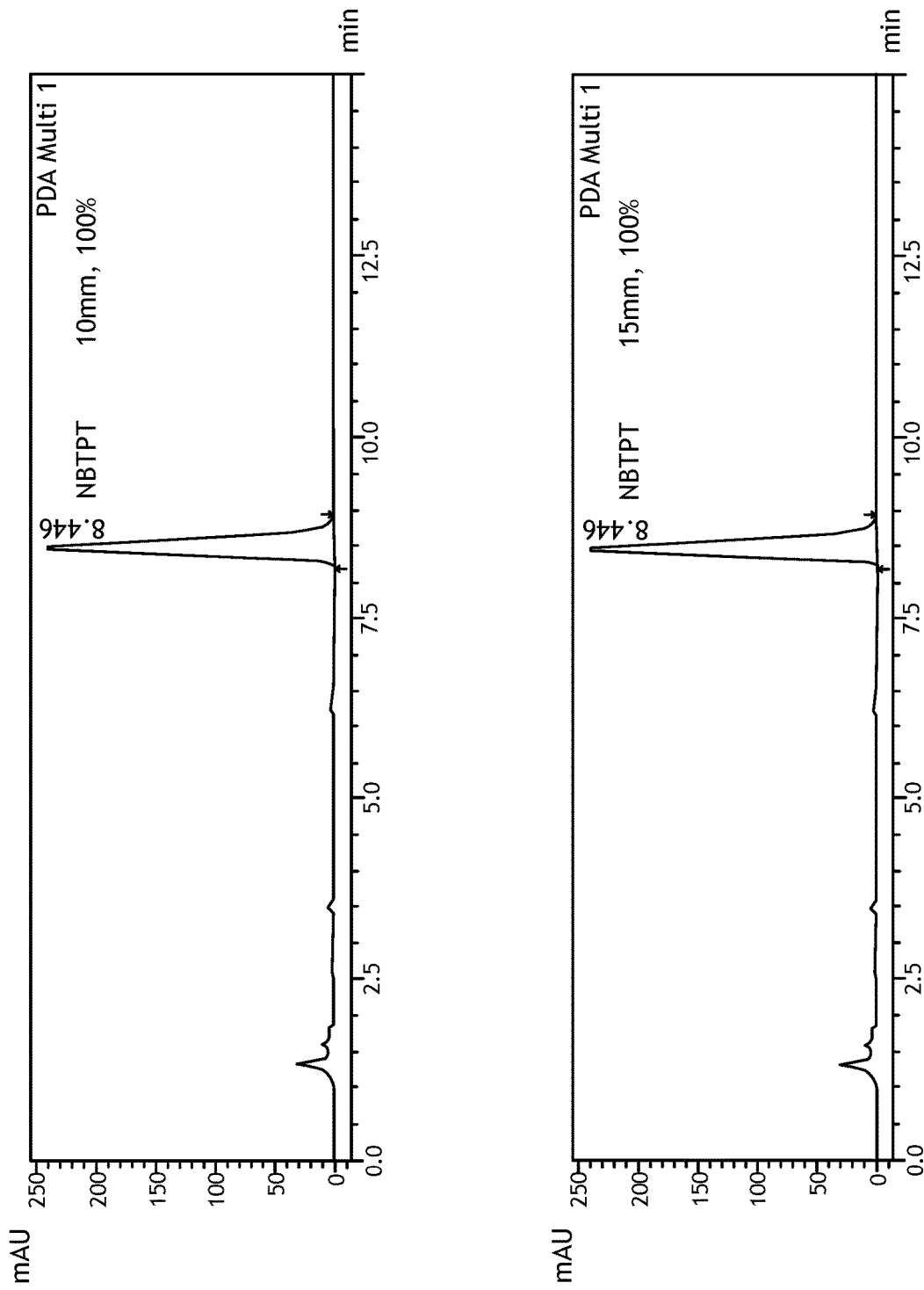
Figure 14:
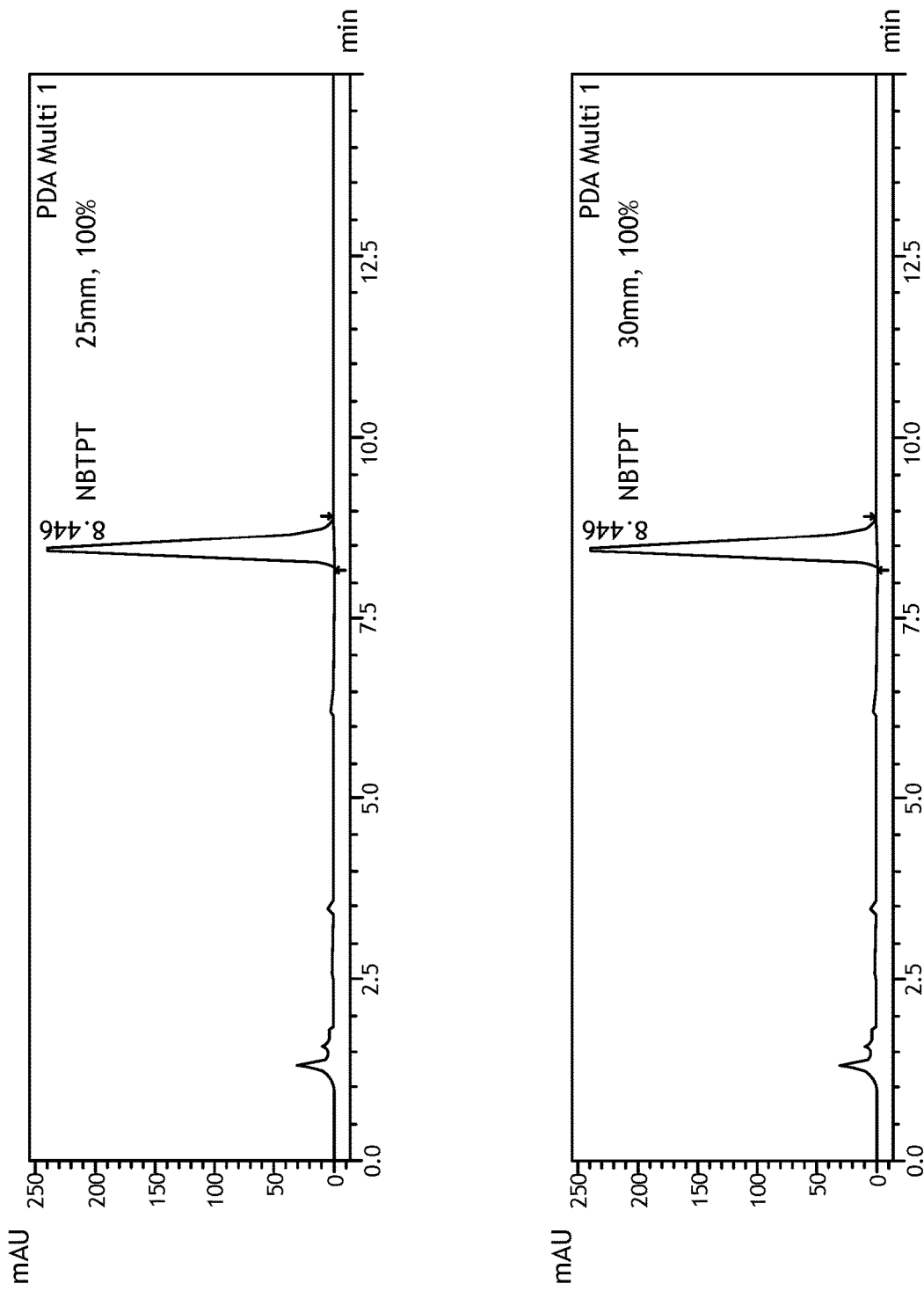

The fertilizers and methods disclosed herein protect the fertilizer additive from being directly exposed to the temperature of a urea melt during the manufacturing process. The fertilizer core particle of the fertilizer comprises a binder, which protects the fertilizer additive from being directly exposed to the urea melt and the temperature of the urea melt. As such, the fertilizer additive is protected from the elevated temperature and is less likely to decompose. As shown in FIG. 14, NBTPT within a fertilizer core particle is stable over time and does not decompose when the fertilizer core particle is exposed to 133-135° C. Thus, the fertilizers and methods disclosed herein prevent loss of a fertilizer additive, such as, for example, without limitation, an inhibitor, for example NBTPT, during the manufacturing process.

Furthermore, the fertilizer core particle disclosed herein is extrudable because of the binder. Thus, the binder also provides for a convenient method of producing a fertilizer core particle having a consistent size and composition.

Disclosed herein is also a fertilizer core particle and a method of extruding the fertilizer core particle, wherein the fertilizer core particle comprises a high amount, such as, for example, at least about 70 wt %, of at least one inorganic thixotropic ingredient, and at least one extrusion improvement ingredient. In one aspect, the fertilizer core particle comprises a high amount, such as, for example, at least about 70 wt %, such as from about 70 wt % to about 98 wt % of at least one inorganic thixotropic ingredient, and from about 30 wt % to about 2 wt % of at least one extrusion improvement ingredient.

In particular, as used herein, the at least one inorganic thixotropic ingredient is an inorganic compound that is thixotropic in nature when it mixed with a suitable liquid such as, for example, water, ethylene glycol, and glycerol, or a combination thereof. Generally, these inorganic compounds are viscous when mixed with the suitable liquid, but become less viscous when applied to stress, such as when being stirred or agitated. This reduction in viscosity also reduces the ability of the composition to flow during the extrusion process. Non-limiting examples of the at least one inorganic thixotropic ingredient include Plaster of Paris, chalk powder, $CaCO_3$, metal oxides such as alumina oxide, silica, calcium oxide, clay, such as bentonite, kaolin, cement or combinations thereof.

However, surprisingly and unexpectedly, it was found that adding an extrusion improvement ingredient to the composition containing the high amount of aforementioned at least one inorganic thixotropic ingredient improves the physical properties of the composition, such as the ability of the composition to flow during the extrusion process. As used herein, the at least one extrusion improvement ingredient is a compound, in many cases an organic compound, that improves the physical properties of the composition and facilitate the extrusion process of the composition. In some instances, a fertilizer additive, as disclosed herein, itself can be used as the at least one extrusion improvement ingredient to improve the physical properties of the composition and facilitate the extrusion process. In another aspect, the at least one extrusion improvement ingredient can comprise at least one viscoelastic agent. As disclosed herein, the addition of the at least one viscoelastic agent shows a further improvement of the physical properties. In yet another aspect, the at least one extrusion improvement ingredient can comprise a binder being an organic compound, such as, for example, flour comprising bleached wheat flour. In yet another aspect, the at least one extrusion improvement ingredient can comprise guar gum, gluten, or urea. In particular, cellulose, cellulose derivatives and/or combinations thereof give desirable physical properties such that these compositions are amenable to extrusion and pelletization processes. For example, hydroxypropyl methylcellulose (HPMC) not only facilitates the extrusion process, but also improves the physical properties of the extruded particles. For example, crush strength and abrasion resistance improves significantly in formulations containing HPMC. In some exemplary formulations, the fertilizer core particle comprises at least one viscoelastic material as the at least one extrusion improvement ingredient from about 0.2 wt % to about 5 wt %, such as from about 0.2 wt % to about 0.5 wt %, wherein the at least one viscoelastic material is selected from the group consisting of hydroxypropyl methylcellulose, hydroxyethyl methylcellulose, methylcellulose, ethylcellulose, ethyl methyl cellulose, hydroxy ethyl cellulose, hydroxypropyl cellulose, ethyl hydroxyethyl cellulose, carboxymethyl cellulose, hyaluronic acid, chondroitin sulphate, dermatan sulphate, heparin, heparan sulphate, keratan sulphate, alginic acid, polymannuronic acid, polyguluronic acid, polyglucuronic acid, amylose, amylopectin, callose, chitosan, poly-galactomannan, dextran, and xanthan, or a combination thereof. In yet another aspect, the at least one extrusion improvement ingredient can comprise at least one viscoelastic agent and at least one fertilizer additive.

For example, particular formulations are illustrated in Tables 3A (F-46HND, F-47ND, F-48ND, F-50ND, F-51N, F-52BND) and 3B (NBTPT, NBTPT+DCD and DCD only) comprise at least about 70% of inorganic thixotropic ingredients. For instance, F-52BND comprises inorganic thixotropic ingredients Plaster of Paris and chalk powder in about 40 wt % and 31 wt % respectively, with the remainder being organic materials (DCD, NBTPT, and bleached wheat flour). In another example, DCD, which is a small organic molecule, in appropriate amounts, can improve the physical properties of the composition. One such composition is the DCD only composition, which is illustrated in Table 3B. In this composition, the amount of DCD is about 25 wt %.

2. Method of Using a Composition

Also disclosed herein is a method for increasing the amount of nitrogen in soil comprising the step of: a) applying to the soil an effective amount of the fertilizer granule disclosed herein, thereby increasing the amount of nitrogen in the soil.

Also disclosed herein is a method for increasing the amount of nitrogen in soil comprising the step of: a) applying to the soil an effective amount of the composition disclosed herein, thereby increasing the amount of nitrogen in the soil. For example, the composition can comprise the fertilizer granule disclosed herein and a nitrogen containing fertilizer composition. In another example, the composition can comprise the fertilizer core particle disclosed herein and a nitrogen containing fertilizer composition. In yet another example, the composition can comprise the fertilizer granule disclosed herein and a fertilizer composition. In yet another example, the composition can comprise the fertilizer core particle disclosed herein and a fertilizer composition.

In one aspect, the method of increasing the amount of nitrogen in the soil also promotes the growth of a plant, such as, for example, promotes the growth of a crop. The crop can be for example, but not limited to, rice, wheat, corn, barley, oats, and soybeans.

In one aspect, less than 20 wt % of the nitrogen added by the fertilizer granule is lost after being exposed to the soil for 17 days.

In one aspect, less percentage of the nitrogen added by the fertilizer granule is lost in the soil after being exposed to the soil for 17 days as compared to the percentage of nitrogen lost when Agrotain® or SuperU® is added to identical soil for 17 days under the same conditions.

Agrotain® is sold by Koch Fertilizer, LLC. Agrotain® is a NBTPT containing liquid formulation, with NMP as the main solvent with other additives to allow for spreading of this liquid onto urea granules, generally at the farmer site. Thus it requires an additional step before being used by the farmer and incorporates the toxic solvent NMP. Tremendous odor is evident during usage.

SuperU® is sold by Koch Fertilizer, LLC. SuperU® is a formulation of urea containing both NBTPT and DCD prepared by adding these two inhibitors in the urea melt during granulation.

G. SYSTEM

Also disclosed herein is a system comprising an extruder capable of extruding a fertilizer core particle disclosed herein.

The extruder comprises a multi-feeder comprising extrusion components. Extrusion components include, but are not limited to, the main drive, shaft, screw, barrel, and die.

Also disclosed herein is a system for forming a fertilizer granule comprising a granulator capable of granulating a core particle with at least one of nitrogen containing fertilizer to form a fertilizer granule, wherein the granulator comprising an inlet for feeding the core particle.

In one aspect, the system for forming a fertilizer granule comprises a) an extruder capable of extruding a fertilizer core particle; and b) a granulator capable of granulating the fertilizer core particle. In one aspect, the system further comprises means for transporting an extruded fertilizer core particle from the extruder to the granulator. The means for transporting can be a belt or other device capable of collecting a fertilizer core particle at the extruder and moving it into the granulator.

In one aspect, the granulator comprises a coating device, such as, for example, a nozzle for spraying molten urea onto the fertilizer core particle.

In one aspect, the system further comprises a cooler. The cooler is capable of cooling down the fertilizer granules exiting the granulator. Thus, in one aspect, the system further comprises means for transporting the fertilizer granule from the granulator to the cooler. In one aspect, the cooler comprises a fan or refrigeration unit.

H. ASPECTS

The disclosed methods include at least the following aspects.

Aspect 1: A fertilizer core particle having an outer surface and comprising one or more fertilizer additives, one or more binders, and one or more pH buffering agents, and wherein the fertilizer core particle comprises from about 10 wt % to about 99 wt % of the one or more binders.

Aspect 2: The fertilizer core particle of aspect 1, wherein the one or more fertilizer additives comprise a urease inhibitor or a nitrification inhibitor, or a combination thereof.

Aspect 3: The fertilizer core particle of aspects 1 or 2, wherein the one or more fertilizer additives comprise a urease inhibitor and a nitrification inhibitor.

Aspect 4: The fertilizer core particle of any one of aspects 2 or 3, wherein the urease inhibitor comprises N-(n-butyl) thiophosphoric triamide (NBTPT) or phenyl phosphorodiamidate (PPDA), or a combination thereof.

Aspect 5: The fertilizer core particle of any one of aspects 2-4, wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof.

Aspect 6: The fertilizer core particle of any one of aspects 2-4, wherein the one or more inhibitors comprise NBTPT and DCD.

Aspect 7: The fertilizer core particle of any one of aspects 1-6, wherein the one or more pH buffering agents comprise chalk powder, $CaCO_3$, $MgO$, $KH_2PO_4$, or $NaHCO_3$, or a combination thereof.

Aspect 8: The fertilizer core particle of any one of aspects 1-7, wherein the one or more pH buffering agents comprise CaCO3.

Aspect 9: The fertilizer core particle of any one of aspects 1-8, wherein the fertilizer core particle comprises from about 40 wt % to about 70 wt % of the one or more binders.

Aspect 10: The fertilizer core particle of any one of aspects 1-8, wherein the fertilizer core particle comprises from about 20 wt % to about 40 wt % of the one or more binders.

Aspect 11: The fertilizer core particle of any one of aspects 1-10, wherein the fertilizer core particle comprises from about 5 wt % to about 60 wt % of the one or more pH buffering agent.

Aspect 12: The fertilizer core particle of any one of aspects 1-11, wherein the fertilizer core particle comprises from about 20 wt % to about 60 wt % of the one or more pH buffering agent.

Aspect 13: The fertilizer core particle of any one of aspects 1-12, wherein the fertilizer core particle comprises from about 40 wt % to about 60 wt % of the one or more pH buffering agent.

Aspect 14: The fertilizer core particle of any one of aspects 1-13, wherein the fertilizer core particle comprises from about 5 wt % to about 30 wt % of the one or more pH buffering agent.

Aspect 15: The fertilizer core particle of any one of aspects 1-13, the fertilizer core particle further comprises from greater than 0 wt % to 60 wt % of a filler.

Aspect 16: The fertilizer core particle of any one of aspects 1-15, wherein the fertilizer core particle is an extruded core particle.

Aspect 17: The fertilizer core particle of any one of aspects 1-15, wherein the one or more binders comprises Plaster of Paris, flour, biodegradable bleached wheat flour, starch, or gluten, or combination thereof.

Aspect 18: The fertilizer core particle of any one of aspects 1-15, wherein the one or more binders comprises Plaster of Paris and biodegradable bleached wheat flour.

Aspect 19: The fertilizer core particle of any one of aspects 1-15, wherein the one or more binders comprise Plaster of Paris.

Aspect 20: The fertilizer core particle of any one of aspects 1-19, wherein the one or more fertilizer additives comprises a micronutrient, a primary nutrient, a secondary nutrient, an insecticide, an herbicide, or a fungicide, or combination thereof.

Aspect 21: The fertilizer core particle of any one of aspects 1-20, wherein core particle comprises from 20 wt % to 60 wt % of Plaster of Paris, from 5 wt % to 40 wt % of flour comprising bleached wheat flour, from 10 wt % to 30 wt % of DCD, from more than 0 wt % to 5 wt % of NBTPT, and from about 15 wt % to about 50 wt % of the one or more pH buffering agents.

Aspect 22: The fertilizer core particle of any one of aspects 1-20, wherein the fertilizer core particle comprises from 40 wt % to 60 wt % of Plaster of Paris, from 5 wt % to 10 wt % of flour comprising bleached wheat flour, from more than 0 wt % to 5 wt % of NBTPT, and from about 30 wt % to about 50 wt % of the one or more pH buffering agents.

Aspect 23: The fertilizer core particle of any one of aspects 1-20, wherein the fertilizer core particle comprises from 20 wt % to 30 wt % of Plaster of Paris, from more than 0 wt % to 10 wt % of flour comprising bleached wheat flour, from more than 0 wt % to 5 wt % of NBTPT, from 20 wt % to 30 wt % of DCD, and from about 30 wt % to about 50 wt % of the one or more pH buffering agents.

Aspect 24: The fertilizer core particle of any one of aspects 1-20, wherein the fertilizer core particle comprises from 20 wt % to 40 wt % of Plaster of Paris, from more than 0 wt % to 10 wt % of flour comprising bleached wheat flour, from 20 wt % to 30 wt % of DCD, and from about 30 wt % to about 50 wt % of the one or more pH buffering agents.

Aspect 25: The fertilizer core particle of any one of aspects 21-24, wherein the one or more pH buffering agents comprise CaCO3.

Aspect 26: The fertilizer core particle of any one of aspects 1-25, wherein the fertilizer core particle further comprises one or more viscoelasticity agents.

Aspect 27: The fertilizer core particle of aspect 26, wherein the one or more viscoelasticity agents is hydroxypropyl methylcellulose (HPMC).

Aspect 28: The fertilizer core particle of any one of aspects 26-27, wherein the fertilizer core particle comprises about 0.8% of the one or more viscoelasticity agents.

Aspect 29: A fertilizer core particle having an outer surface and comprising one or more fertilizer additives, one or more binders, one or more viscoelasticity agents, and one or more pH buffering agents, wherein the fertilizer core particle comprises from about 10 wt % to about 99 wt % of the one or more binders, and wherein the fertilizer core particle comprises from more than 0 wt % to about 5 wt % of the one or more viscoelasticity agents.

Aspect 30: The fertilizer core particle of aspect 29, wherein the one or more fertilizer additives comprise a urease inhibitor or a nitrification inhibitor, or a combination thereof.

Aspect 31: The fertilizer core particle of aspects 29 or 30, wherein the one or more fertilizer additives comprise a urease inhibitor and a nitrification inhibitor.

Aspect 32: The fertilizer core particle of any one of aspects 30 or 31, wherein the urease inhibitor comprises N-(n-butyl) thiophosphoric triamide (NBTPT) or phenyl phosphorodiamidate (PPDA), or a combination thereof.

Aspect 33: The fertilizer core particle of any one of aspects 30-32, wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof.

Aspect 34: The fertilizer core particle of any one of aspects 30-32, wherein the one or more inhibitors comprise NBTPT.

Aspect 35: The fertilizer core particle of any one of aspects 29-34, wherein the one or more pH buffering agents comprise chalk powder, $CaCO_3$, MgO, $KH_2PO_4$, or $NaHCO_3$, or a combination thereof.

Aspect 36: The fertilizer core particle of any one of aspects 29-35, wherein the one or more pH buffering agents comprise $CaCO_3$.

Aspect 37: The fertilizer core particle of any one of aspects 29-36, wherein the fertilizer core particle comprises from about 40 wt % to about 70 wt % of the one or more binders.

Aspect 38: The fertilizer core particle of any one of aspects 29-36, wherein the fertilizer core particle comprises from about 20 wt % to about 40 wt % of the one or more binders.

Aspect 39: The fertilizer core particle of any one of aspects 29-38, wherein the fertilizer core particle comprises from about 5 wt % to about 60 wt % of the one or more pH buffering agent.

Aspect 40: The fertilizer core particle of any one of aspects 29-39, wherein the fertilizer core particle comprises from about 20 wt % to about 60 wt % of the one or more pH buffering agent.

Aspect 41: The fertilizer core particle of any one of aspects 29-40, wherein the fertilizer core particle comprises from about 30 wt % to about 50 wt % of the one or more pH buffering agent.

Aspect 42: The fertilizer core particle of any one of aspects 29-41, wherein the fertilizer core particle comprises from about 5 wt % to about 30 wt % of the one or more pH buffering agent.

Aspect 43: The fertilizer core particle of any one of aspects 29-41, the fertilizer core particle further comprises from greater than 0 wt % to 60 wt % of a filler.

Aspect 44: The fertilizer core particle of any one of aspects 29-43, wherein the fertilizer core particle is an extruded core particle.

Aspect 45: The fertilizer core particle of any one of aspects 29-43, wherein the one or more binders comprises Plaster of Paris, flour, biodegradable bleached wheat flour, starch, or gluten, or combination thereof.

Aspect 46: The fertilizer core particle of any one of aspects 29-43, wherein the one or more binders comprises Plaster of Paris and biodegradable bleached wheat flour.

Aspect 47: The fertilizer core particle of any one of aspects 29-43, wherein the one or more binders comprise Plaster of Paris.

Aspect 48: The fertilizer core particle of any one of aspects 29-43, wherein the one or more fertilizer additives comprises a micronutrient, a primary nutrient, a secondary nutrient, an insecticide, an herbicide, or a fungicide, or combination thereof.

Aspect 49: The fertilizer core particle of any one of aspects 29-48, wherein the fertilizer core particle comprises from about 0.05 wt % to about 2.0 wt % of the one or more viscoelasticity agents.

Aspect 50: The fertilizer core particle of any one of aspects 29-48, wherein the fertilizer core particle comprises from about 0.2 wt % to about 0.5 wt % of the one or more viscoelasticity agents.

Aspect 51: The fertilizer core particle of any one of aspects 29-50, wherein the fertilizer core particle comprises one or more viscoelasticity agents selected from the group consisting of a cellulose, a cellulose ether, a polysaccharide, and a glycosaminoglycan, or a combination thereof.

Aspect 52: The fertilizer core particle of any one of aspects 29-50, wherein the fertilizer core particle comprises one or more viscoelasticity agents selected from the group consisting of hydroxypropyl methylcellulose, hydroxyethyl methylcellulose, methylcellulose, ethylcellulose, ethyl methyl cellulose, hydroxy ethyl cellulose, hydroxypropyl cellulose, ethyl hydroxyethyl cellulose, carboxymethyl cellulose, hyaluronic acid, chondroitin sulphate, dermatan sulphate, heparin, heparan sulphate, keratan sulphate, alginic acid, polymannuronic acid, polyguluronic acid, polyglucuronic acid, amylose, amylopectin, callose, chitosan, polygalactomannan, dextran, and xanthan, or a combination thereof.

Aspect 53: The fertilizer core particle of aspect 52, wherein the one or more viscoelasticity agents is hydroxypropyl methylcellulose.

Aspect 54: The fertilizer core particle of any one of aspects 29-53, wherein the fertilizer core particle comprises from 40 wt % to 60 wt % of Plaster of Paris, from 5 wt % to 10 wt % of flour comprising bleached wheat flour, from more than 0 wt % to 5 wt % of NBTPT, from about 0.2 wt % to about 0.5 wt % of the one or more viscoelasticity agents, and from about 30 wt % to about 50 wt % of the one or more pH buffering agents.

Aspect 55: The fertilizer core particle of any one of aspects 29-53, wherein the fertilizer core particle comprises from 20 wt % to 30 wt % of Plaster of Paris, from more than 0 wt % to 10 wt % of flour comprising bleached wheat flour, from more than 0 wt % to 5 wt % of NBTPT, from 20 wt % to 30 wt % of DCD, from about 0.2 wt % to about 0.5 wt % of the one or more viscoelasticity agents, and from about 30 wt % to about 50 wt % of the one or more pH buffering agents.

Aspect 56: The fertilizer core particle of any one of aspects 29-53, wherein the fertilizer core particle comprises from 20 wt % to 40 wt % of Plaster of Paris, from more than 0 wt % to 10 wt % of flour comprising bleached wheat flour, from 20 wt % to 30 wt % of DCD, from about 0.2 wt % to about 0.5 wt % of the one or more viscoelasticity agents, and from about 30 wt % to about 50 wt % of the one or more pH buffering agents.

Aspect 57: The fertilizer core particle of any one of aspects 29-56, wherein the one or more pH buffering agents comprises CaCO3.

Aspect 58: A fertilizer granule comprising the fertilizer core particle of any one of aspects 1-57, wherein the fertilizer granule further comprises a first nitrogen containing fertilizer composition in contact with the outer surface of the fertilizer core particle.

Aspect 59: The fertilizer granule of aspect 58, wherein an outer shell comprising a first nitrogen containing fertilizer composition at least partially surrounds the fertilizer core particle.

Aspect 60: The fertilizer granule of aspects 58 or 59, wherein the first nitrogen containing fertilizer composition comprises urea.

Aspect 61: The fertilizer granule of any one of aspect 58-60, wherein the outer shell substantially surrounds the fertilizer core particle.

Aspect 62: The fertilizer granule of any one of aspect 58-60, wherein the outer shell fully surrounds the fertilizer core particle.

Aspect 63: The fertilizer granule of any one of aspects any one of aspect 58-62, wherein the first nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 64: The fertilizer granule any one of aspects 59-63, wherein the outer shell substantially comprises urea.

Aspect 65: The fertilizer granule of any one of aspects 58-64, wherein the fertilizer core particle is the fertilizer core particle of any one of aspects 22-24 or 54-56, and wherein an outer shell substantially comprising urea at least partially surrounds the fertilizer core particle.

Aspect 66: The fertilizer granule of any one of aspects 58-65, wherein less than 20 wt % of the nitrogen in the first nitrogen containing fertilizer composition is lost after being exposed to Greenville soil for 20 days.

Aspect 67: The fertilizer granule of any one of aspects 58-65, wherein less than 20 wt % of the nitrogen in the first nitrogen containing fertilizer granule is lost after being exposed to upland crowley soil for 17 days.

Aspect 68: The fertilizer granule of any one of aspects 58-65, wherein less nitrogen in the first nitrogen containing fertilizer granule is lost after being exposed to upland crowley soil for 17 days as compared to Agrotain® or SuperU® being exposed to upland crowley soil for 17 days under the same conditions.

Aspect 69: A composition comprising the fertilizer granule of any one of aspects 58-68 and a second nitrogen containing fertilizer composition.

Aspect 70: The composition of aspect 69, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 71: The composition of aspect 69, wherein the second nitrogen containing fertilizer composition comprises urea.

Aspect 72: A composition comprising the fertilizer granule of any one of aspects 58-68 and a fertilizer composition.

Aspect 73: A composition comprising the fertilizer core particle of any one of aspects 1-57 and a nitrogen containing fertilizer composition.

Aspect 74: The composition of aspect 73, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 75: The composition of aspect 73, wherein the second nitrogen containing fertilizer composition comprises urea.

Aspect 76: A composition comprising the fertilizer core particle of any one of aspects 1-57 and a fertilizer composition.

Aspect 77: A composition comprising the fertilizer granule of any one of aspects 58-68 and a fertilizer composition.

Aspect 78: A kit comprising: a) the fertilizer granule of any one of aspects 58-68; and b) a second nitrogen containing fertilizer composition.

Aspect 79: The kit of aspect 78, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 80: The kit of aspect 78, wherein the second nitrogen containing fertilizer composition comprises urea.

Aspect 81: The kit of any one of aspects 78-80, wherein the kit further comprises at least one of a micronutrient, a primary nutrient, a secondary nutrient, an insecticide, an herbicide, a fungicide, or instructions for administering an effective amount of the kit to soil in order to increase the amount of nitrogen in the soil.

Aspect 82: A kit comprising: a) the fertilizer granule of any one of aspects 58-68; and b) a fertilizer composition.

Aspect 83: A kit comprising: a) the fertilizer core particle of any one of aspects 1-57; and b) a second nitrogen containing fertilizer composition.

Aspect 84: The kit of aspect 83, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 85: The kit of aspect 83, wherein the second nitrogen containing fertilizer composition comprises urea.

Aspect 86: The kit of any one of aspects 83-85, wherein the kit further comprises at least one of a micronutrient, a primary nutrient, a secondary nutrient, an insecticide, an herbicide, a fungicide, or instructions for administering an effective amount of the kit to soil in order to increase the amount of nitrogen in the soil.

Aspect 87: A kit comprising: a) the fertilizer core particle of any one of aspects 1-57; and b) a second nitrogen containing fertilizer composition.

Aspect 88: A method for preparing the fertilizer core particle of any one of aspects 1-57 comprising the step of: a) extruding a mixture comprising one or more fertilizer additives, one or more binders, and one or more pH buffering agents, and wherein the mixture comprises from about 10 wt % to about 99 wt % of the one or more binders, thereby forming the fertilizer core particle.

Aspect 89: The method of aspect 88, wherein the temperature of the extrusion is performed from about 5° C. to about 150° C.

Aspect 90: The method of aspect 88 or 89, wherein the one or more binders comprise Plaster of Paris and the temperature of the extrusion is performed from about 5° C. to about 35° C.

Aspect 91: The method of any one of aspects 88-90, wherein the extrusion is performed by a screw having from about 100 to about 500 revolutions per minute (rpm).

Aspect 92: The method of any one of aspects 88-91, wherein the one or more fertilizer additives comprise a urease inhibitor or a nitrification inhibitor, or a combination thereof.

Aspect 93: The method of any one of aspects 88-92, wherein the one or more fertilizer additives comprise a urease inhibitor and a nitrification inhibitor.

Aspect 94: The method of any one of aspects 92 or 93, wherein the urease inhibitor comprises N-(n-butyl) thiophosphoric triamide (NBTPT) or phenyl phosphorodiamidate (PPDA), or a combination thereof.

Aspect 95: The method of any one of aspects 92-94, wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof.

Aspect 96: The method of any one of aspects 92-95, wherein the one or more inhibitors comprise NBTPT and DCD.

Aspect 97: The method of any one of aspects 87-96, wherein the one or more pH buffering agents comprise $CaCO_3$, $MgO$, $KH_2PO_4$, or $NaHCO_3$, or a combination thereof.

Aspect 98: The method of any one of aspects 88-96, wherein the one or more pH buffering agents comprise $CaCO_3$.

Aspect 99: The method of any one of aspects 88-98, wherein the one or more binders comprises Plaster of Paris, flour, biodegradable bleached wheat flour, starch, or gluten, or combination thereof.

Aspect 100: The method of any one of aspects 88-98, wherein the one or more binders comprises Plaster of Paris and biodegradable bleached wheat flour.

Aspect 101: The method of any one of aspects 88-98, wherein the one or more binders comprise Plaster of Paris.

Aspect 102: The method of any one of aspects 88-101, wherein the mixture further comprises one or more viscoelasticity agents.

Aspect 103: The method of aspect 102, wherein the mixture comprises from more than 0 wt % to about 5.0 wt % of the one or more viscoelasticity agents.

Aspect 104: The method of aspect 102, wherein the mixture comprises from about 0.05 wt % to about 2.0 wt % of the one or more viscoelasticity agents.

Aspect 105: The method of aspect 102, wherein the mixture comprises from about 0.2 wt % to about 0.5 wt % of the one or more viscoelasticity agents.

Aspect 106: The method of any one of aspects 102-105, wherein core particle further comprises a viscoelasticity agent is selected from the group consisting of a cellulose, a cellulose ether, a polysaccharide, and a glycosaminoglycan, or a combination thereof.

Aspect 107: The method of any one of aspects 88-105, wherein core particle further comprises a viscoelasticity agent is selected from the group consisting of hydroxypropyl methylcellulose, hydroxyethyl methylcellulose, methylcellulose, ethylcellulose, ethyl methyl cellulose, hydroxy ethyl cellulose, hydroxypropyl cellulose, ethyl hydroxyethyl cellulose, carboxymethyl cellulose, hyaluronic acid, chondroitin sulphate, dermatan sulphate, heparin, heparan sulphate, keratan sulphate, alginic acid, polymannuronic acid, polyguluronic acid, polyglucuronic acid, amylose, amylopectin, callose, chitosan, poly-galactomannan, dextran, and xanthan, or a combination thereof.

Aspect 108: The method of aspect 107, wherein the one or more viscoelasticity agent is hydroxypropyl methylcellulose.

Aspect 109: An extruder for performing any of aspects 88-101.

Aspect 110: A method for preparing a fertilizer granule of any one of aspects 58-68 comprising the steps of: a) providing a core particle of any one of aspects 1-57; and b) granulating the core particle with a first nitrogen containing fertilizer composition, thereby forming a fertilizer granule.

Aspect 111: The method of aspect 110, wherein the fertilizer granule has a longest dimension from 1.5 mm to 8.0 mm.

Aspect 112: The method of any one of aspects 110-111, wherein the step of providing the core particle comprises the step of extruding a mixture comprising one or more fertilizer additives, one or more binders, and one or more pH buffering agents, and wherein the mixture comprises from about 10 wt % to about 99 wt % of the one or more binders, thereby forming the core particle.

Aspect 113: The method of any one of aspects 110-112, wherein the method further comprises the step of cooling the fertilizer granule.

Aspect 114: The method of any one of aspects 110-113, wherein the binder comprises Plaster of Paris.

Aspect 115: The method of any one of aspects 110-114, wherein the first nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 116: The method of any one of aspects 110-114, wherein the first nitrogen containing fertilizer composition comprises urea.

Aspect 117: A system for forming a fertilizer granule comprising a granulator capable of granulating an extruded fertilizer core particle with at least one of nitrogen fertilizer to form a fertilizer granule, wherein the granulator comprising an inlet for feeding the extruded fertilizer core particle.

Aspect 118: The system of aspect 117, wherein the at least one of nitrogen fertilizer comprises urea.

Aspect 119: The system of aspects 117 or 118, wherein the system further comprises a cooler for cooling the fertilizer granule.

Aspect 120: The system of any one of aspects 117-119, wherein the system further comprises an extruder.

Aspect 121: The system of aspects 117-120, wherein the system further comprises a means for transporting the fertilizer granule from the granulator to the cooler.

Aspect 122: A method for increasing the amount of nitrogen in soil comprising the step of: a) applying to the soil an effective amount of the fertilizer granule of any one of aspects 29-68, thereby increasing the amount of nitrogen in the soil.

Aspect 123: The method of aspect 122 wherein less than 20 wt % of the nitrogen added by the fertilizer granule is lost after being exposed to the soil for 17 days.

Aspect 124: The method of aspect 122, wherein less percentage of the nitrogen added by the fertilizer granule is lost in the soil after being exposed to the soil for 17 days as compared to the percentage of nitrogen lost when Agrotain® or SuperU® is added to identical soil for 17 days under the same conditions.

Aspect 125: The method of anyone of aspects 122-124, wherein the method promotes the growth of a plant.

Aspect 126: A method comprising the step of: a) Applying to the soil an effective amount of the fertilizer core particle of any one of aspects 1-57, thereby applying one or more a fertilizer additives to the soil.

I. EXAMPLES

The following examples are put forth so as to provide those of ordinary skill in the art with a complete disclosure and description of how the compounds, compositions, articles, devices, and/or methods described and aspected herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

1. Example 1

Described herein are fertilizer compositions that can be made using an extrusion process. Provided in this example are exemplary procedures for making core particles containing inhibitors and/or micronutrients for enhanced efficiency fertilizers.

i. Materials

Technical grade urea was received from SABIC, P.O. Box 5101, Riyadh 11422, Saudi Arabia. Waxes such as soy wax, palm wax and castor wax were received as samples from Ruchi Soya Industries Ltd., Indore, India. Castor wax (50 Kg) was obtained from K.R. Enterprises, Sivakasi, Tamil Nadu, India. Starches were received as samples from Angel starch, Erode, Tamil Nadu, India. High melting waxes (Qualiwax-C, Qualiwax QD flakes and Qualiwax QD-150) were received as samples from Quality Chemical Industries, Navi Mumbai, India. Bleached wheat flour was purchased from Sri Bhagyalakshmi maida, Bengaluru local market. N-(n-butyl) thiophosphoric triamide (NBTPT) was purchased from Samich (HK) Ltd., Hangzhou, China. All remaining commercially available reagents were purchased from Sigma-Aldrich, India.

ii. Equipment

For extrusion, Micro compounder (DACA, a lab scale mini extruder), pilot scale twin screw extruder (Coperion), wire press and room temperature twin screw extruder was used. Z-blade twin screw mixer with ~40 rpm (NH-2L kneader) was used for uniform mixing of bleached wheat flour and other additives for wet extrusion.

iii. Procedure for Extruding Exemplary Fertilizer Core Particles

Representative procedure for mini extruder (DACA): The raw materials (mainly waxes) were weighed to the nearest accuracy. The other additives needed were added to the molten waxes, mixed thoroughly, and poured on glass tray to crush the material in to small flakes. The extrusions were carried out using micro compounder (DACA, a lab scale vertical twin screw extruder). The extrusions were carried out at a processing temperature ranging from 20° C.-150° C.

Representative procedure for pilot scale extruder: The raw materials needed for formulations were weighed to the nearest accuracy and mixed thoroughly. The compounding operations were carried out in a W&P ZSK25 Twin Screw Extruder with a 25 mm screw diameter on a 6-barrel. The screw configuration was designed with sufficient kneading elements to get maximum shear for better mixing. The experiments were carried out at a processing temperature ranging from 5° C.-50° C. The temperature of the extrusion process can be controlled by the screw speed used in the extrusion process. For example, fertilizer core particles comprising Plaster of Paris were extruded at a lower temperature than fertilizer core particles comprising wax. The temperature of the extrusion process for fertilizer core particles comprising Plaster of Paris was generally between 20° C.-50° C., and the temperature of the extrusion process for fertilizer core particles comprising wax was generally between 50° C.-150° C. The ingredients were added through the hopper slowly by keeping the load constant. The extrudates were collected as strands and dried at room temperature. Screw speed was between 20-100 rpm and the material was added through the main hopper at 6-8 kg/hr. The extrudates were collected out of the die at the end of the extruder in a tray and allowed to cool.

Representative procedure for wire press (small scale manual extruder): The raw materials needed for formulations were weighed, mixed thoroughly in a mortar and pestle while adding minimal quantity of water to have extrudable dough form. The dough is a homogeneous mixture of the ingredients. The dough was transferred to a vessel having a 1.0 or 1.5 mm die and probe was screwed slowly at constant speed. This entire process was carried out at room temperature. The extrudates were collected out of the die in a tray and dried.

Representative procedure for room temperature extruder: The raw materials needed for formulations were weighed to the nearest accuracy and mixed thoroughly using Z-blade twin screw mixer with ~40 rpm (NH-2L kneader). Active ingredients were added followed by water slowly while mixing and continued the mixing until consistent dough is obtained (in 1 h). The dough is a homogeneous mixture of the ingredients. The dough was introduced into extruder (F-26 Twin Screw Banded Extruder) in the form of round bars at 100 rpm to get extrudates that were collected out of the die (1.0 or 1.5 mm) in a tray. The mixing and extrusion were carried out at room temperature. The extrudates were dried at 65-80° C. for 1 to 3 hrs before taking for further analysis. The dried extrudates generally have a moisture level to below 1%.

The thermal stability of neat NBTPT and NBTPT contained within a core, as disclosed herein, can be determined by HPLC. For example, neat NBTPT or a core containing NBTPT can be exposed to 135° C. (133-135° C. is the typical temperature range of a urea melt) and can continuously be analyzed by HPLC every 5 min, until 30 min on analysis was reached. Such data will determine whether the NBTPT has better thermal stability when contained within a core, as compared to neat NBTPT.

iv. Procedure for Coating and Granulating Exemplary Fertilizer Core Particles

The extruded fertilizer core particles were provided as described above. fertilizer core particles with having a longest dimension of 0.7-1.0 mm were chosen for granulation. During the granulation process, active ingredients, such as the inhibitors, are protected inside the fertilizer core particles by the binder materials used in the formulation. The fertilizer core particles were placed in the granulator. The fertilizer core particles were sprayed with a urea melt inside the granulator to produce the fertilizer granule. The granulated fertilizer core (fertilizer granule) generally have a longest dimension of about 3 mm. The granulating process both fattens the cores with urea and dries the fertilizer granules.

The spray rate of the urea melt can be controlled to control the agglomeration of multiple cores into one fertilizer granule. Round, single and multi-core fertilizer granules were produced using this process.

Challenges in the granulation process include: i) transferring urea melt to granulator ii) reducing biuret formation iii) avoiding crystallization of urea melt in the delivery tubes up to spray nozzle head, and iv) homogenization of the melt and rate of transfer to the granulator. To resolve these issues the granulation process included transferring urea melt to the granulator by pumping the urea melt to granulator. This can be a complicated process when the volume of the liquid (urea melt) to be transferred is small (2-3 liter) as pump head heating is a must and that the piping length have some limitations. This issue was solved by transferring molten liquid to the granulator by gravitational force instead of pumping.

Reducing of biuret formation during the melt preparation is achieved by increasing surface area of urea and reducing melt preparation time and high temperature exposure. Melt temperature is reduced by using 10% water into the system. A heat tracing device was attached with proper insulation for avoiding crystallization of urea melt in the PTFE delivery tubes up to spray nozzle head. The bottom spray nozzle was used with a valve in front of the nozzle and coupled to a heating system. A continuous stirring device was introduced into urea melter to keep the melt homogenized. The urea melter temperature was controlled by circulating heated thermal oil into the double jacketed melter. The rate of transfer of the melt to granulator can be controlled by flow meter. However, on an experimental scale the volume is so small that introducing a flow meter in the transfer line is not viable. For these experiments the urea melter was kept over a weighing scale, and the rate of transfer was calculated from the weight loss of weighing scale vs. time of transfer. A valve at the urea melt tank discharge, with heating system, was used to control the rate of flow of the urea melt.

The granulation process parameters are described in Table 1.

TABLE 1

| Process | Coating |
| --- | --- |
| Bin | Coating Bin |
| Nozzle | Bottom spray; Diameter 1.2 mm; Air cap 2.6 mm |
| Atomization air pressure | 0.8 bar |
| Distribution plate | Sieve plate with 58% free area |
| Sieve cloth | 1x; 250 µm mesh size |
| Nozzle heating (thermal oil temperature) | 160° C. |
| Liquid tank heating (thermal oil temperature) | 150° C. |
| Atomization air heating | 100° C. |
| Electrical trace heating (tube) | 160° C. |
| Valve I heating (in front of the nozzle) | 160° C. |
| Valve II heating (liquid tank discharge) | 160° C. |

A general flow of the process for the production of the granulation process parameters are described in Table 1.

v. Exemplary Samples

The exemplary samples shown in Table 2 were produced using the extrusion and, if indicated, the granulation process described above.

TABLE 2

| | Values in percentage | | | | | | | | | | |
| --- | --- | --- | --- | --- | --- | --- | --- | --- | --- | --- | --- |
| Formulation | PVA | PLA | POP | HMW | LMW | RH | BWF | CP | DCD | NBTPT | Urea |
| F-9 | | | | 2.50 | 2.50 | | | | | | 95.00 |
| F-10 | | | | 2.45 | 2.45 | | | | | 0.10 | 95.00 |
| F-11 | | | | 1.45 | 1.45 | | | | 2.10 | | 95.00 |
| F-12 | | | | 1.40 | 1.40 | | | | 2.10 | 0.10 | 95.00 |
| F-13 | | | 3.00 | | | 2.00 | | | | | 95.00 |

TABLE 2-continued

| Formulation | PVA | PLA | POP | HMW | LMW | RH | BWF | CP | DCD | NBTPT | Urea |
|---|---|---|---|---|---|---|---|---|---|---|---|
| F-14 | | | 2.94 | | | | 1.96 | | | 0.10 | 95.00 |
| F-15 | | | 1.65 | | | | 1.06 | | 2.10 | | 95.19 |
| F-16 | | | 1.59 | | | | 1.06 | | 2.10 | 0.10 | 95.15 |
| F-19ND | | | 2.41 | | | | 1.61 | | 0.90 | 0.07 | 95.01 |
| F-20ND | | | 1.70 | | | | 1.15 | | 2.05 | 0.09 | 95.01 |
| F-21D | 3.00 | | 0.90 | | | | | | 1.10 | | 95.00 |
| F-22D | | | | | 2.50 | | 2.00 | | 0.50 | | 95.00 |
| F-23N | | | 2.46 | 2.43 | | | | | | 0.11 | 95.00 |
| F-24N | | | | 2.38 | | | | 2.51 | | 0.11 | 95.00 |
| F-25 | | | 2.00 | | | | 1.40 | 1.60 | | | 95.00 |
| F-26N | | | 1.89 | | | | 1.40 | 1.60 | | 0.11 | 95.00 |
| F-27ND | | | 1.50 | | | | 1.20 | 1.09 | 1.10 | 0.11 | 95.00 |
| F-28ND | | | 2.27 | | | | 1.52 | | 1.10 | 0.11 | 95.00 |
| F-29ND | | | 1.94 | | | | 1.30 | | 1.65 | 0.11 | 95.00 |
| F-30ND | | | 1.60 | | | | 1.10 | | 2.20 | 0.11 | 94.99 |
| F-31ND | | | 1.84 | 1.95 | | | | | 1.10 | 0.11 | 95.00 |
| F-32ND | | | | | 1.90 | 1.89 | | | 1.10 | 0.11 | 95.00 |
| F-33N | | | | 2.38 | | | | 2.51 | | 0.11 | 95.00 |
| F-34D | | | | 1.90 | | | | 2.00 | 1.10 | | 95.00 |
| F-35ND | | | | 1.90 | | 1.89 | | | 1.10 | 0.11 | 95.00 |
| F-36ND | | | | | 1.90 | | | 1.89 | 1.10 | 0.11 | 95.00 |
| F-37ND | | 2.30 | | | 1.49 | | | | 1.10 | 0.11 | 95.00 |
| F-38D | | | | | 2.50 | | 1.40 | | 1.10 | | 95.00 |

In Table 2: PVA = Polyvinyl acetate; PLA = Polylactic acid; POP = Plaster of Paris; HMW = High Melt Wax; LMW = Low Melt Wax; RH = Rice Husk; BWF = Bleached Wheat Flour; CP = Chalk Powder; DCD = Dicyandiamide; NBTPT = N-(n-butyl) thiophosphoric triamide.

Other exemplary fertilizer core compositions are shown in Tables 3A.

TABLE 3A

| Formulation No. | PoP | BWF | CP | DCD | NBTPT | Others |
|---|---|---|---|---|---|---|
| F-39D | 0.30 | 0.00 | 0.00 | 0.22 | 0.000 | 0.48 (EVA) |
| F-41Zn | 0.30 | 0.08 | 0.12 | | | 0.5 (ZnO) |
| F-42ZnN | 0.30 | 0.08 | 0.12 | | 0.015 | 0.4924 (ZnO) |
| F-43B | 0.32 | 0.08 | 0.30 | | | 0.30 (Boric acid) |
| F-44BN | 0.32 | 0.08 | 0.29 | | 0.015 | 0.2954 (Boric acid) |
| F-45N | 0.60 | 0.40 | | | 0.007 | |
| F-46HND | 0.40 | 0.05 | 0.31 | 0.22 | 0.015 | 0.0077 (HPMC) |
| F-47ND | 0.31 | 0.06 | 0.40 | 0.22 | 0.015 | |
| F-48PND | 0.40 | 0.02 | 0.31 | 0.22 | 0.015 | 0.0384 (PEG) |
| F-49 | 0.52 | 0.08 | 0.40 | | | |
| F-50ND | 0.39 | 0.06 | 0.31 | 0.22 | 0.015 | |
| F-51N | 0.51 | 0.08 | 0.39 | | 0.015 | |
| F-52BND | 0.40 | 0.06 | 0.31 | 0.22 | 0.152 | 1X buffer solution (16 wt %) |
| F-53ND | 0.35 | 0.05 | 0.27 | 0.30 | 0.022 | |

Formulation containing Plaster of Paris (PoP), Chalk Powder (CP), Bleached Wheat Flour (BWF) and N-Butyl-thiophosphoric triamide (NBTPT) in presence of water, as the liquid binder, exhibited a thixotropic nature. This resulted in uneven flow characteristics of the formulation during the extrusion process. The addition of a viscoelasticity agent, such as, for example, hydroxypropyl methylcellulose (HPMC) reduced the thixotropic nature and promoted uniform flow characteristics of the formulation. The viscoelasticity agent reduced the water quantity required during the extrusion process. The viscoelasticity agent promoted the formation of a colloidal system in the material, which extended the setting time of Plaster of Paris, thereby promoting a uniform flow of the material throughout the extruder. As such, a continuous extrusion process can be used to produce the fertilizer core particles.

In addition, the addition of the viscoelasticity agent improved the pelletization/slicing characteristics of the formulation, and reduced the agglomeration of extrudes. The addition of the viscoelasticity agent, in this case HPMC, minimized improper pelletization and improved the surface texture properties of the fertilizer core particles. Furthermore, the addition of HPMC in the formulations showed a positive impact on processing parameters such as torque, pressure and temperature. The HPMC reduced the shear stress from the screw elements from the extrusion process on materials, which reduced the processing temperature (with about 5 to 10° C.) in comparison with the formulation without HPMC. As the material flows smoothly in presence of HPMC, the torque was with in the controlled range (below 25% of machine torque) unlike in formulation without HPMC, which required more than 30% of machine torque). This also improved the quality of the fertilizer core particles in terms of their physical properties, such as the crush strength, abrasion, and moisture content, as shown in Table 3B.

TABLE 3B

| Sample No | Sample | Moisture (wt %) | Crushing strength (Kg/Granule) | Abrasion (wt loss %) |
|---|---|---|---|---|
| 1 | Without HPMC | 1.4 | 2.17 | 0.548 |
| 2 | With HPMC | 1.08 | 2.48 | 0.474 |

Additional exemplary fertilizer core compositions with or without a viscoelasticity agent are shown in Tables 3C.

TABLE 3C

| | | Formulation Name | | |
|---|---|---|---|---|
| | | NBTPT Only | NBTPT + DCD Combo | DCD Only |
| Contents | PoP (wt %) | 50.85 | 26.94 | 27.75 |
| | CP (wt %) | 39.12 | 41.49 | 42.75 |
| | BWF (wt %) | 7.43 | 4.37 | 4.50 |

TABLE 3C-continued

| | Formulation Name | | |
|---|---|---|---|
| | NBTPT Only | NBTPT + DCD Combo | DCD Only |
| DCD (wt %) | 0.00 | 25.00 | 25.00 |
| NBTPT (%) | 2.20 | 2.20 | 0.00 |
| HPMC (%) | 0.39 | 0.00 | 0.00 |

In exemplary formulations shown in Table 3A-3C, hydroxypropyl methylcellulose (HPMC) was included as a viscoelasticity agent. As described above, the HPMC improved the uniformity of the flow properties of the formulations throughout the extruder during the extrusion process. As such, fertilizer core particles could be produced with a consistently high quality using an extrusion process. For example, the uniformity of flow properties is reflected in the form of pelletizability. Advantageously, over 70% uniform fertilizer core particles were obtained when HPMC was included the formulation.

A liquid, such as water, can be added to the Plaster of Paris containing formulations prior to the extrusion process in order to increase the self-binding properties of Plaster of Paris. For example, about 10-15 wt % of water based on the other ingredients in the formulation can be added prior to extruding the core comprising Plaster of Paris.

vi. Sample Analysis and Results

Analytical characterization: Melting point and thermal degradation properties of waxes and inhibitors (NBTPT and DCD) were confirmed using DSC and TGA analysis. The purity of NBTPT and DCD was cross-checked by NMR, HPLC and LCMS analysis.

Crush Strength: Crush strength was measured for some of the samples using crush strength analyzer to know the strength of the extrudate.

Stability of inhibitors in urea melt: Extrudates containing inhibitors were tested for their stability in urea melt using HPLC and LCMS.

Moisture analysis: moisture content of extrudates was measured using moisture analyzer.

vii. Results

The final fertilizer granules were tested for crush strength, abrasion analysis, impact resistance, moisture content, size distribution, biuret content, and nitrogen content. In general the fertilizer granule have the following properties: crush Strength (kgf) 1.68-3.60, Abrasion Analysis (Wt loss %) 0.11-0.85, Impact resistance (shattered granules %) 0.05-0.64, Moisture Analysis (Wt %) 0.12-0.23, Particle size distribution (granule) 2-4 mm (97%), Biuret 1.05-3.8, and Nitrogen % 43.3-46.3. Table 4 shows the details of these measurements.

TABLE 4

| | Core material | | Spraying liquid | | | |
|---|---|---|---|---|---|---|
| Test No. | Product name | Mass [g] | Product name | Concentration [%] | Melting point [° C.] | Spraying quantity [g] |
| 1 | F-25 | 120 | Urea granules + Aqua dest. | 90 | 105 | 2700 |
| 2 | F-23N | 120 | Urea granules + Aqua dest. | 90 | 105 | 2650 |
| 3 | F-21D | 120 | Urea granules + Aqua dest. | 90 | 105 | 2600 |
| 4 | F-26N | 120 | Urea granules + Aqua dest. | 90 | 105 | 2600 |
| 5 | F-27ND | 120 | Urea granules + Aqua dest. | 90 | 105 | 2550 |
| 6 | F-28ND | 120 | Urea granules + Aqua dest. | 90 | 105 | 2550 |
| 7 | F-29ND | 120 | Urea granules + Aqua dest. | 90 | 105 | 2550 |
| 8 | F-30ND | 120 | Urea granules + Aqua dest. | 90 | 105 | 2550 |
| 9 | F-31ND | 120 | Urea granules + Aqua dest. | 90 | 105 | 2550 |
| 10 | F-33N | 120 | Urea granules + Aqua dest. | 90 | 105 | 2550 |
| 11 | F-22D | 120 | Urea granules + Aqua dest. | 90 | 105 | 2550 |
| 12 | F-34D | 120 | Urea granules + Aqua dest. | 90 | 105 | 2550 |

| | Core material | Process parameters | | | | | | |
|---|---|---|---|---|---|---|---|---|
| Test No. | Product name | Spray rate g/min | Temp Spraying liquid [° C.] | Inlet air temperature [° C.] | Exhaust air temperature [° C.] | Air flow rate m³/h | Atom Pressure [bar] | Granul. Time [min] | Cooling time [min] |
| 1 | F-25 | 6-27 | 125-130 | 90 | 64.8-85.6 | 50-130 | 0.8 | 66 | 20 |
| 2 | F-23N | 6-100 | 125-130 | 90 | 60.8-82.7 | 50-130 | 0.8 | 42 | 20 |
| 3 | F-21D | 6-60 | 123-126 | 90 | 55.7-82.9 | 150-130 | 0.8 | 69 | 20 |
| 4 | F-26N | 13-68 | 121-125 | 90 | 55.2-82.0 | 50-130 | 0.8 | 63 | 20 |
| 5 | F-27ND | 15-58 | 123-127 | 90 | 63.0-84.0 | 50-125 | 0.8 | 71 | 20 |
| 6 | F-28ND | 14-54 | 129-132 | 90 | 67.5-85.0 | 50-140 | 0.8 | 65 | 20 |
| 7 | F-29ND | 12-64 | 125-128 | 90 | 60.9-81.0 | 50-135 | 0.8 | 50 | 20 |
| 8 | F-30ND | 30-74 | 120-124 | 90 | 64.1-82.9 | 50-135 | 0.8 | 41 | 20 |
| 9 | F-31ND | 20-60 | 127-130 | 90 | 68.0-84.8 | 50-140 | 0.8 | 54 | 20 |

TABLE 4-continued

| | | | | | | | | | |
|---|---|---|---|---|---|---|---|---|---|
| 10 | F-33N | 24-73 | 121-126 | 90 | 64.5-82.6 | 50-140 | 0.8 | 46 | 20 |
| 11 | F-22D | 23-72 | 120-132 | 70-90 | 60.7-81.9 | 50-140 | 0.8 | 47 | 20 |
| 12 | F-34D | 18-80 | 121-131 | 90 | 61.9-84.3 | 50-140 | 0.8 | 44 | 20 |

| | Core material | Final product | | | |
|---|---|---|---|---|---|
| Test No. | Product name | Final product mass [g] | Moisture content [%] | Crushing strength [kg] | Growth mass [Factor] |
| 1 | F-25 | 2700 | 0.13 | 6.0<br>6.4<br>6.4 | 22.5 |
| 2 | F-23N | 2680 | 0.17 | 1.6<br>1.2<br>3.3 | 22.3 |
| 3 | F-21D | 2651 | 0.12 | 0.85<br>1.5<br>5.0 | 22.0 |
| 4 | F-26N | 2670 | 0.17 | 2.5<br>1.9<br>3.6 | 22.3 |
| 5 | F-27ND | 2476 | 0.11 | 3.2<br>2.3<br>2.2 | 20.6 |
| 6 | F-28ND | 2558 | 0.17 | 2.6<br>2.4<br>1.5 | 21.3 |
| 7 | F-29ND | 2378 | 0.12 | 3.3<br>3.4<br>1.7 | 19.8 |
| 8 | F-30ND | 2540 | 0.19 | 1.8<br>3.3<br>1.7 | 21.2 |
| 9 | F-31ND | 2650 | 0.14 | 2.0<br>2.4<br>3.0 | 22.0 |
| 10 | F-33N | 2582 | 0.23 | 2.0<br>1.4<br>3.0 | 21.5 |
| 11 | F-22D | 2530 | 0.19 | 2.1<br>1.9<br>1.9 | 21.0 |
| 12 | F-34D | 2675 | 0.22 | 3.2<br>1.1<br>3.4 | 22.3 |

| Core material | | Spraying liquid | | | |
|---|---|---|---|---|---|
| Product name | Mass [g] | Product name | Concentration [%] | Melting point [° C.] | Spraying quantity [g] |
| F-45N | 120 | Urea granules + Aqua dest. | 90 | 105 | 2700 |
| F-53ND | 130 | Urea granules + Aqua dest. | 90 | 105 | 2900 |
| F-53ND | 130 | Urea granules + Aqua dest. | 90 | 105 | 2700 |
| F-53ND | 130 | Urea granules + Aqua dest. | 90 | 105 | 2750 |
| F-50ND | 120 | Urea granules + Aqua dest. | 90 | 105 | 2550 |
| F-51N | 120 | Urea granules + Aqua dest. | 90 | 105 | 2550 |
| F-41Zn | 120 | Urea granules + Aqua dest. | 90 | 105 | 2550 |
| F-42ZnN | 120 | Urea granules + Aqua dest. | 90 | 105 | 2550 |
| F-43B | 120 | Urea granules + Aqua dest. | 90 | 105 | 2550 |
| F-44BN | 120 | Urea granules + Aqua dest. | 90 | 105 | 2550 |
| F-47ND | 120 | Urea granules + Aqua dest. | 90 | 105 | 2550 |

TABLE 4-continued

| | Process parameters | | | | | | | |
|---|---|---|---|---|---|---|---|---|
| Core material Product name | Spray rate g/min | Temp Spraying liquid [° C.] | Inlet air temperature [° C.] | Exhaust air temperature [° C.] | Air flow rate m³/h | Atom Pressure [bar] | Granul. Time [min] | Cooling time [min] |
| F-45N | 6-27 | 125-130 | 90 | 64.8-85.6 | 50-130 | 0.8 | 66 | 20 |
| F-53ND | 6-100 | 125-130 | 90 | 60.8-82.7 | 50-130 | 0.8 | 42 | 20 |
| F-53ND | 6-60 | 123-126 | 90 | 55.7-82.9 | 150-130 | 0.8 | 69 | 20 |
| F-53ND | 13-68 | 121-125 | 90 | 55.2-82.0 | 50-130 | 0.8 | 63 | 20 |
| F-50ND | 15-58 | 123-127 | 90 | 63.0-84.0 | 50-125 | 0.8 | 71 | 20 |
| F-51N | 14-54 | 129-132 | 90 | 67.5-85.0 | 50-140 | 0.8 | 65 | 20 |
| F-41Zn | 12-64 | 125-128 | 90 | 60.9-81.0 | 50-135 | 0.8 | 50 | 20 |
| F-42ZnN | 30-74 | 120-124 | 90 | 64.1-82.9 | 50-135 | 0.8 | 41 | 20 |
| F-43B | 20-60 | 127-130 | 90 | 68.0-84.8 | 50-140 | 0.8 | 54 | 20 |
| F-44BN | 24-73 | 121-126 | 90 | 64.5-82.6 | 50-140 | 0.8 | 46 | 20 |
| F-47ND | 23-72 | 120-132 | 70-90 | 60.7-81.9 | 50-140 | 0.8 | 47 | 20 |

| | Final product | | | |
|---|---|---|---|---|
| Core material Product name | Final product mass [g] | Moisture content [%] | Crushing strength [kg] | Growth mass [Factor] |
| F-45N | 2565 | 0.5 | 2.5 | 21.4 |
| F-53ND | 2758 | 0.3 | 2.5 | 21.2 |
| F-53ND | 2396 | 0.5 | 2.1 | 18.4 |
| F-53ND | 2651 | 0.5 | 1.5 | 20.4 |
| F-50ND | 2393 | 0.9 | 1.0 | 19.9 |
| F-51N | 2410 | 0.8 | 1.1 | 20.1 |
| F-41Zn | 2390 | 0.56 | 2.0 | 19.9 |
| F-42ZnN | 2489 | 0.72 | 2.5 | 20.7 |
| F-43B | 2901 | 0.64 | 2.0 | 21.7 |
| F-44BN | 2454 | 0.8 | 2.0 | 20.5 |
| F-47ND | 2508 | 0.9 | 1.8 | 20.9 |

Figure 3A:
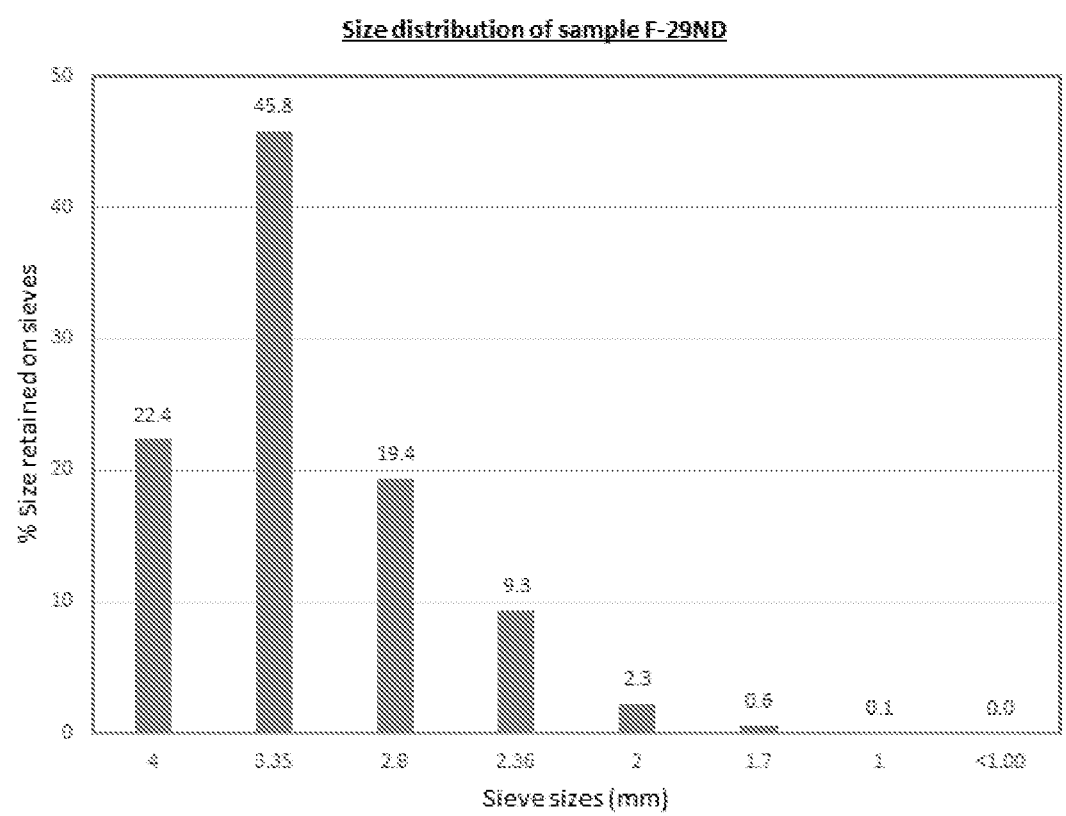
FIG. 3A-3C show the size distribution of sample F-29ND (3A), F-28ND (3B), and F-31ND (3C).
Figure 3B:
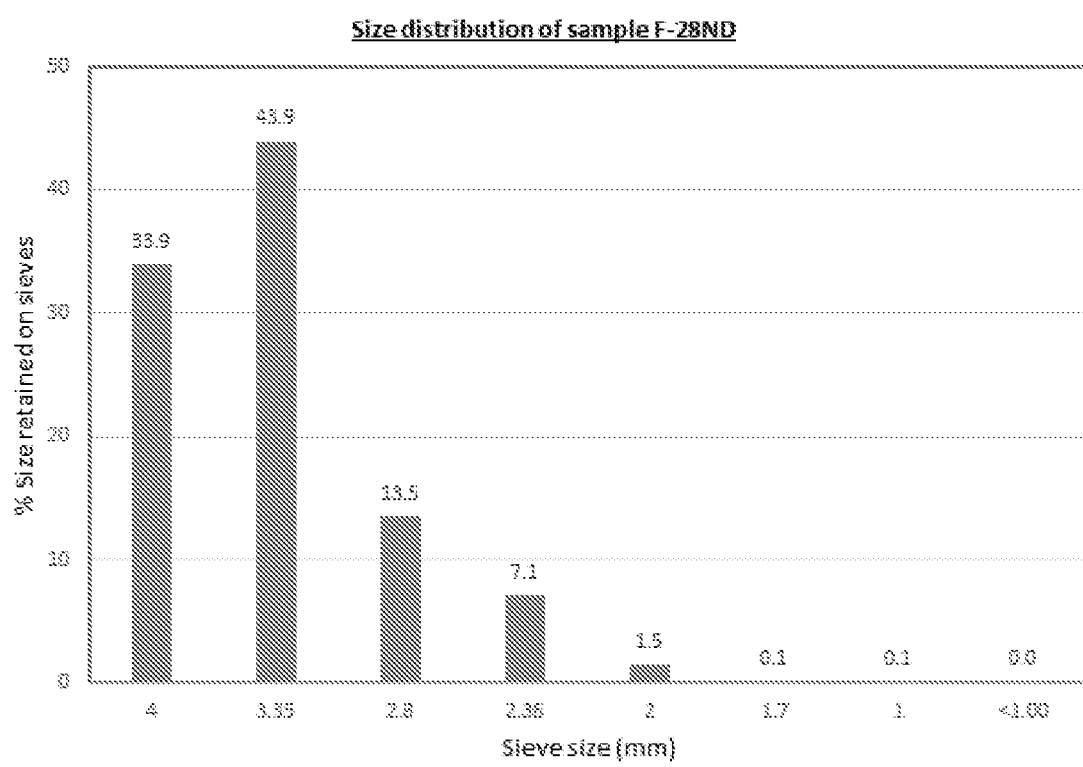
Figure 3C:
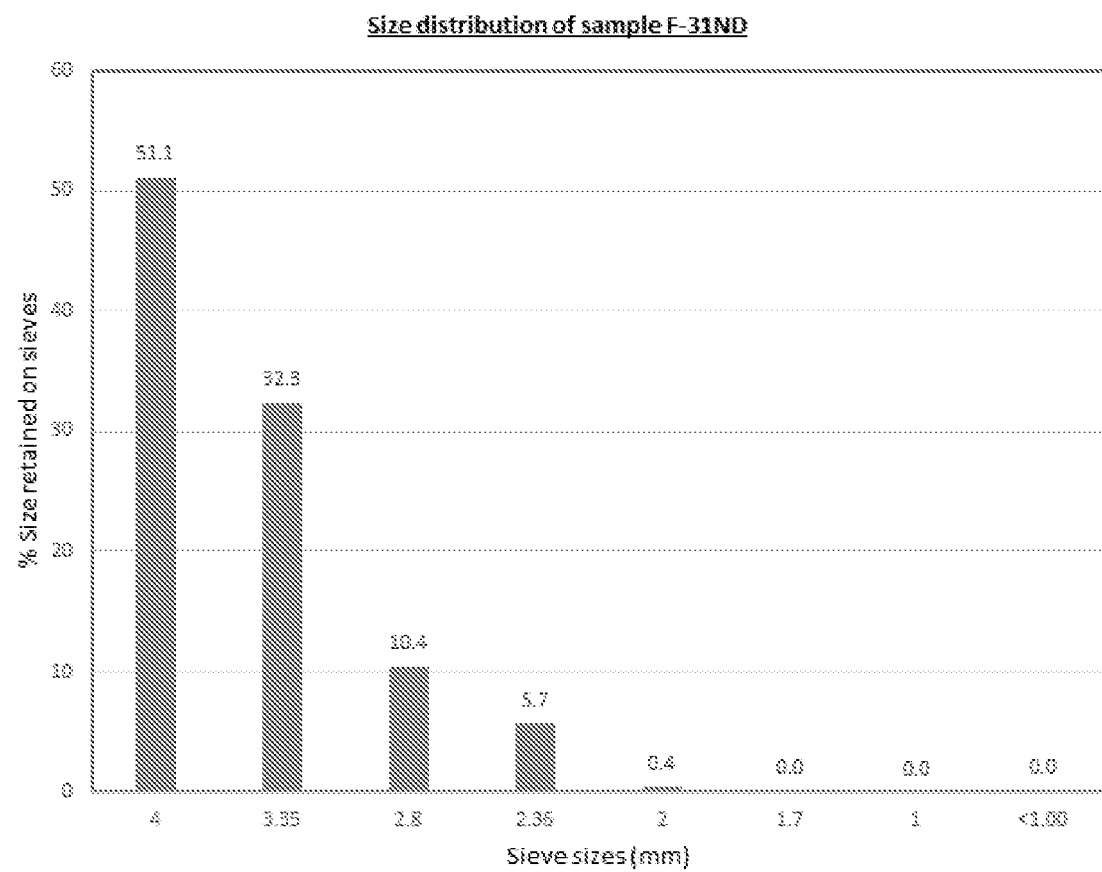

The size distribution of the urea coated and granulated sample F-29ND is shown in FIG. 3A. The size distribution of the urea coated and granulated sample F-28ND is shown in FIG. 3B. The size distribution of the urea coated and granulated sample F-31ND is shown in FIG. 3C. FIGS. 3A, 3B, and 3C shows that the fertilizer granules F-29ND, F-28ND, F-31ND have a size distribution from about 2.0 mm to about 4.0 mm, wherein the majority of the fertilizer granule have a size from about 2.8 mm to about 4 mm.

The nitrogen volatilization was measured in different soils for several samples and compared to products on the market, such as Agrotain®, ESN®, and SuperU®. The samples were tested in Greenville soil, Crowley soil, and Brownfield Soil.

Brownfield soil is generally described as calcareous sandy loam. Its soil taxonomic classification is loamy, mixed, super active, thermic Arenic Aridic Paleustalfs. The soil belongs to the order Alfisol and is slightly weathered soil found in warm arid regions. The soil has soil pH of 7.4-7.7; hence with high volatilization potential and being a sandy loam also has a higher leaching potential than Greenville soil. Brownfield soil is also highly phosphorous-deficient (Bray 1 P=2.4 mg P kg$^{-1}$, Pi-P=2.6 mg P kg$^{-1}$), with CEC of 6.6 cmol/kg. the soil also has less than 1% organic matter and is deficient in nitrogen.

Greenville soil or Greenville clay-loam soil is a loamy heavier textured soil than Brownfield. The soil is typical of weathered tropical ultisols, and is found in warm humid environments. The soil is classified as fine, kaolinitic, thermic Rhodic Kandiudults) with a pH of 6.1-6. The soil has organic matter of 1.4%, total amount of nitrogen is about 0.06%, and the CEC is 5.2 cmol/kg. Accordingly, the soil has a low content of organic matter, and also low availability of sulfur and nitrogen. Thus, the soil is ideal for nitrogen and sulfur trials with fertilizers.

Crowley soil consists of very deep, somewhat poorly drained, very slowly permeable soils that formed in clayey fluviomarine deposits of the Pleistocene age. The soil exist in nearly level to very gently sloping soils and occur on flat coastal plains terraces. The slope is dominantly less than 1 percent but ranges to up to 3 percent. The mean annual precipitation is about 1549 mm (61 in), and the mean annual air temperature is about 20 degrees C. (68 degrees F.), where the soil is found. The soil is fine, smectitic, and thermic Typic Albaqualfs.

Figure 4:
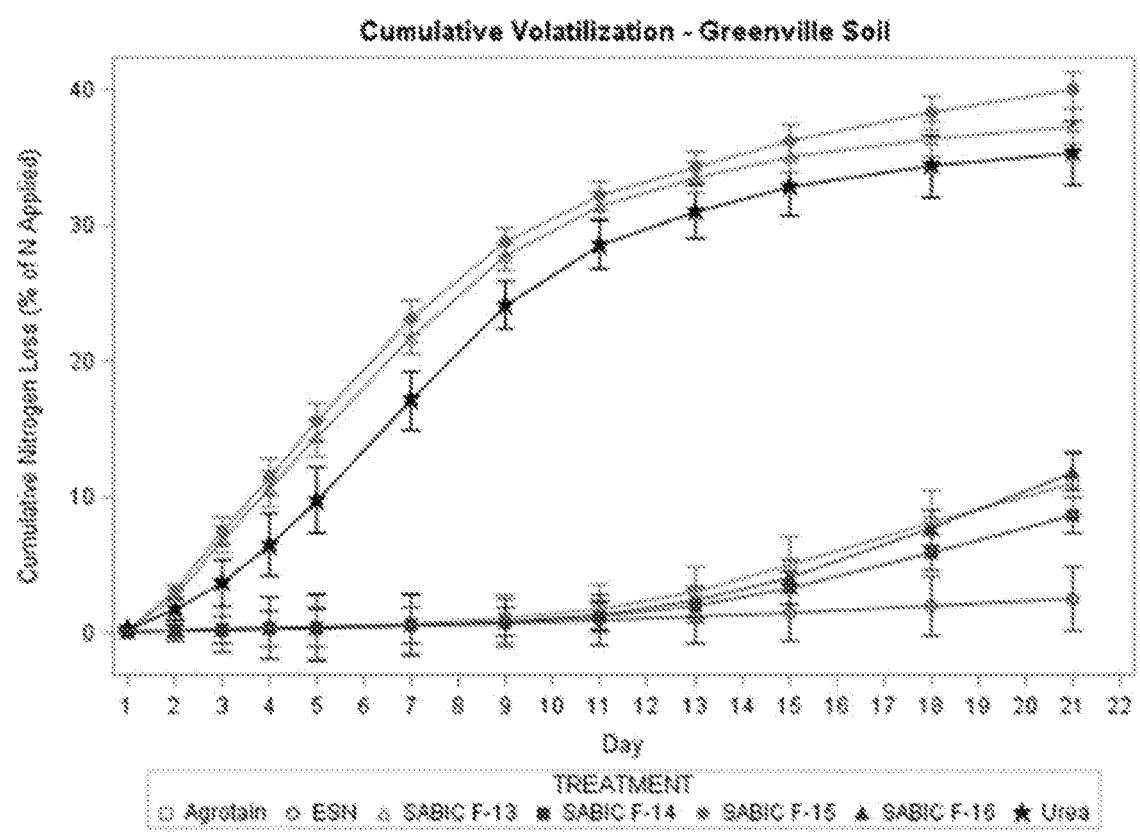
FIG. 4 shows the cumulative loss of the percentage of nitrogen applied of exemplary fertilize granules in Greenville soil.
Figure 5:
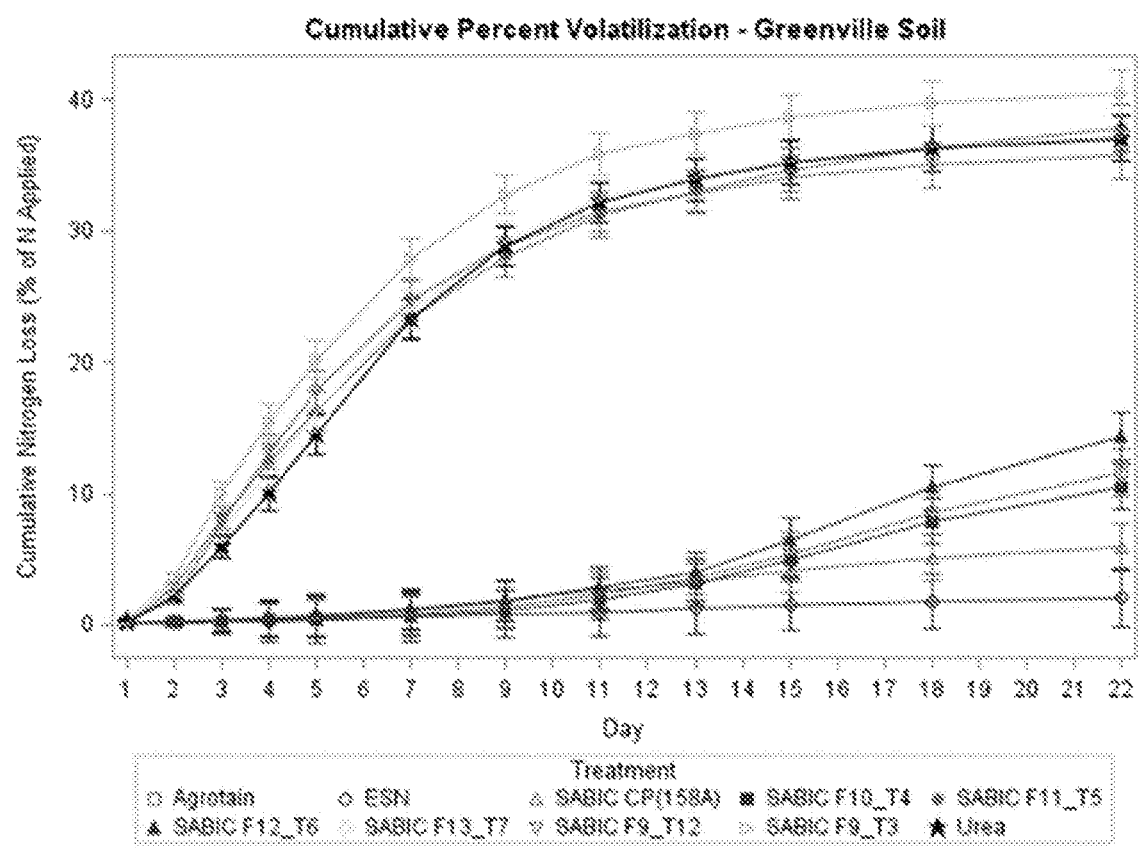
FIG. 5 shows the cumulative loss of the percentage of nitrogen applied of exemplary fertilize granules in Greenville soil.

The nitrogen volatilization of various exemplary samples of fertilizer granules as compared to Agrotain®, ESN®, SuperU, and urea, is shown in FIG. 4-FIG. 9. The measurement shown in FIG. 4 and FIG. 5 is the percentage of nitrogen loss as ammonia volatilization as compared to the amount of nitrogen applied. FIGS. 6-9 show the nitrogen loss in mg.

Figure 6:
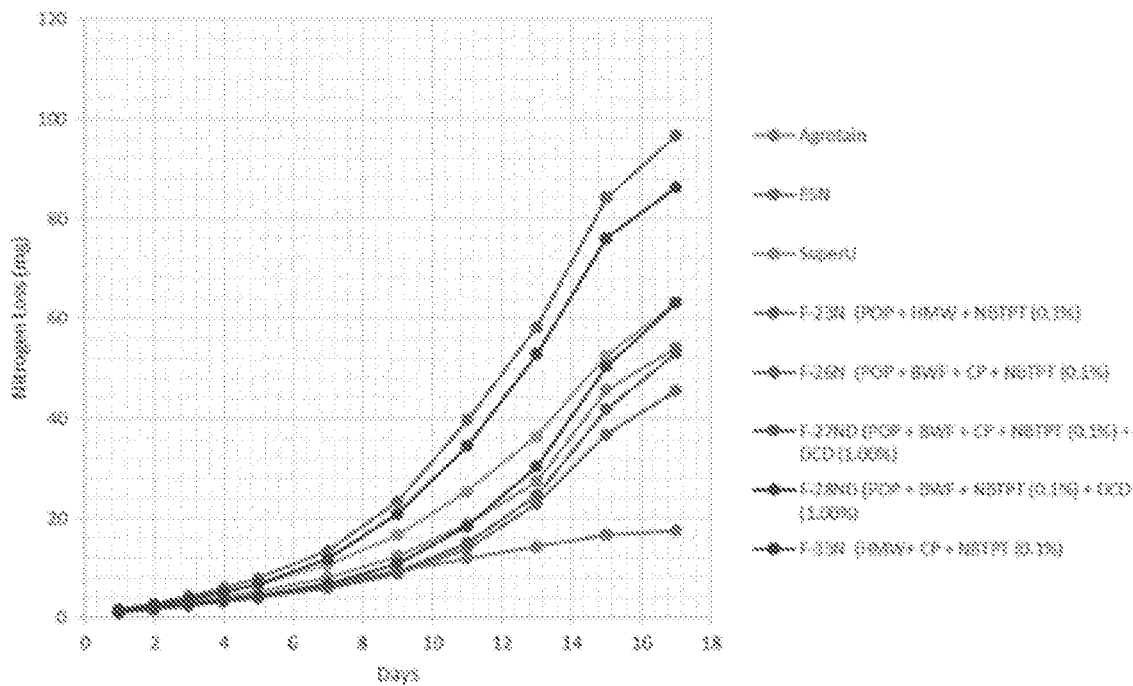
FIG. 6 shows the nitrogen volatilization of exemplary fertilize granules.
Figure 7:
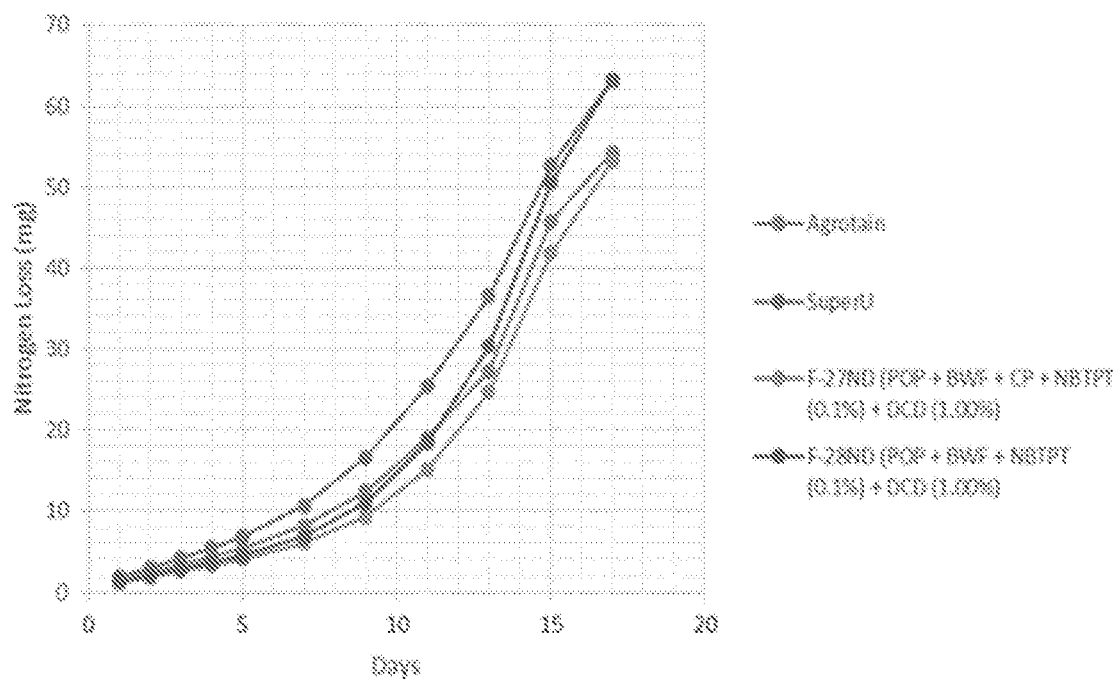
FIG. 7 shows the nitrogen volatilization of exemplary fertilize granules.
Figure 8:
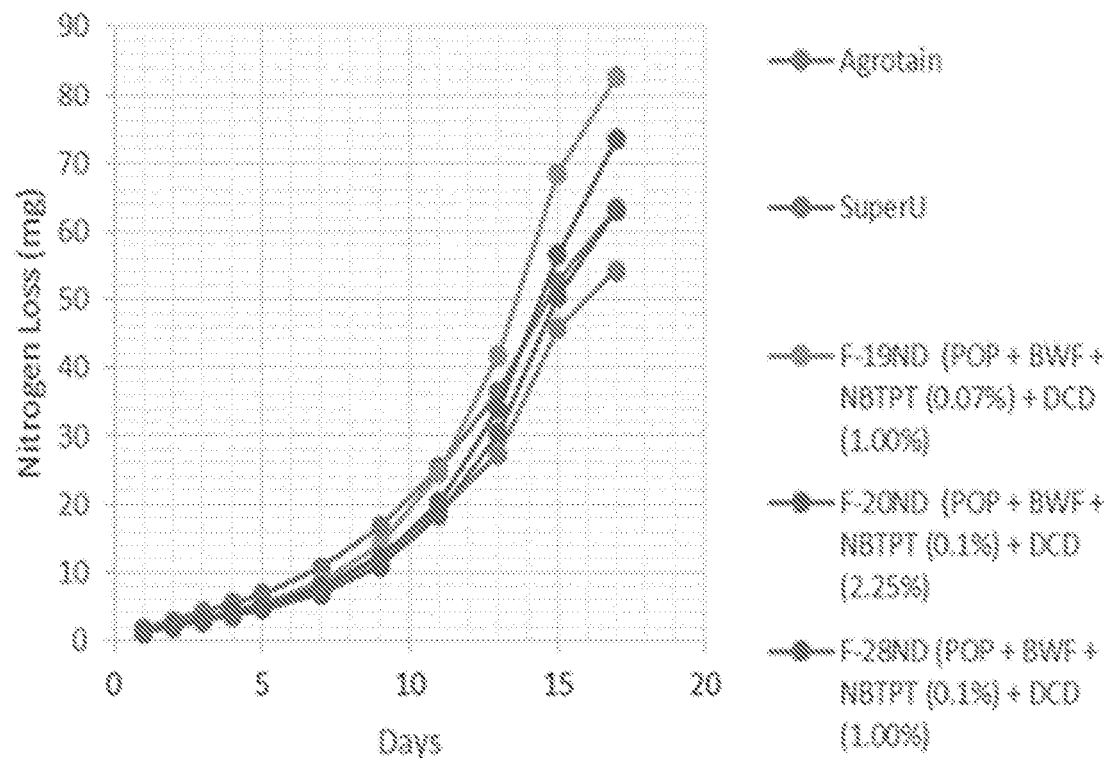
FIG. 8 shows the nitrogen volatilization of exemplary fertilize granules.
Figure 9:
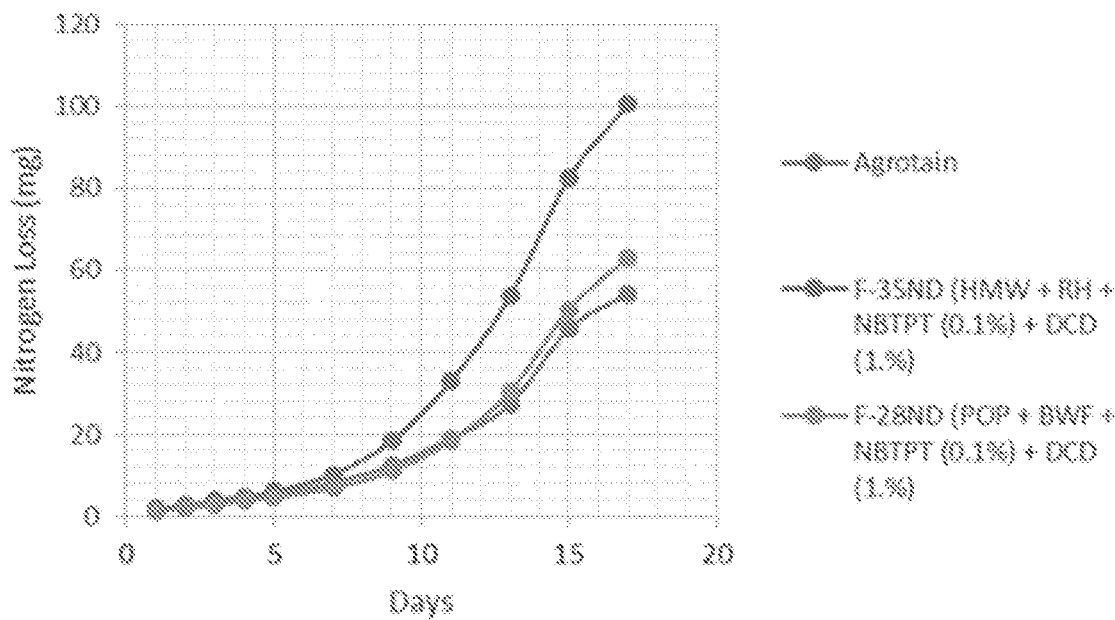
FIG. 9 shows the nitrogen volatilization of exemplary fertilize granules.

The results show that the exemplary fertilizer granules have low ammonia volatilization and nitrogen loss. For example, samples F-14, F-16, F-10, F-12, F-28ND, F-27ND, F-19ND, and F-26N have lower or comparable ammonia volatilization and nitrogen loss to commercial products. FIGS. 6-7 show the impact of nitrogen loss in fertilizer granules with the different binders and a pH buffering agent. FIGS. 8-9 show the impact of nitrogen loss in fertilizer granules with the different binders but without a pH buffering agent.

Figure 10A:
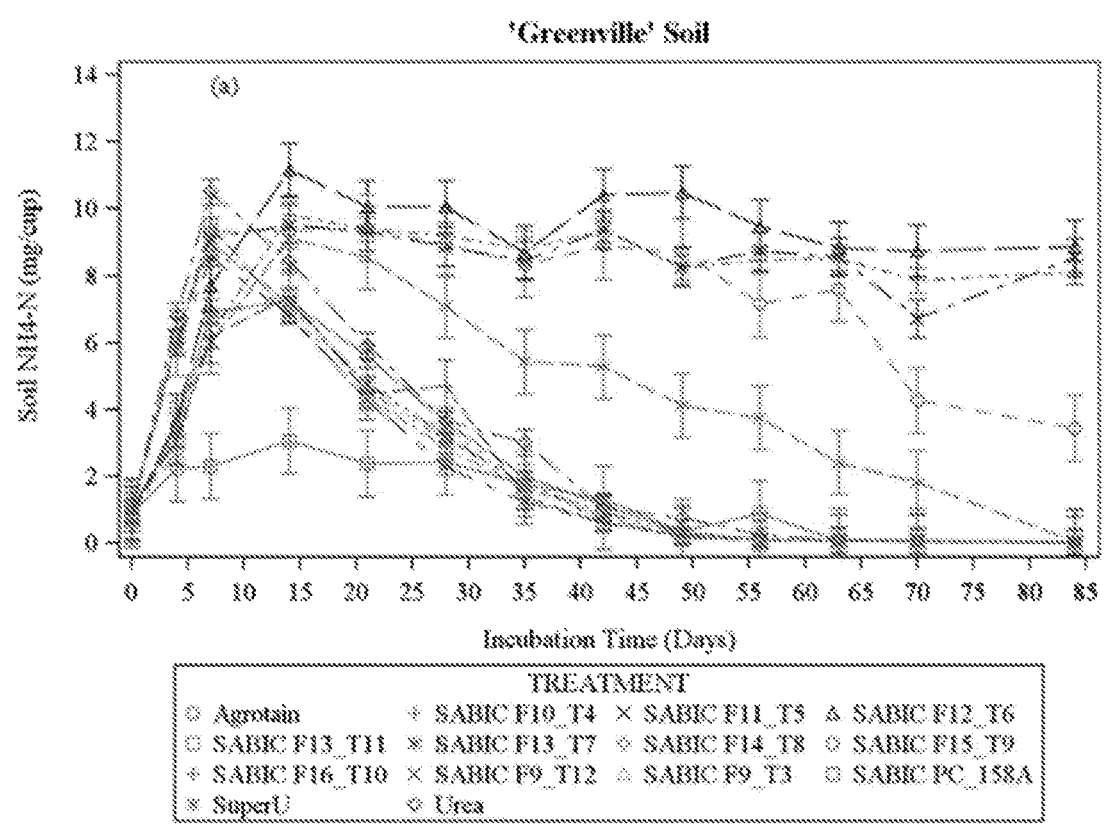
FIGS. 10A and 10B show the nitrogen transformation measurements of fertilizer granules in Greenville Soil.
Figure 10B:
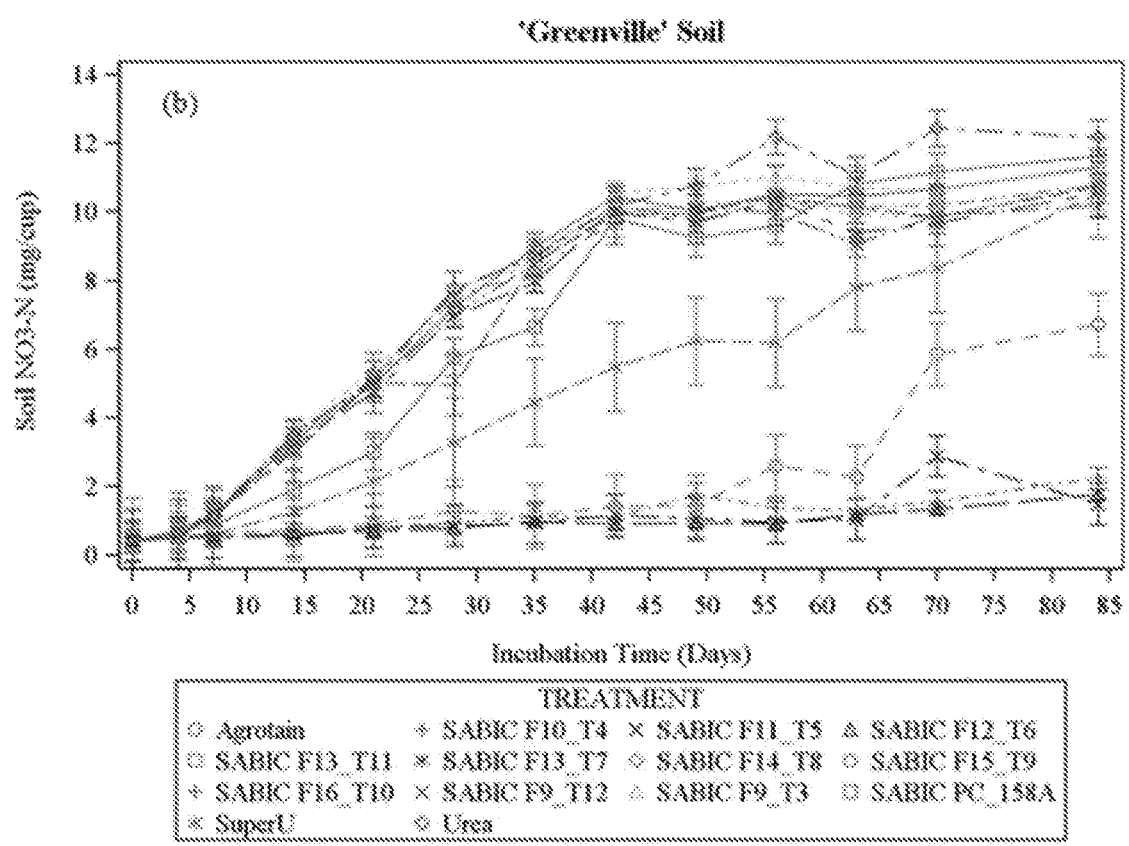
Figure 11A:
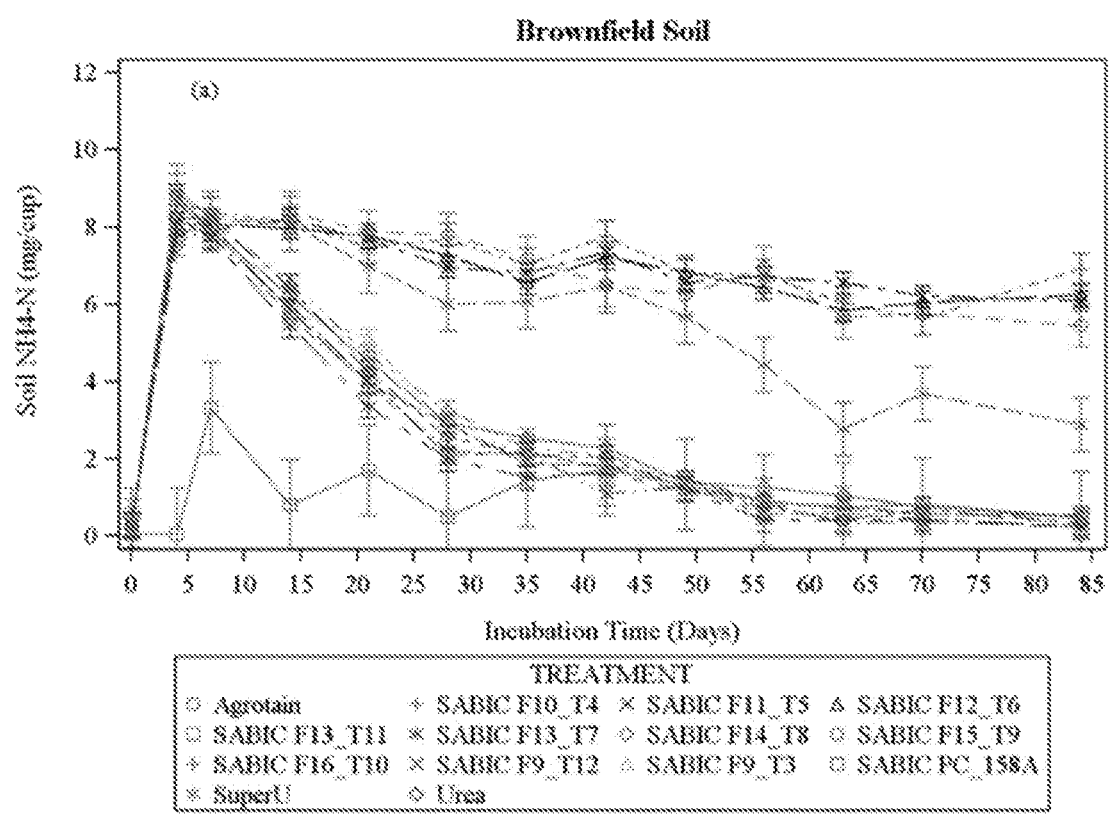
FIGS. 11A and 11B show the nitrogen transformation (nitrification) measurements of fertilizer granules in Brownfield Soil.
Figure 11B:
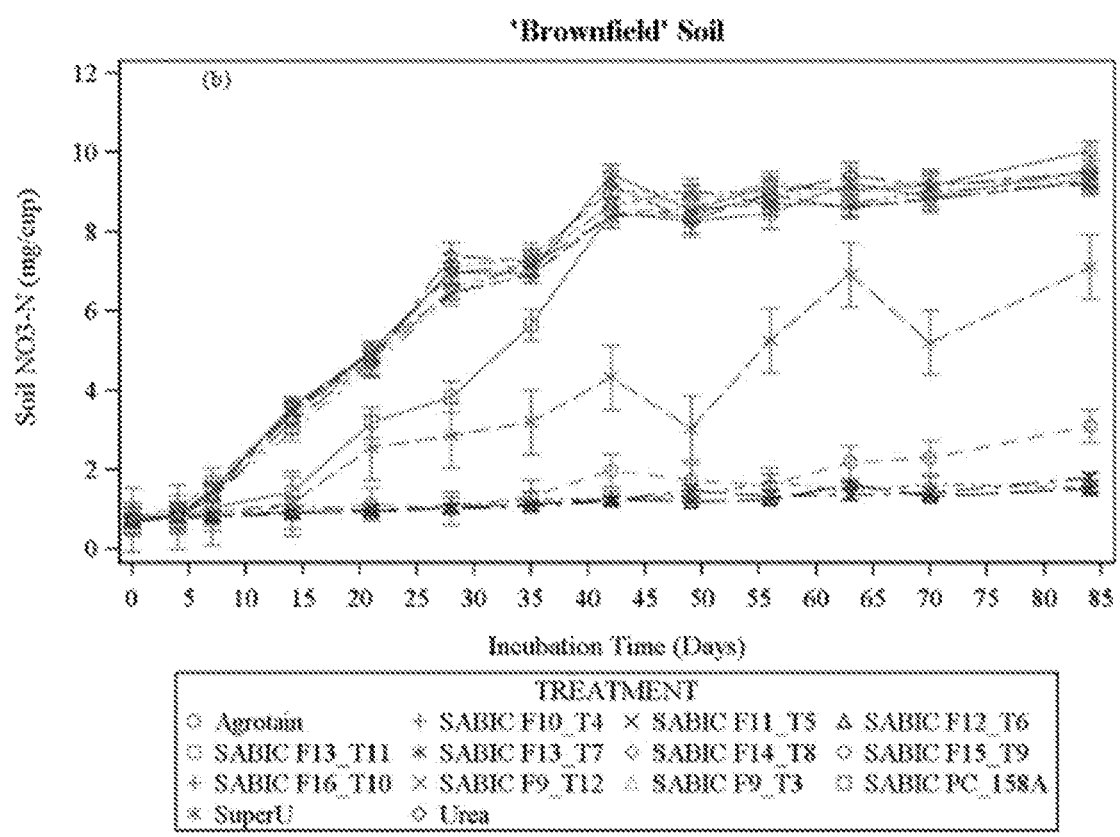

The nitrogen transformation (nitrification) was measured for exemplary fertilizer granule samples. The nitrogen transformation (nitrification) measurements were conducted in both Greenville Soil and in Brownfield sandy soil. FIG. 10A, 10B, 11A and FIG. 11 B show the results. FIGS. 10A and 11A show the nitrogen content present as ammonium in the soil, and FIGS. 10B and 11B show the nitrogen content present as nitrate in the soil.

Table 5 shows the loss of nitrogen and percentage reduction of nitrogen of F-26, F27, F-28, urea Agrotain®, and SuperU® after 17 days of exposure to Upland Crowley Soil at the International Fertilizer Development Centre (IFDC, Alabama, USA).

TABLE 5

| Sample | PoP | BWF | CP | DCD | NBTPT | Cumulative Nitrogen Loss (mg) by 17 Days | % Urea | % Reduction in Nitrogen Loss |
|---|---|---|---|---|---|---|---|---|
| F-26 | 0.38 | 0.28 | 0.32 | 0.00 | 0.022 | 45.59 | 15.24 | 84.76 |
| F-27 | 0.30 | 0.24 | 0.22 | 0.22 | 0.022 | 53.12 | 17.76 | 82.24 |
| F-28 | 0.45 | 0.30 | 0.00 | 0.22 | 0.022 | 63.2 | 21.13 | 78.87 |
| Urea | | | | | | 299.08 | 100 | 0 |
| Agrotain ® | | | | | | 54.22 | 18.13 | 81.87 |
| SuperU ® | | | | | | 63.21 | 21.13 | 78.87 |

The data show that F-26 and F-27 has less nitrogen loss than Agrotain® and SuperU®, and non-CP containing formulation F-28.

Overall, the exemplary fertilizer granules showed comparative or better performance as compared to benchmark product, Agrotain®, which indicates that the fertilizer core effectively shields and provides stability of inhibitors (active ingredient), such as for example, NBTPT, during urea melt conditions during the granulation process.

As shown in Table 7, the addition of a pH buffering agent, such as chalk powder (contains mostly $CaCO_3$), improved the performance of the fertilizer granules. This effect can be attributed to that the pH buffering agent stabilizes the inhibitors (active ingredient), such as for example, NBTPT, in the soil and/or during the granulation process.

viii. Effect of Viscoelasticity Agent in Fertilizer Core Particle

Fertilizer core particles with and without a viscoelasticity agent (i.e. HPMC) were extruded using a ZSK-25 twin screw extruder, as described above. The formulation and preparation of these samples are shown in Table 6.

TABLE 6

| NBTPT containing Formulation | POP (%) | CP (%) | BWF (%) | DCD (%) | NBTPT (%) | HPMC (%) |
|---|---|---|---|---|---|---|
| With HPMC | 50.85 | 39.12 | 7.43 | 0 | 2.2 | 0.39 |
| Without HPMC | 51.05 | 39.32 | 7.43 | 0 | 2.2 | 0 |

The physical properties of fertilizer core particles were compared before and after drying in an oven. The results show that fertilizer core particles with a viscoelasticity agent (i.e. HPMC) have improved properties as compared to fertilizer core particles without a viscoelasticity agent (i.e. HPMC). The improved properties can, in part, be attributed to the improved uniform flow of the mixture through the extruder that forms the fertilizer core particles. Specifically, it was shown that fertilizer core particles with a viscoelasticity agent (i.e. HPMC) have a lower moisture content, a higher crushing strength, a higher bulk density, and a lower abrasion as compared to a fertilizer core particles without a viscoelasticity agent (i.e. HPMC).

Oven dried fertilizer core particles were prepared by placing the fertilizer core particles in an oven at 70° C. for 4 hours. Room dried fertilizer core particles were prepared by subjecting the fertilizer core particles to 24° C. for 4 hours.

Table 7 shows the moisture content of oven dried fertilizer core particles with and without a viscoelasticity agent (i.e. HPMC). Table 8 shows the moisture content of room dried fertilizer core particles with and without a viscoelasticity agent (i.e. HPMC). Tables 7 and 8 show that fertilizer core particles with a viscoelasticity agent (i.e. HPMC) have a lower moisture content than fertilizer core particles without a viscoelasticity agent (i.e. HPMC), regardless if the fertilizer core particles were over dried or room dried. It is desired that the fertilizer core particles have low moisture content, because a lower moisture content reduces the caking of the fertilizer core particles (i.e. multiple fertilizer core particles being bonded together) and also improves the crushing strength of the fertilizer core particles.

TABLE 7

Oven Dried - 70° C. for 4 hours

| Sample No. | Sample Name | Temperature (° C.) | Analysis time (min) | Moisture wt % |
|---|---|---|---|---|
| 1 | Without HPMC | 102 | 30 | 1.4 |
| 2 | With HPMC | 102 | 30 | 1.08 |

TABLE 8

Room Dried - 24° C. for 4 hours

| Sample No. | Sample Name | Temperature (° C.) | Analysis time (min) | Moisture wt % |
|---|---|---|---|---|
| 1 | Without HPMC | 25 | 30 | 3.91 |
| 2 | With HPMC | 102 | 30 | 2.75 |

Table 9 shows the crush strength of oven dried fertilizer core particles with and without a viscoelasticity agent (i.e. HPMC). Table 10 shows the crush strength of room dried fertilizer core particles with and without a viscoelasticity agent (i.e. HPMC). Tables 9 and 10 show that fertilizer core particles with a viscoelasticity agent (i.e. HPMC) have a higher crush strength than fertilizer core particles without a viscoelasticity agent (i.e. HPMC), regardless if the fertilizer core particles were over dried or room dried. It is desired that the fertilizer core particles have high crush strength, because a higher crush strength means that the fertilizer core particles are more resistant to mechanical stress during handling and/or storage. Furthermore, a higher crush strength tends to decrease caking and dust formation of the fertilizer core particles during storage.

TABLE 9

Oven Dried - 70° C. for 4 hours

| Sample No. | Sample Name | Crush strength (kg/granule) |
|---|---|---|
| 1 | Without HPMC | 2.17 |
| 2 | With HPMC | 2.48 |

TABLE 10

Room Dried - 24° C. for 4 hours

| Sample No. | Sample Name | Crush strength (kg/granule) |
|---|---|---|
| 1 | Without HPMC | 1.525 |
| 2 | With HPMC | 1.663 |

Table 13 shows the oven dried fertilizer core particles with and without a viscoelasticity agent (i.e. HPMC). Table 14 shows the abrasion expressed in weight loss % of room dried fertilizer core particles with and without a viscoelasticity agent (i.e. HPMC). Tables 13 and 14 show that fertilizer core particles with a viscoelasticity agent (i.e. HPMC) have a lower abrasion expressed in weight loss % than fertilizer core particles without a viscoelasticity agent (i.e. HPMC), regardless if the fertilizer core particles were over dried or room dried. It is desired that the fertilizer core particles have low abrasion expressed in weight loss %, because less fertilizer is lost during handling and storage of the fertilizer core particles.

TABLE 13

Oven Dried - 70° C. for 4 hours

| Sample No. | Sample Name | Abrasion (weight loss %) |
|---|---|---|
| 1 | Without HPMC | 0.548 (standard deviation 0.0732) |
| 2 | With HPMC | 0.474 (standard deviation 0.0238) |

TABLE 14

Room Dried - 24° C. for 4 hours

| Sample No. | Sample Name | Abrasion (weight loss %) |
|---|---|---|
| 1 | Without HPMC | 0.756 (standard deviation 0.0650) |
| 2 | With HPMC | 0.469 (standard deviation 0.0215) |

What is claimed is:

1. A fertilizer core particle having an outer surface and comprising one or more fertilizer additives, from about 45 wt % to about 99 wt % of one or more binders, and from about 30 wt % to about 50 wt % of one or more pH buffering agents, wherein the one or more binders comprises from 40 wt % to 60 wt % of Plaster of Paris and from 5 wt % to 10 wt % of flour comprising bleached wheat flour based on the weight of the fertilizer core particle, and wherein the one or more fertilizer additive comprises from more than 0 wt % to 5 wt % of N-(n-butyl) thiophosphoric triamide based on the weight of the fertilizer core particle.

2. The fertilizer core particle of claim 1, further comprising from more than 0 wt % to about 5 wt % of one or more viscoelasticity agents.

3. The fertilizer core particle of claim 2, comprising from about 0.2 wt % to about 0.5 wt % of the one or more viscoelasticity agents.

4. The fertilizer core particle of claim 1, further comprising one or more viscoelasticity agents.

5. The fertilizer core particle of claim 4, wherein the one or more viscoelasticity agents comprise hydroxypropyl methylcellulose.

6. The fertilizer core particle of claim 5, comprising from more than 0 wt % to 5 wt % of the hydroxypropyl methylcellulose.

7. The fertilizer core particle of claim 5, comprising 0.2 wt % to 0.5 wt % of the hydroxypropyl methylcellulose.

8. The fertilizer core particle of claim 1, further comprising dicyandiamide.

9. The fertilizer core particle of claim 8, comprising from 20 wt % to about 25 wt % of the dicyandiamide.

10. A fertilizer core particle having an outer surface and comprising one or more fertilizer additives, from about 20 wt % to about 99 wt % of one or more binders, and about 30 wt % to about 50 wt % of one or more pH buffering agents, wherein the one or more binders comprises from 20 wt % to 40 wt % of Plaster of Paris and from more than 0 wt % to 10 wt % of flour comprising bleached wheat flour based on the weight of the fertilizer core particle, and wherein the one or more fertilizer additives comprises from 20 wt % to 30 wt % of dicyandiamide based on the weight of the fertilizer core particle.

11. The fertilizer core particle of claim 10, further comprising from more than 0 wt % to about 5 wt % of one or more viscoelasticity agents.

12. The fertilizer core particle of claim 11, comprising from about 0.2 wt % to about 0.5 wt % of the one or more viscoelasticity agents.

13. The fertilizer core particle of claim 10, further comprising N-(n-butyl) thiophosphoric triamide.

14. The fertilizer core particle of claim 13, comprising from more than 0 wt % to 5 wt % of the N-(n-butyl) thiophosphoric triamide.

15. The fertilizer core particle of claim 10, further comprising one or more viscoelasticity agents.

16. The fertilizer core particle of claim 15, wherein the one or more viscoelasticity agents comprise hydroxypropyl methylcellulose.

17. The fertilizer core particle of claim 16, comprising from more than 0 wt % to 5 wt % of the hydroxypropyl methylcellulose.

18. The fertilizer core particle of claim 16, comprising 0.2 wt % to 0.5 wt % of the hydroxypropyl methylcellulose.

* * * * *